US012160939B2

(12) United States Patent
Zhou et al.

(10) Patent No.: US 12,160,939 B2
(45) Date of Patent: Dec. 3, 2024

(54) LED LIGHTING SYSTEM, AND DIMMER, LIGHTING APPARATUS, AND DIMMING CONTROL METHOD THEREOF

(71) Applicant: JIAXING SUPER LIGHTING ELECTRIC APPLIANCE CO., LTD, Jiaxing (CN)

(72) Inventors: Lin Zhou, Jiaxing (CN); Aiming Xiong, Jiaxing (CN)

(73) Assignee: Jiaxing Super Lighting Electric Appliance Co., Ltd., Zhejiang (CN)

( * ) Notice: Subject to any disclaimer, the term of this patent is extended or adjusted under 35 U.S.C. 154(b) by 234 days.

(21) Appl. No.: 17/641,337

(22) PCT Filed: Sep. 10, 2020

(86) PCT No.: PCT/CN2020/114547

§ 371 (c)(1),
(2) Date: Mar. 8, 2022

(87) PCT Pub. No.: WO2021/047601

PCT Pub. Date: Mar. 18, 2021

(65) Prior Publication Data

US 2022/0201817 A1 Jun. 23, 2022

(30) Foreign Application Priority Data

Sep. 10, 2019 (CN) ........................ 201910853390.X
Feb. 11, 2020 (CN) ......................... 202010086795.8

(51) Int. Cl.
*H05B 45/10* (2020.01)
*H05B 45/14* (2020.01)
(Continued)

(52) U.S. Cl.
CPC ............. *H05B 45/14* (2020.01); *H05B 45/30* (2020.01); *H05B 45/327* (2020.01); *H05B 45/37* (2020.01)

(58) Field of Classification Search
CPC ........ H05B 45/10; H05B 45/14; H05B 45/30; H05B 45/32; H05B 45/327; H05B 45/37;
(Continued)

(56) References Cited

U.S. PATENT DOCUMENTS 8,319,452 B1 * 11/2012 Hamel ................ H05B 47/155
315/308
9,974,147 B1 * 5/2018 Davis .................. H05B 47/115

FOREIGN PATENT DOCUMENTS

CN 102378438 A 3/2012
CN 103533717 A 1/2014
(Continued)

*Primary Examiner* — Long Nguyen
(74) *Attorney, Agent, or Firm* — Muir Patent Law

(57) ABSTRACT

The present disclosure presents an LED lighting system; and a dimmer, a lighting apparatus, and a dimming control method thereof, wherein the dimmer is configured to adjust an LED lamp. Some features are that power supplying to the LED lamp is through the dimmer, and the dimmer includes an instruction transformation module and a signal combining module. The instruction transformation module is configured to receive a dimming instruction and output a dimming signal based on the received dimming instruction. The signal combining module is coupled to the instruction transformation module and electrically connected to an output terminal of the dimmer, and is configured to based on the dimming signal adjust a power signal generated by the dimmer, in order to output a modulated power signal combining the dimming instruction, wherein an AC component in the waveform of the modulated power signal describes the dimming instruction.

8 Claims, 26 Drawing Sheets

20

(51) Int. Cl.
*H05B 45/30* (2020.01)
*H05B 45/327* (2020.01)
*H05B 45/37* (2020.01)

(58) Field of Classification Search
CPC .... H05B 45/3725; H05B 41/38; H05B 39/04; H05B 39/041
See application file for complete search history.

(56) References Cited

FOREIGN PATENT DOCUMENTS

| | | | |
|---|---|---|---|
| CN | 103763833 | A | 4/2014 |
| CN | 107770918 | A | 3/2018 |
| CN | 109548224 | A | 3/2019 |

* cited by examiner

WF4

WF7

WF8

LED LIGHTING SYSTEM, AND DIMMER, LIGHTING APPARATUS, AND DIMMING CONTROL METHOD THEREOF

TECHNICAL FIELD

The present disclosure relates to the fields of lighting apparatus, and more particularly relates to an LED lighting system, and a dimmer, a lighting apparatus, and a dimming control method thereof.

BACKGROUND

LED lighting technology is rapidly developing to replace traditional incandescent and fluorescent lighting. LED tube lamps are mercury-free in comparison with fluorescent tube lamps that need to be filled with inert gas and mercury. Thus, it is not surprising that various types of LED lamp, such as an LED tube lamp, an LED bulb lamp, an LED filament lamp, a high power LED lamp, an integral LED lamp, etc., are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption. Therefore, when taking into account all factors, they would typically be considered as a cost effective lighting option.

In common solutions for LED lighting, an issue that has been widely discussed is about how to achieve dimming control of the luminance of an LED lamp. In current dimming techniques, a way of performing dimming is to perform phase cutting to adjust the effective value, i.e., root-mean-square (RMS) value, of an input voltage for an LED lamp, in order to achieve the dimming effects. However, because such a common way of dimming control typically significantly affects or interferes with the completeness or accuracy of the waveform of the modulated input voltage, such a way of performing dimming may inevitably cause problems such as lowered lighting efficiency or light-flickering of the LED lamp under this way of dimming control. Another way is to provide a dimming signal, through an independent signal line, to a driving circuit in an LED lamp, causing the driving circuit to adjust the magnitude of an output voltage/current according to the received dimming signal, to further control the luminance of the LED lamp. In an application occasion where multiple LED lamps are involved, employing this way of providing a dimming signal requires disposing a separate signal line for each of the multiple LED lamps to receive a dimming signal, so the complexity of laying out or disposing these LED lamps with the respective signal lines would be greatly increased and thus adverse to realizing dimming control for the multiple LED lamps by this way.

In view of the above issues or problems, description of the present invention and its embodiments are presented as follows.

SUMMARY

A summary description is presented here relating to many embodiments of the present disclosure, wherein the term "the present disclosure" merely refers to certain embodiments (whether recited in the appended claims or not) disclosed herein and is not intended to be a complete description of all possible embodiments. Certain embodiments described below as of each feature or aspect of "the present disclosure" may be combined in various ways to become an LED tube lamp or a part thereof.

Some embodiments according to the present disclosure provide a dimming signal generating module configured to generate a dimming signal based on a received dimming instruction, the dimming signal for providing a way of controlling an LED lamp; and a signal combining processing module configured to combine or synthesize a power signal and the dimming signal to produce an output signal, wherein the power signal comprises a direct current (DC) signal and the output signal is configured for the LED lamp to perform dimming control according to the dimming signal in the output signal.

In one embodiment according to the present disclosure, the signal combining processing module includes a feedback adjusting unit, coupled to the dimming signal generating module and an output terminal of the dimmer, and configured to based on the dimming signal adjust a sample signal obtained from the output terminal and based on the adjusted sample signal output a feedback signal; and a power conversion unit, coupled to the feedback adjusting unit and the output terminal, and configured to based on the feedback signal perform power conversion on the power signal, in order to output the output signal having the synthesized dimming signal.

In one embodiment according to the present disclosure, the feedback adjusting unit includes a sampling circuit, coupled to the output terminal of the dimmer in order to output the sample signal; an adjusting circuit, coupled to the sampling circuit and configured to based on the dimming signal adjust the sample signal; and a comparing circuit, coupled to the sampling circuit, and configured to output the feedback signal based on a signal difference between the adjusted sample signal and a reference signal.

In one embodiment according to the present disclosure, the adjusting circuit includes an impedance element whose impedance is to be adjusted based on the received dimming signal, the impedance element being configured for adjusting the sample signal by variation of its impedance.

In one embodiment according to the present disclosure, the feedback adjusting unit further includes a signal transmission circuit coupled between the comparing circuit and the power conversion unit, the signal transmission circuit being configured for transmitting the feedback signal to the power conversion unit by a way of isolation coupling.

In one embodiment according to the present disclosure, the feedback adjusting unit further includes a reference-signal generating circuit, coupled to the power conversion unit and configured to generate a reference signal based on an electrical signal on the power conversion unit.

In one embodiment according to the present disclosure, the power conversion unit includes a energy conversion circuit, coupled to an output terminal of the dimmer and configured to perform power conversion to output the output signal; a switching circuit, coupled to the energy conversion circuit and configured to be controlled in conducting current or being cut off in order to control performing of power conversion by the energy conversion circuit; and a driving control circuit, coupled to the feedback adjusting unit and a control terminal of the switching circuit, and configured to control current-conducting or being cutoff of the switching circuit based on the feedback signal and by detecting an electrical signal on the energy conversion circuit.

In one embodiment according to the present disclosure, the power conversion unit includes a buck circuit, a boost circuit, or a buck-boost circuit.

In one embodiment according to the present disclosure, the dimmer further includes a rectifying module, coupled to an external AC power source and configured to rectify an AC signal outputted by the external AC power source to produce a rectified signal; and a filtering module, coupled between the rectifying module and the signal combining processing module, and configured to filter the rectified signal to output the power signal for the signal combining processing module.

In one embodiment according to the present disclosure, the dimmer further includes a power factor correction module, coupled between the filtering module and the signal combining processing module and configured to perform power factor correction on the power signal.

In one embodiment according to the present disclosure, the dimming signal is combined or synthesized as a form of a pulse signal onto the power signal so as to form the output signal, wherein any one of a frequency, a duty cycle, and an amplitude of the pulse signal represents a message of luminance indicated by the dimming instruction.

In one embodiment according to the present disclosure, the frequency of the pulse signal is related to a message of luminance indicated by the dimming instruction.

Some embodiments according to the present disclosure provide a driving device for an LED module, having the features that the driving device is connected to an output terminal of a dimmer and includes a signal analyzing module, coupled to an output terminal of the dimmer and configured to analyze an output signal from the output terminal of the dimmer, in order to output a power signal through a first dimming output terminal and to output a dimming control signal through a second dimming output terminal; a signal generating module, coupled to the second dimming output terminal of the signal analyzing module and configured to receive and transform the dimming control signal into a dimming instruction signal; and a power conversion module, coupled to the first dimming output terminal of the signal analyzing module and the signal generating module, and configured to perform power conversion on the power signal based on the dimming instruction signal, in order to adjust power supplying to the LED module.

In one embodiment according to the present disclosure, the signal generating module is configured to output the dimming instruction signal based on any one of a frequency, a duty cycle, and an amplitude of the dimming control signal.

In one embodiment according to the present disclosure, a frequency of the dimming control signal corresponds to a luminance of the LED module.

In one embodiment according to the present disclosure, the signal generating module includes a trigger circuit coupled to the signal analyzing module, and the trigger circuit is configured to trigger outputting of the dimming instruction signal based upon a sharp-changing edge of the dimming control signal.

In one embodiment according to the present disclosure, the signal generating module further includes a signal transformation circuit, coupled between the signal analyzing module and the trigger circuit, and configured to adapt the dimming control signal based on the trigger circuit.

In one embodiment according to the present disclosure, the power conversion module includes an energy conversion circuit, coupled to the first dimming output terminal of the signal analyzing module and configured to perform power conversion to output a driving signal for powering the LED module; a switching circuit, coupled to the energy conversion circuit and configured to be controlled in conducting current or being cut off in order to control performing of power conversion by the energy conversion circuit; and a driving control circuit, coupled to the signal generating module and a control terminal of the switching circuit, and configured to control current-conducting or being cutoff of the switching circuit based on the dimming instruction signal.

Some embodiments according to the present disclosure provide an LED lamp holder, having the feature that the LED lamp holder includes a base containing power-supply wiring configured for connecting to an LED lamp; a connection socket, having slots for receiving corresponding pins of the LED lamp; and a dimmer as described in any one of the above mentioned embodiments, configured in the base and connected to the connection socket.

Some embodiments according to the present disclosure provide a dimming display panel for an LED lamp, having the feature that the dimming display panel includes a user-machine interaction module, configured for receiving operation by a user and generating a dimming instruction based on the user operation; and a dimmer as described in any one of the above mentioned embodiments, coupled to the user-machine interaction module and configured to output an output signal having a synthesized dimming signal based on the dimming instruction.

Some embodiments according to the present disclosure provide an LED lamp, having the feature that the LED lamp includes a driving device as described in any one of the above mentioned embodiments; and an LED module coupled to the driving device.

Some embodiments according to the present disclosure provide an LED lamp system, having the feature that the LED lamp system includes a dimmer as described in any one of the above mentioned embodiments; a driving device as described in any one of the above mentioned embodiments; and an LED module coupled to the driving device.

Some embodiments according to the present disclosure provide a method for performing dimming by a dimmer to adjust an LED lamp, having the feature that the dimming method includes generating a dimming signal based on a dimming instruction; and combining or synthesizing a power signal and the dimming signal to produce an output signal, wherein the power signal comprises a direct current (DC) signal and the output signal is configured for the LED lamp to perform dimming control according to the dimming signal in the output signal.

In one embodiment according to the present disclosure, the step of combining or synthesizing a power signal and the dimming signal to produce an output signal includes based on the dimming signal adjusting a sample signal obtained from an output terminal of the dimmer, and based on the adjusted sample signal outputting a feedback signal; and based on the feedback signal performing power conversion on the power signal, in order to output the output signal having the synthesized dimming signal.

In one embodiment according to the present disclosure, the step of outputting a feedback signal includes outputting a feedback signal based on a signal difference between the adjusted sample signal and a reference signal.

Some embodiments according to the present disclosure provide a method for performing dimming on an LED module, having the features that the dimming method is for a driving device to perform dimming, through a received output signal, on an LED module coupled to the driving device, and the dimming method includes analyzing the output signal, in order to output a power signal and a dimming control signal respectively; transforming the dimming control signal into a dimming instruction signal; and performing power conversion on the power signal based on the dimming instruction signal, in order to adjust power supplying to the LED module.

In one embodiment according to the present disclosure, one of a frequency, a pulse width, and an amplitude of the dimming control signal corresponds to a luminance of the LED module.

In one embodiment according to the present disclosure, a frequency of the dimming control signal corresponds to a luminance of the LED module.

In one embodiment according to the present disclosure, the step of transforming the dimming control signal into a dimming instruction signal includes triggering outputting of the dimming instruction signal based upon a sharp-changing edge of the dimming control signal.

In one embodiment according to the present disclosure, the step of performing power conversion on the power signal based on the dimming instruction signal includes controlling current-conducting or being cutoff of a switching circuit in a power conversion module connected to the LED module, based on the dimming instruction signal, in order to change a luminance of the LED module.

Some embodiments according to the present disclosure provide a dimmer for adjusting an LED lamp, having the feature that power supplying to the LED lamp is through the dimmer and the dimmer includes an instruction transformation module, configured to receive a dimming instruction and output a dimming signal based on the received dimming instruction; and a signal combining module, coupled to the instruction transformation module and electrically connected to an output terminal of the dimmer, and configured to based on the dimming signal adjust a power signal generated by the dimmer, in order to output a modulated power signal combining the dimming instruction, wherein an alternating-current (AC) component in the waveform of the modulated power signal describes the dimming instruction.

In one embodiment according to the present disclosure, the signal combining module includes a signal generating circuit, electrically connected to the instruction transformation module and configured to receive the dimming signal and according to the dimming signal determine whether to adjust a voltage on a power output terminal; a feedback adjusting circuit, electrically connected to the signal generating circuit, and configured to generate a feedback signal according to a sample signal; and a power conversion circuit electrically connected to the feedback adjusting circuit, and configured to receive the feedback signal and according to the feedback signal adjust the voltage on the power output terminal.

In one embodiment according to the present disclosure, the sample signal is the voltage or a division thereof on the power output terminal.

In one embodiment according to the present disclosure, the feedback adjusting circuit includes a sampling circuit, electrically connected to the power output terminal and configured to sample a voltage on the power output terminal in order to generate the sample signal; and the signal generating circuit is configured to adjust impedance of the sampling circuit.

In one embodiment according to the present disclosure, the power conversion circuit includes an energy conversion circuit, electrically connected to the power output terminal and configured to perform power conversion; a switching circuit, electrically connected to the energy conversion circuit and configured to conduct current or be cut off according to a control signal, in order to control performing of power conversion by the energy conversion circuit; and a switching control circuit, configured to generate the control signal according to the feedback signal.

In one embodiment according to the present disclosure, the power conversion circuit comprises: a buck circuit, a boost circuit, or a buck-boost circuit.

In one embodiment according to the present disclosure, the signal combining module includes a power conversion circuit, configured to perform power conversion on a received power signal, in order to generate a stable voltage signal; and a signal combining processing module, electrically connected to the power conversion circuit, and configured to receive the voltage signal and according to the dimming signal adjust the voltage signal, in order to generate a modulated voltage signal, the modulated voltage signal including a dimming message.

In one embodiment according to the present disclosure, the signal combining processing module has a first transmission path and a second transmission path, and a circuit impedance on the first transmission path is larger than a circuit impedance on the second transmission path.

In one embodiment according to the present disclosure, when the dimming signal has a low voltage level, the first transmission path conducts current; and when the dimming signal has a high voltage level, the second transmission path conducts current.

In one embodiment according to the present disclosure, the dimming signal is a pulse signal and any one of a frequency, a duty cycle, and an amplitude of the pulse signal corresponds to a dimming message in the dimming instruction.

In one embodiment according to the present disclosure, the frequency of the pulse signal corresponds to a message of luminance in the dimming instruction.

Some embodiments according to the present disclosure provide a power adaptor, including a dimmer as described in any one of the above mentioned embodiments; and a signal adjusting module, electrically connected to an external power input terminal and configured to receive an external power signal. And the signal adjusting module includes a rectifying circuit, electrically connected to the external power input terminal and configured to perform rectifying operation on the external power signal in order to produce a rectified signal; and a filtering circuit, electrically connected to the rectifying circuit and the signal combining processing module, and configured to receive and perform filtering on the rectified signal, in order to produce a filtered signal.

In one embodiment according to the present disclosure, the power adaptor further includes a power factor correction circuit, electrically connected to the filtering circuit and configured to increase the power factor of the filtered signal.

Some embodiments according to the present disclosure provide a driving device for an LED module, having the features that the driving device is connected to the LED module and an output terminal of a dimmer, and the driving device includes a demodulating module, electrically connected to the output terminal of the dimmer and configured to perform a demodulating process on a signal received from the dimmer, in order to obtain a dimming instruction signal, wherein a waveform of the signal received from the dimmer describes a dimming instruction; and a driving circuit, electrically connected to the demodulating module, and configured to adjust power supplying to the LED module based on the dimming instruction signal.

In one embodiment according to the present disclosure, the demodulating module includes a sampling circuit, electrically connected to the output terminal of the dimmer and configured to sample/obtain a message of luminance from the signal received from the dimmer and to generate a luminance instruction signal; and a signal transformation circuit, configured to transform the luminance instruction signal into a dimming control signal.

In one embodiment according to the present disclosure, a frequency, a pulse width, or an amplitude of the luminance instruction signal indicates the message of luminance.

In one embodiment according to the present disclosure, the frequency of the luminance instruction signal indicates the message of luminance.

In one embodiment according to the present disclosure, a frequency of the luminance instruction signal corresponds to that of the dimming control signal.

In one embodiment according to the present disclosure, the dimming control signal is a pulse signal having a constant pulse width determined by internal components of the driving device.

Some embodiments according to the present disclosure provide an LED lamp, having the feature that the LED lamp includes a driving device as described in any one of the above mentioned embodiments; and an LED module electrically connected to the driving device.

Some embodiments according to the present disclosure provide an LED lamp system, having the feature that the LED lamp system includes a dimmer as described in any one of the above mentioned embodiments; a driving device as described in any one of the above mentioned embodiments; and an LED module electrically connected to the driving device.

Some embodiments according to the present disclosure provide a method for performing dimming by a dimmer to adjust an LED lamp, having the feature that power supplying to the LED lamp is through the dimmer and the dimming method includes based on a dimming instruction adjusting a power signal outputted by the dimmer and outputting a dimming signal; and based on the dimming signal adjusting the power signal to output an adjusted power signal combining the dimming signal to the LED lamp, wherein a waveform of the adjusted power signal describes the dimming instruction.

Some embodiments according to the present disclosure provide a method for performing dimming on an LED module, having the features that dimming is to be performed on the LED module by a received power signal and the dimming method includes analyzing a waveform of the power signal and outputting a corresponding dimming instruction signal, wherein the waveform of the power signal describes a dimming instruction; and based on the dimming instruction signal adjusting power supplying to the LED module.

Some embodiments according to the present disclosure provide an LED lighting system, having the feature that the LED lighting system includes a dimmer, electrically connected to an external power supply and configured to according to a dimming instruction modulate a power signal of the external power supply to produce a modulated power signal carrying a dimming message; and an LED lighting apparatus, electrically connected to the dimmer and configured to receive the modulated power signal and perform dimming according to the dimming message in the modulated power signal.

In one embodiment according to the present disclosure, the power signal is of an AC main and the dimmer is configured to perform phase cutting to the power signal in order to produce the modulated power signal.

In one embodiment according to the present disclosure, a phase-cut angle of the performed phase cutting is smaller than 90 degrees or 45 degrees.

In one embodiment according to the present disclosure, the dimmer includes a power conversion circuit, electrically connected to the external power supply, configured to perform power conversion on the power signal and to produce a DC power signal, and configured to change an amplitude of the DC power signal according to the dimming instruction.

DETAILED DESCRIPTION

Figure 1A:
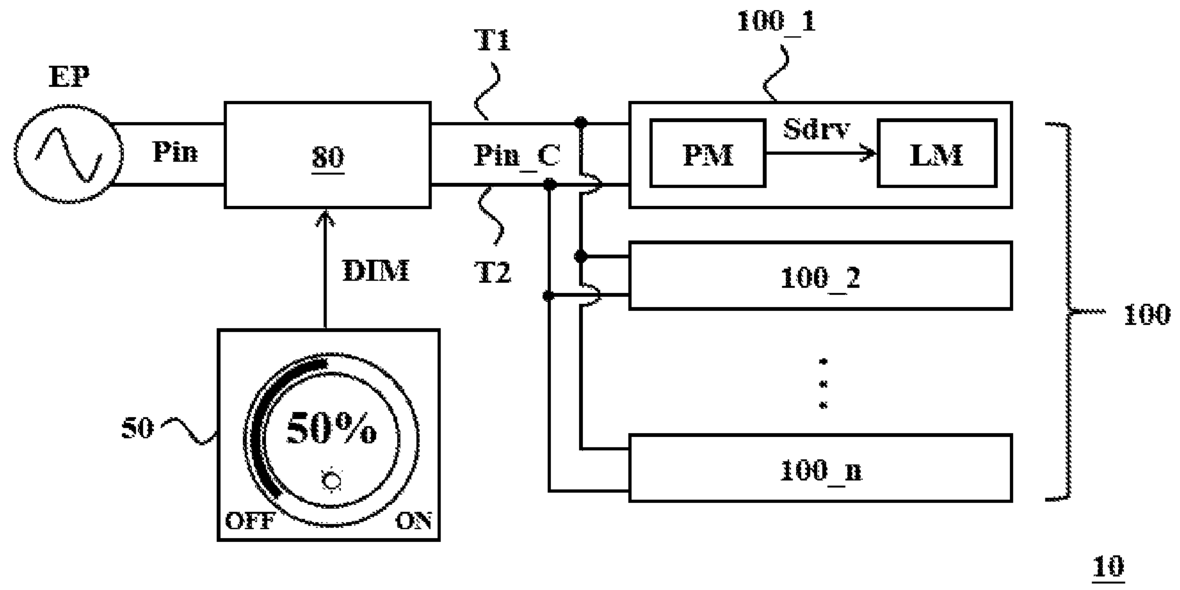
FIG. 1A and FIG. 1B are diagrams of functional modules of an LED lighting system according to some embodiments of the present disclosure.

The present disclosure presents an LED lighting system, and a dimmer, a lighting apparatus, and a dimming control method thereof, for resolving the issues or problems mentioned herein and above in the Background section.

The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct connection (i.e., touching) unless the context indicates otherwise.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Terms such as "transistor", used herein may include, for example, a field-effect transistor (FET) of any appropriate type such as N-type metal-oxide-semiconductor field-effect transistor (MOSFET), P-type MOSFET, GaN FET, SiC FET, bipolar junction transistor (BJT), Darlington BJT, heterojunction bipolar transistor (HBT), etc.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, etc. As such, directly electrically connected components do not include components electrically connected through active elements, such as transistors or diodes, or through capacitors. Directly electrically connected elements may be directly physically connected and directly electrically connected.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Embodiments may be described, and illustrated in the drawings, in terms of functional blocks, units and/or modules. Those skilled in the art will appreciate that these blocks, units and/or modules are physically implemented by electronic (or optical) circuits such as logic circuits, discrete components, analog circuits, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules. Further, the blocks, units and/or modules of the various embodiments may be physically combined into more complex blocks, units and/or modules.

If any terms in this application conflict with terms used in any application(s) from which this application claims priority, or terms incorporated by reference into this application or the application(s) from which this application claims priority, a construction based on the terms as used or defined in this application should be applied.

It should be noted that, the following description of various embodiments of the present disclosure is described herein in order to clearly illustrate the inventive features of the present disclosure. However, it is not intended that various embodiments can only be implemented alone. Rather, it is contemplated that various of the different embodiments can be and are intended to be used together in a final product, and can be combined in various ways to achieve various final products. Thus, people having ordinary skill in the art may combine the possible embodiments together or replace the components/modules between the different embodiments according to design requirements. The embodiments taught herein are not limited to the form described in the following examples, any possible replacement and arrangement between the various embodiments are included.

FIG. 1A is a block diagram of an LED lighting system according to an embodiment of the disclosure. Referring to FIG. 1A, the LED lighting system 10 includes a dimmer 80 and an LED lighting apparatus 100 including a power supply module PM and an LED module LM. The term "power supply module" mentioned herein may be otherwise referred to as a power module.

In the LED lighting system 10 of FIG. 1A, an input terminal or input terminals of the dimmer 80 are electrically connected to an external power grid or power supply EP, in order to receive input power Pin (also can be referred to input power signal Pin) from the external power grid EP. Output terminals of the dimmer 80 are electrically connected to the LED lighting apparatus 100 through first and second connection terminals T1 and T2 of the LED lighting apparatus 100, in order to transmit/provide a modulated power signal Pin_C resulting from a dimming process to the LED lighting apparatus 100. Accordingly, the external power grid EP is electrically connected to the LED lighting apparatus 100 through the dimmer 80, in order to provide power for the LED lighting apparatus 100 to use. The input power Pin or modulated power signal Pin_C may be AC power source; may refer to at least one of input voltage, input current, or rate of inputting electrical energy; and may be referred to as modulated power signal Pin or Pin_C hereinafter. The external power grid or power supply EP may be an AC main or an electrical ballast. Also, in the LED lighting system 10 of FIG. 1A, a power loop formed between the external power grid EP and the LED lighting apparatus 100 may be regarded or defined as comprising the power line for the LED lighting system 10 or the LED lighting apparatus 100.

The LED lighting apparatus 100 may comprise one or more LED lighting apparatuses 100_1 to **100_*n*, where n is a positive integer larger than or equal to 1, and the LED lighting apparatuses 100_1 to 100_*n* each have a configuration similar to or the same as that of each other LED lighting apparatus. The LED lighting apparatuses 100_1 is taken as a representative example in the following description of electrical connection relationships of an LED lighting apparatus 100 in an LED lighting system 10. An LED lighting apparatuses 100_1 is configured to receive a modulated power signal Pin_C through its first and second connection terminals T1 and T2, and the power supply module PM is configured to generate a driving power signal Sdrv, based on the received modulated power signal Pin_C, for the LED module LM, in order for the LED module LM to light up in response to the driving power signal Sdrv. In an embodiment where multiple LED lighting apparatuses 100_1 to 100_*n* are involved, where n is larger than or equal to 2, the LED lighting apparatuses 100_1 to 100_*n* may be connected in parallel, that is, a first connection terminal T1 common to the LED lighting apparatuses 100_1 to 100_*n* electrically connects together the LED lighting apparatuses 100_1 to 100_*n*, and a second connection terminal T2 common to the LED lighting apparatuses 100_1 to 100_*n* electrically connects together the LED lighting apparatuses 100_1 to 100_*n***. In other embodiments, a driving power signal Sdry may be referred to as a driving signal.

the LED lighting apparatus 100 may comprise or be any of various types of LED lamps driven by AC power, such as LED spotlight, LED downlight, LED bulb lamp/light, LED track light, LED panel light, LED ceiling light, LED tube lamp/light, or LED filament lamp/light, but the present invention is not limited to any of these types. In some embodiments the LED lighting apparatus 100 comprises an LED tube lamp, which may be an internal-driver type of LED tube lamp such as a ballast-compatible type (i.e., Type-A) LED tube lamp or a ballast-bypass type (i.e., Type-B) LED tube lamp, which may work with a lamp socket including a ballast to be bypassed.

From the perspective of overall operation of the LED lighting system 10, the dimmer 80 is configured to perform a dimming process on the received input power Pin according to a dimming instruction DIM for dimming, and configured to generate a modulated power signal Pin_C resulting from the dimming process (also referred to herein for convenience as a dimmer-adjusted input power Pin_C). By a control interface 50 (not illustrated) a user can cause a suitable dimming instruction DIM to be provided to the dimmer 80. The control interface 50 may comprise or be implemented by various structures such as a switch, a knob, a touch control panel, or a wireless signal receiver, but the present invention is not limited to any of these structures. Also, according to the chosen way to perform dimming, the dimming process may be directed to changing or adjusting any signal feature of the input power Pin, such as its phase conduction angle, frequency, amplitude, phase, or any combination thereof. The dimmer 80 includes at least one controllable electronic component, such as a bidirectional triode thyristor (or TRIAC), a single-chip microcomputer, or a transistor, electrically coupled or connected to a main power line or which can affect the current/voltage on the main power line. And the controllable electronic component may be configured to adjust a chosen signal feature of the input power Pin in response to the dimming instruction DIM, in order to transform the received input power Pin into a modulated power signal Pin_C resulting from the adjusting. In some cases, such as where the dimmer 80 is set to NOT cause dimming of the light, the dimmer-adjusted input power Pin_C may be the same as the input power Pin.

When the LED lighting apparatus 100 receives a modulated power signal Pin_C, in one aspect the power supply module PM then transforms the received modulated power signal Pin_C into a stable driving power Sdry for the LED module LM to use, and in another aspect the power supply module PM may generate a driving power signal Sdry in the form of voltage (referred to as driving voltage), current (referred to as driving current), and/or pulse width corresponding to or based on the signal feature of the received modulated power signal Pin_C. Upon the driving power Sdry being generated, the LED module LM is configured to light up or emit light in response to the driving power Sdrv. The luminance or brightness of the LED module LM is related to the magnitude of the driving voltage, driving current, and/or pulse width of the driving power signal Sdrv, which is/are adjusted based on the signal feature of the received modulated power signal Pin_C, and the signal feature of the received modulated power signal Pin_C is controlled by the dimming instruction DIM. Therefore, the dimming instruction DIM is directly related to the luminance or brightness of the LED module LM. The signal processing involved in the operation of the power supply module PM for converting the received modulated power signal Pin_C into the driving power signal Sdry includes, but is not limited to, electrical rectification, electrical filtering, and DC-to-DC conversion. Some description is presented below of some embodiments of performing these steps for generating the driving power Sdrv.

Under a configuration of one embodiment where a modulated power signal Pin_C is concurrently provided to every one of multiple LED lighting apparatuses **100_1-100_*n*, where n is larger than or equal to 2, which are then concurrently caused to light up. So, in some embodiments, when a dimming instruction DIM is applied or adjusted, the luminance respectively of the LED lighting apparatuses 100_1-100_*n* are then concurrently caused to change. Since the dimming control of the LED lighting system 10 of FIG. can be implemented by adjusting or modulating a signal feature of the input power Pin, a separate signal line connected to each of the LED lighting apparatuses 100_1-100_*n* and for receiving a dimming signal is not needed, thus greatly simplifying the layout of electrical wiring(s) between included elements and reducing complexity of installations thereof for control of a plurality of LED lighting apparatuses in the application environment of the LED lighting system 20**.

Specifically, there are various applicable ways to implement dimming control by adjusting a signal feature of the input power Pin. A common way is to vary or adjust the effective or RMS (root-mean-square) value of the input power signal Pin by adjusting the phase conduction angle of the input power signal Pin, in order to adjust the magnitude of the driving power Sdrv.

Figure 14:
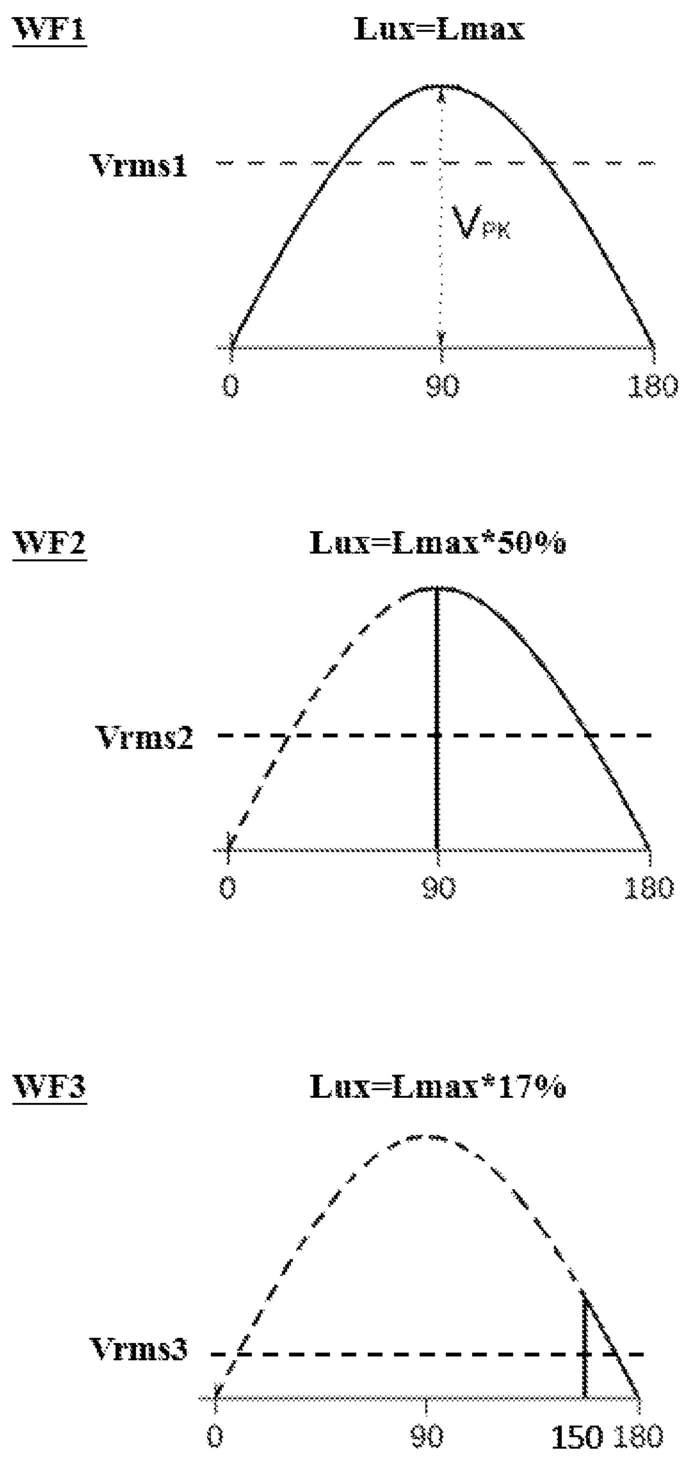
FIG. 14 is a signal waveform diagram of signal waveforms illustrating dimming in an LED lighting system according to some embodiments of the present disclosure.

A description follows of a method of dimming control and corresponding circuit operations in such a common way with reference to FIGS. 1A and 14, wherein FIG. 14 is a signal waveform diagram of signal waveforms illustrating dimming or adjusting of brightness/luminance in a lighting system of an LED lighting apparatus. Referring to FIGS. 1A and 14, in the description of the present embodiment, the external power grid EP is assumed to provide AC power as the input power Pin for example, and the signal waveforms of FIG. 14 illustrate voltage waveforms for a (positive) half cycle of the input power Pin having an amplitude VPK for example. In FIG. 14, the signal waveforms from top to bottom are respectively voltage waveforms WF1, WF2, and WF3 corresponding to three different dimming control states or situations of the luminance Lux (of the LED lighting apparatus 100 of FIG. 1A) being at its maximum Lmax, being at 50% of its maximum Lmax, and being at 17% of its maximum Lmax, respectively. In these embodiments of FIG. 14, the dimmer 80 of FIG. 1A may be configured to adjust the phase-cut angle (or phase conduction angle) of the input power Pin by controlling the current conduction or cutoff state of the controllable electronic component/element electrically connected on the power line in series. For example, in order to modulate the input power Pin to have a phase-cut angle of 90 degrees, the dimmer of FIG. 1A may be configured to cut off the controllable electronic component/element at or within ¼ cycle of the input power signal Pin and then maintain or keep the controllable electronic component/element at the current conduction state for the rest of the half cycle of the input power signal Pin. In this way, for the half cycle of the input power signal Pin, the resulting voltage waveform has a value of zero for the phase angle of 0-90 degrees of the input power signal Pin and then has part of a sinusoidal waveform following that for the phase angle of 90-180 degrees of the input power signal Pin, but the invention is not limited to the forward phase-cut (i.e., the leading-edge dimming control). Accordingly, the input power signal Pin undergoes the cutting off of phase angle performed by the dimmer 80 to produce or result in the modulated power signal Pin_C with a phase conduction angle of 90 degrees. There are other embodiments of modulating the input power signal Pin to have a phase-cut angle that have principles similar to the described principle of this example.

Respecting the voltage waveform WF1 of FIG. 14 first, when the dimmer 80 in response to the dimming signal Sdim modulates the input power Pin to have a phase-cut angle of 0 degree, meaning the input power Pin has a phase conduction angle of 180 degrees, the dimmer 80 directly provides or reproduces the input power signal Pin to the LED lighting apparatus 100 of FIG. 1A, so the input power signal Pin_C is the same as or corresponds to the input power signal Pin. In this case, assuming the effective value of the input power signal Pin_C to be Vrms1, the power supply module PM of FIG. 1A then generates a corresponding driving power Sdrv, based on the input power signal Pin_C of the effective value Vrms1, in order to drive the LED module LM of FIG. 1A so that the luminance Lux of the LED module LM is at its maximum level Lmax.

Respecting the voltage waveform WF2 of FIG. 14, when the dimmer 80 in response to the dimming signal Sdim modulates the input power Pin to have a phase-cut angle of 90 degrees, meaning the input power Pin has a phase conduction angle of 90 degrees, the dimmer 80 cuts off the power line for the phase angle of 0-90 degrees of the input power signal Pin and then causes current conduction through the power line for the phase angle of 90-180 degrees of the input power signal Pin. In this case, the effective value of the input power signal Pin_C is smaller than the effective value Vrms1 and assumed to be Vrms2, and the input power signal Pin_C of the effective value Vrms2 causes the luminance Lux of the LED module LM to be at 50% of its maximum level Lmax.

Next respecting the voltage waveform WF3 of FIG. 14, when the dimmer 80 in response to the dimming signal Sdim modulates the input power Pin to have a phase-cut angle of 150 degrees, meaning the input power Pin has a phase conduction angle of 30 degrees, the dimmer 80 cuts off the power line for the phase angle of 0-150 degrees of the input power signal Pin and then causes current conduction through the power line for the phase angle of 150-180 degrees of the input power signal Pin. In this case, the effective value of the input power signal Pin_C is smaller than the effective value Vrms2 and assumed to be Vrms3, and the input power signal Pin_C of the effective value Vrms3 causes the luminance Lux of the LED module LM to be at 17% of its maximum level Lmax.

According to the dimming method described above with reference to FIGS. 1A and 14, by modulating the input power signal Pin to have a phase-cut angle or a phase conduction angle the dimmer 80 of FIG. 1A can cause corresponding variation in the effective value of the input power signal Pin_C, which may be varied to be e.g. Vrms1, Vrms2, or Vrms3. In practice, the caused variation in the effective value of the input power signal Pin_C is typically in positive correlation with the variation in its phase conduction angle, that is, the larger the phase conduction angle of the input power signal Pin_C the larger its effective value. Accordingly, the caused variation in the effective value of the input power signal Pin_C is typically in negative correlation with the variation in its phase-cut angle. Thus, the described common way of dimming control realizes the function of dimming control by adjusting the effective value of the input power signal Pin. An advantage of this common way is that because the generated driving power Sdry varies directly corresponding to the variation in the effective value of the input power signal Pin_C, original hardware structures or parts of a regular LED lighting apparatus 100 need not be retrofitted or adapted for realizing dimming control, for which purpose mainly adding a dimmer 80 is needed in an LED lighting system.

More specifically, in the common way of implementing dimming control, in order to cause a sufficient variation in the effective value of the input power signal Pin_C for tuning the luminance/brightness of the LED module, the dimmer 80 must adjust or modulate the phase-cut angle (or the phase conduction angle) in a relatively wide range to adjust the effective value of the input power signal Pin_C. The relatively wide range of the phase-cut angle can be, for example, from 0 degree to 180 degrees. However, when the phase conduction angle of the modulated power signal Pin_C is small to a degree, the operating power supply module PM might be negatively impacted by significant effects of characteristics such as total harmonic distortion (THD) and power factor (PF) such that the power conversion efficiency of the power supply module PM is significantly small or reduced, which may even cause the problem of light-flickering of the LED module LM. So, under this common way of the dimming control, it's hard to improve the power conversion efficiency of the power supply module PM, due to such limitations of the dimmer 80.

In another aspect, since the effective value of the modulated power signal Pin_C is directly affected by the magnitude of the amplitude VPK, a dimmer 80 using the described common way of realizing dimming control may not be compatible with various voltage specifications of standard power grids, such as AC voltage specifications of 120V, 230V, and 277V. Therefore a designer likely needs to adjust parameters or hardware designs according to the application environment of an LED lighting system 10, which will increase the overall production cost of products of the LED lighting system 10.

In response to the above problems, the present disclosure presents a new dimming control method, and an LED lighting system and an LED lighting apparatus using the same. Each of the LED lighting system and LED lighting apparatus is configured to receive a dimmer-adjusted signal (also can be referred to modulated signal) produced by varying the phase-cut angle or phase conduction angle of the input power Pin, then to obtain actual dimming message by demodulating the dimmer-adjusted signal, and then according to the obtained dimming message to control circuit operation(s) of the power supply module PM to generate the driving power Sdrv. Since variation of the phase-cut angle or phase conduction angle is intended for merely carrying the dimming message corresponding to a dimming instruction DIM, but not for directly adjusting the effective value of the modulated power signal Pin_C, the dimmer 80 may vary the phase-cut angle or phase conduction angle of the input power Pin within a relatively small phase angle/range so as to cause a relatively small difference between effective values respectively of the dimmer-adjusted input power signal Pin_C and the input power Pin provided by the external power grid EP. By this way of dimming control, no matter under what luminance state, the phase conduction angle of the input power Pin will be similar to that of the modulated power signal Pin_C, and therefore the characteristics of total harmonic distortion (THD) and power factor (PF) can be maintained/controlled, meaning the power conversion efficiency of the power supply module PM may not be inhibited or hindered by the dimmer 80. Further explanations of relevant structures and operations of the dimming control method and corresponding LED lighting apparatus/system taught by the disclosure are presented below.

Figure 6A:
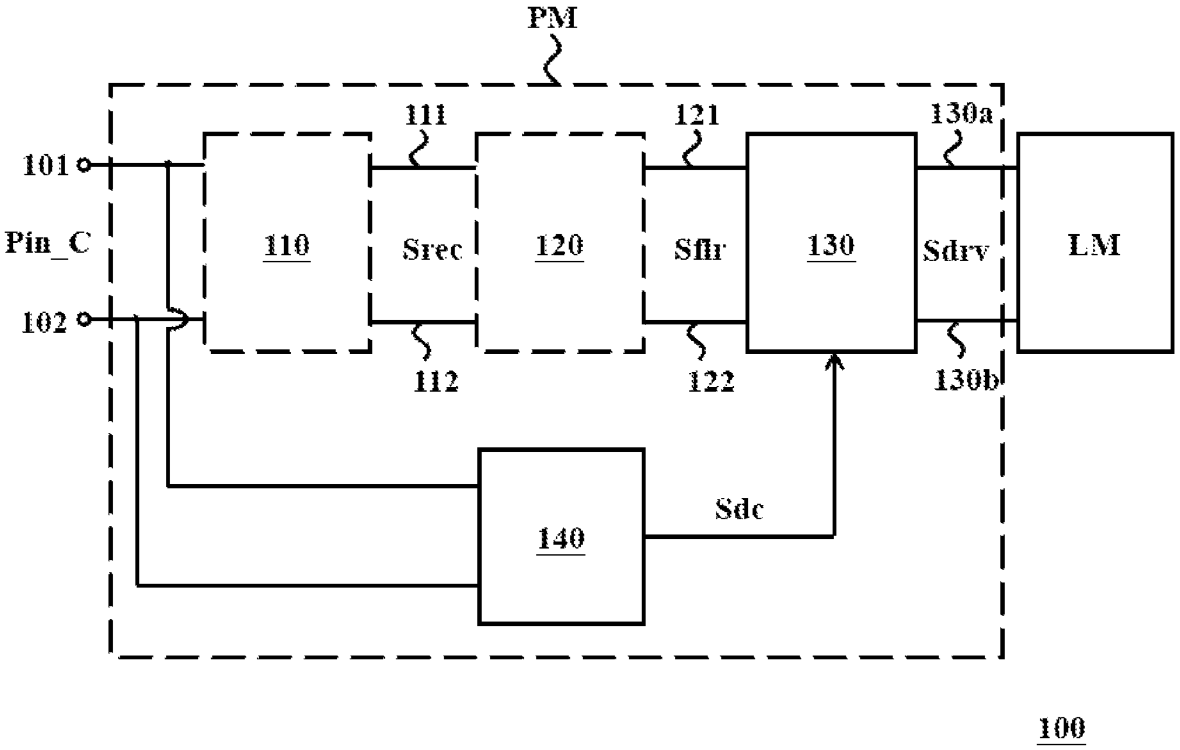
FIG. 6A and FIG. 6B are diagrams of functional modules of an LED lighting apparatus according to some embodiments of the present disclosure.
Figure 6B:
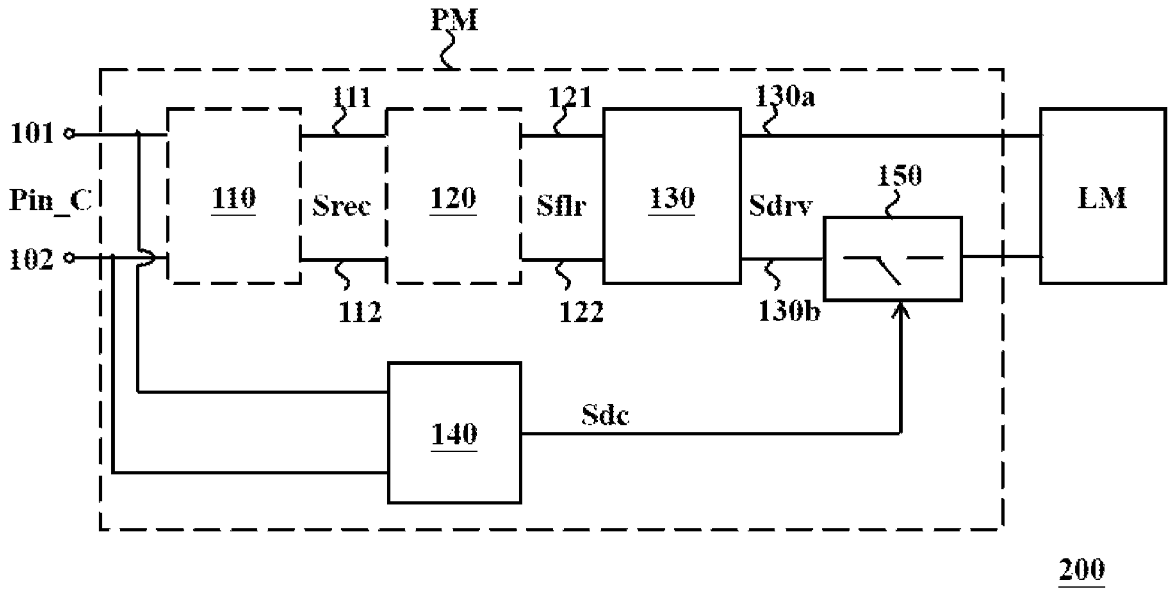

FIGS. 6A and 6B are functional-module diagrams of an LED lighting apparatus according to some embodiments of the disclosure. Referring to FIG. 6A, the LED lighting apparatus 100 may be applied in the LED lighting system 10 or 20 of FIGS. 1A and 1B. The LED lighting apparatus 100 includes a power supply module PM and an LED module LM, wherein the power supply module PM includes a rectifying circuit 110, a filtering circuit 120, a driving circuit 130, and a demodulating circuit 140.

The rectifying circuit 110 has first and second connection terminals 101 and 102 electrically connected to first and second power output terminals T1 and T2 respectively, in order to receive and rectify a modulated power signal Pin_C and then output a rectified signal Srec through first and second rectifying output terminals 111 and 112. The modulated power signal Pin_C may be or comprise an AC signal or DC signal, either type of signal can be compatible with designed operations of the LED lighting apparatus 200. When the LED lighting apparatus 200 is designed to light based on an input DC signal, the rectifying circuit 110 in the power supply module PM may be omitted. When the rectifying circuit 110 is omitted, the first and second connection terminals 101 and 102 would be directly electrically connected to input terminal(s) of the filtering circuit 120, which would be the first and second rectifying output terminals 111 and 112 if the rectifying circuit 110 were present. In various embodiments, the rectifying circuit 110 may comprise a full-wave rectifying circuit, a half-wave rectifying circuit, a bridge-type rectifying circuit, or other type of rectifying circuit, and the disclosed invention is not limited to any of these types.

The filtering circuit 120 is electrically connected to the rectifying circuit 110, in order to electrically filter the rectified signal Srec, wherein input terminals of the filtering circuit 120 are coupled to the first and second rectifying output terminals 111 and 112 in order to receive and then electrically filter the rectified signal Srec. A resulting filtered signal Sflr is output at first and second filtering output terminals 121 and 122. It's noted that the first rectifying output terminal 111 may be regarded as the first filtering output terminal 121 and the second rectifying output terminal 112 may be regarded as the second filtering output terminal 222. In certain embodiments, the filtering circuit 120 can filter out ripples of the rectified signal Srec, causing the waveform of the filtered signal Sflr to be smoother than that of the rectified signal Srec. In addition, circuit configurations of the filtering circuit 120 may be designed so as to filter as to a specific frequency, for example, to filter out circuit response to a specific frequency of an input external driving signal. In some embodiments, the filtering circuit 120 is a circuit comprising at least one of a resistor, a capacitor, or an inductor, such as a parallel-connected capacitor filter or a pi-shape filter, but the invention is not limited to any of these types of filtering circuit. As is well known, a pi-shape filter looks like the symbol it in its shape of circuit schematic.

The driving circuit 130 is electrically connected to the filtering circuit 120, in order to receive, and then perform power conversion on, the filtered signal Sflr, to produce a driving power signal Sdrv, wherein input terminals of the driving circuit 130 are coupled to the first and second filtering output terminals 121 and 122 in order to receive the filtered signal Sflr and then produce the driving power signal Sdry for driving the LED module LM to emit light. It's noted that the first filtering output terminal 121 may be regarded as a first driving output terminal 130*a* of the driving circuit 130 and the second filtering output terminal 122 may be regarded as a second driving output terminal 130*b* of the driving circuit 130. The driving power signal Sdry produced by the driving circuit 230 is then provided to the LED module LM through the first driving output terminal 130*a* and second driving output terminal 130*b*, to cause the LED module LM to light up in response to the received driving power signal Sdrv. A driving circuit 130 in the embodiment(s) may be a power conversion circuit including a switching control circuit and a conversion circuit, whose specific embodiments of configurations may be understood by referring to the descriptions herein with reference to FIGS. 4A and 4B and thus are not described in detail again.

The demodulating circuit 140 has an input terminal electrically connected to the first and second connection terminals 101 and 102 in order to receive a modulated power signal Pin_C, and has an output terminal electrically connected to the driving circuit 130 in order to provide a dimming control signal Sdc. The demodulating circuit 140 is configured to perform analysis or demodulation on the modulated power signal Pin_C to obtain/produce a message of luminance, and is configured to produce a corresponding dimming control signal Sdc according to the message of luminance, wherein the driving circuit 130 is configured to adjust the magnitude of an output driving power signal Sdry according to the dimming control signal Sdc. For example, in the driving circuit 130, a switching control circuit (as that denoted by 72) may be configured to adjust a duty cycle of a power switch PSW according to a dimming control signal Sdc, in order to improve or reduce a driving power signal Sdry in response to a message of luminance indicated by the dimming control signal Sdc. When a dimming control signal Sdc indicates a relatively large lighting luminance or color temperature, the switching control circuit may increase a duty cycle of the power switch PSW based on the dimming control signal Sdc, to further cause an energy conversion circuit ESE to output a relatively large driving power signal Sdry for an LED module LM. In contrast, when a dimming control signal Sdc indicates a relatively small lighting luminance or color temperature, the switching control circuit may reduce a duty cycle of the power switch PSW based on the dimming control signal Sdc, to further cause the energy conversion circuit ESE to output a relatively small driving power signal Sdry for the LED module LM. By this method, effects of dimming control may be realized.

In some embodiments, dimming control may be performed on an LED module LM through controlling a circuit other than a driving circuit 130. For example, referring to FIG. 6B, in a power module 200 in FIG. 6B, the act of producing a driving power based on a modulated power and the act of demodulating on a modulated power to produce a dimming message are both similar to those in the embodiment(s) of FIG. 6A, with a difference that in the embodiment(s) of FIG. 6B, a power module PM further includes a dimming switch 150. The dimming switch 150 is configured to conduct current or be cut off, according to a dimming control signal Sdc, in order to produce an intermittent driving power signal Sdry for an LED module LM, for performing dimming on the LED module LM. In some embodiments, a dimming control signal Sdc produced by the demodulating circuit 140 may be a signal in a form based on pulse-width modulation (PWM), thereby controlling/causing intermittent conducting by the dimming switch 150, in order to realize dimming effects based on PWM.

Figure 6C:
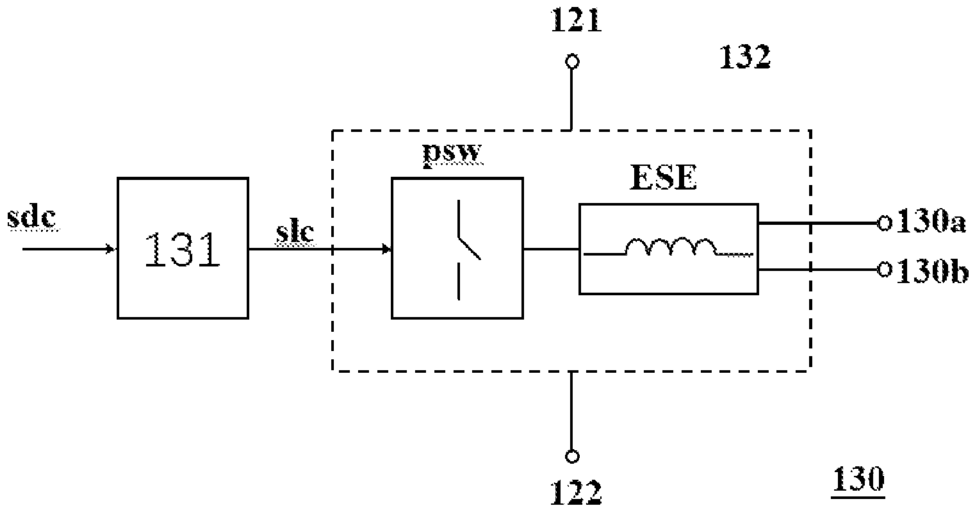
FIG. 6C is a diagram of functional modules of a driving circuit according to some embodiments of the present disclosure.

FIG. 6C is a circuit block diagram of a driving circuit according to an embodiment of the disclosure. With reference to both FIGS. 6A and 6C, a driving circuit 130 of FIG. 6C is an embodiment of the driving circuit 130 of FIG. 6A, and includes a switching control circuit 131 and a conversion circuit 132 for power conversion based on a current source, for driving the LED module LM to emit light. The conversion circuit 132 includes a switching circuit PSW (also known as a power switch) and an energy storage circuit ESE. The conversion circuit 132 is coupled to the first and second filtering output terminals 121 and 122 in order to receive and then convert the filtered signal Sflr, under the control by the switching control circuit 131, into a driving power signal Sdry output at the first and second driving output terminals 130*a* and 130*b* for driving the LED module LM. Under the control by the switching control circuit 131, the driving power output by the conversion circuit 132 comprises a steady current, making the LED module LM emit steady light. Further, the driving circuit 130 may include a bias circuit 133 (not shown in FIG. 6C), which may be configured to generate a working voltage Vcc based on a power line voltage of the power supply module PM and to be used by the switching control circuit 131, for the switching control circuit 131 to be activated and operate in response to the working voltage Vcc.

The switching control circuit 131 in this embodiment of FIG. 6C is configured to perform real-time regulation or adjusting of the duty cycle of a lighting control signal Slc according to current operational states of the LED module LM, in order to conduct or cut off the switching circuit PSW according to or in response to the lighting control signal Slc. The switching control circuit 131 can determine or judge a current operational state of the LED module LM by detecting one or more of an input voltage (such as a voltage level on the first connection terminal 101 or the second connection terminal 102, on the first rectifying output terminal 111, or on the first filtering output terminal 131), an output voltage (such as a voltage level on the first driving output terminal 231), an input current (such as a current on the input power line or flowing through the rectifying output terminal 111/112 and the filtering output terminal 121/122), and an output current (such as a current flowing through the driving output terminal 130*a*/130*b* or energy storage circuit ESE or the switching circuit PSW). The energy storage circuit ESE is configured to alternate or switch its operation between being charged with energy and discharging energy, according to the state of the switching circuit PSW being conducted or cut off, in order to maintain or make the driving power signal Sdrv received by the LED module LM be stably above a predefined current value Ipred.

A demodulating module 140 has input terminals electrically connected to the first and second connection terminals 101 and 102 in order to receive a modulated power signal Pin_C, and has output terminal electrically connected to the driving circuit 130 in order to provide a dimming control signal Sdc to the driving circuit 130. The demodulating module 140 is configured to generate the dimming control signal Sdc according to the magnitude of the phase-cut angle or conduction phase angle applied for each cycle or half-cycle of the modulated power signal Pin_C, wherein the switching control circuit 131 is configured to adjust its output of the lighting control signal Slc according to the dimming control signal Sdc so as to cause the driving power signal Sdry to vary in response to variation of the lighting control signal Slc. For example, the switching control circuit 131 is configured to adjust the duty cycle of the lighting control signal Slc according to the dimming control signal Sdc, so as to cause the driving power signal Sdry to increase or decrease in response to a luminance message indicated by the dimming control signal Sdc. When the dimming control signal Sdc indicates a higher luminance or color temperature, the switching control circuit 131 may increase the duty cycle of the lighting control signal Slc according to the dimming control signal Sdc, so as to cause the energy storage circuit ESE to output a higher driving power signal Sdry for the LED module LM. On the contrary, when the dimming control signal Sdc indicates a lower luminance or color temperature, the switching control circuit 131 may decrease the duty cycle of the lighting control signal Slc according to the dimming control signal Sdc, so as to cause the energy storage circuit ESE to output a lower driving power signal Sdry for the LED module LM. By these ways of adjusting, effects of dimming control can be achieved.

More specifically, the demodulation process performed on a modulated power signal Pin_C by the demodulating module 140 may comprise a signal conversion method such as sampling, time counting, or mapping or functioning between signals. For example, for each cycle or half cycle of the modulated power signal Pin_C, the demodulating module 140 may count for a period, sample the modulated power signal Pin_C within the period to obtain the time length of the modulated power signal Pin_C being at a zero voltage level, wherein the obtained time length of the modulated power signal Pin_C being at a zero voltage level may be linearly or non-linearly mapped into an electrical level or voltage level as a dimming control signal Sdc for the switching control circuit 131. And the range of the voltage level after mapping may be selected according to the voltage rating of the switching control circuit 131, and is for example between 0V and 5V. Further description of signal waveforms and circuit operations in an LED lighting system under different dimming control states or situations is as follows with reference to FIG. 11A, which is a signal waveform diagram of signal waveforms illustrating dimming or adjusting of luminance according to an embodiment of the disclosure.

Figure 11A:
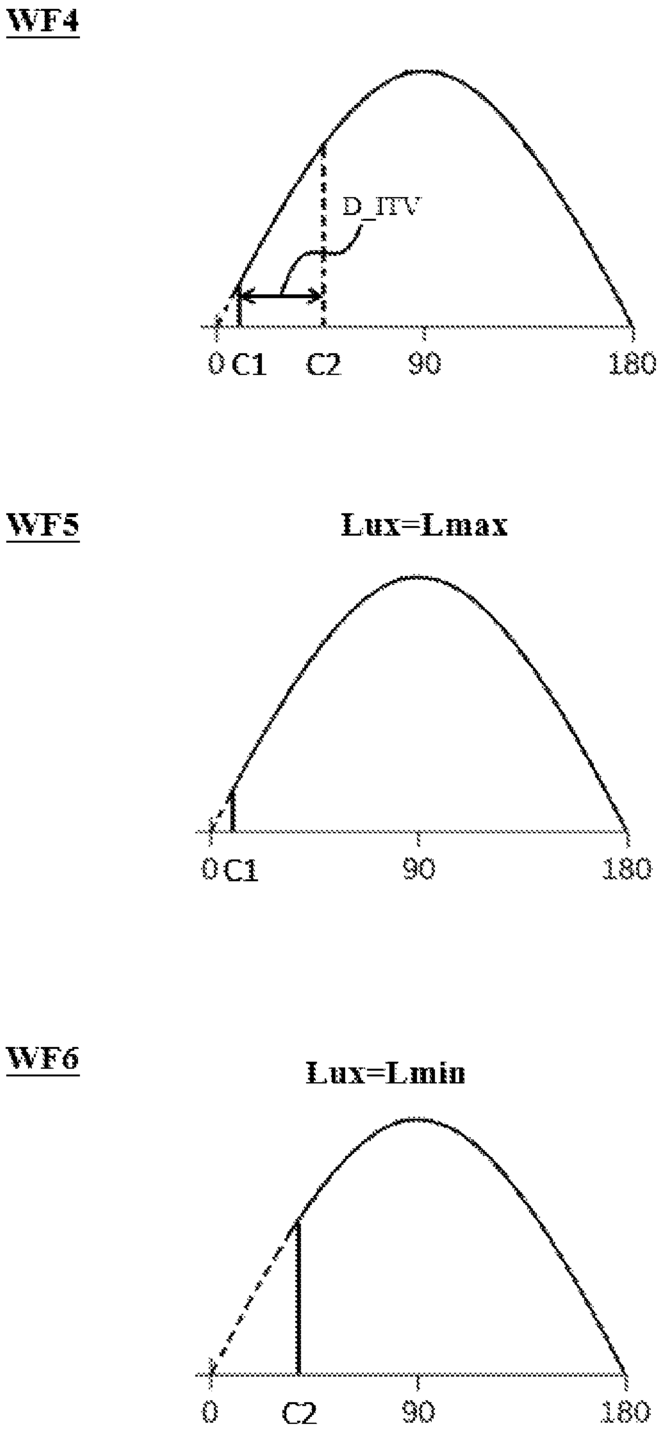
FIG. 11A and FIG. 11B are signal waveform diagrams of signal waveforms illustrating dimming according to some embodiments of the present disclosure.

Referring to FIGS. 6A, 11A to 11D, in this embodiment, the dimmer 50 may for example vary the phase-cut angle of the input power signal Pin within a dimming phase range D_ITV. In FIG. 11A, the signal waveforms from top to bottom are respectively a voltage waveform WF4 showing the dimming phase angle D_ITV, a voltage waveform WF5 corresponding to the dimming control state of the luminance Lux (being at its maximum Lmax, and a voltage waveform WF6 corresponding to the dimming control state of the luminance Lux being at its minimum Lmin.

With regard to the voltage waveform WF4 of FIG. 11A first, the dimming phase range D_ITV is the difference between a maximum phase-cut angle C2 and a minimum phase-cut angle C1, which minimum phase-cut angle C1 may be any number (such as 1, 2, or 3) of degrees in the range of between 0 and 15 degrees and which maximum phase-cut angle C2 may be any number (such as 21, 22, or 23) of degrees in the range of between 20 and 45 degrees, but the present invention is not limited to any of these ranges. So the dimming phase range D_ITV may be for example a phase difference between 0 and 45 degrees, between 5 and 45 degrees, between 5 and 20 degrees, between 15 and 20 degrees, or between 15 and 45 degrees, depending on the design needs. Preferably the choice of the maximum phase-cut angle C2 is based on two factors or principles. The first factor is that the size of the dimming phase range D_ITV should afford distinguishable states of luminance after mapping performed by the demodulating circuit 240. And the second factor is that when the dimmer 50 produces the modulated power signal Pin_C having the maximum phase-cut angle C2, the characteristics of total harmonic distortion (THD) and power factor (PF) of the power supply module PM can still be maintained/controlled, for example having values of the THD and PF no smaller than 80% of values of the THD and PF when the dimmer 50 produces the modulated power signal Pin_C having the minimum phase-cut angle C1, or preferably the value of the THD is larger than 25 and the value of the PF is larger than 0.9.

With regard to the voltage waveform WF5 of FIG. 11A, when the dimmer 80 in response to the dimming signal Sdim modulates the input power Pin to result in the minimum phase-cut angle C1, meaning the input power signal Pin has a conduction phase angle of (180—C1) degrees, the dimmer 80 cuts off the power line for the phase angle of 0—C1 degrees of the input power signal Pin and then causes current conduction through the power line for the phase angle of C1—180 degrees of the input power signal Pin. In this case, the demodulating module 240 generates a dimming control signal Sdc indicative of adjusting the luminance Lux into its maximum Lmax, according to the modulated power signal Pin_C having the minimum phase-cut angle C1. Then upon receiving the generated dimming control signal Sdc the switching control circuit 331 controls switching of the switching circuit PSW according to the dimming control signal Sdc as a reference, in order for the conversion circuit 132 to generate a corresponding driving power signal Sdry for driving the LED module LM and causing its luminance Lux to reach or stay at the maximum Lmax.

Next, with regard to the voltage waveform WF6 of FIG. 11A, when the dimmer 80 in response to the dimming signal Sdim modulates the input power Pin to result in the maximum phase-cut angle C2, meaning the input power Pin has a conduction phase angle of (180—C2) degrees, the dimmer 80 cuts off the power line for the phase angle of 0— C2 degrees of the input power signal Pin and then causes current conduction through the power line for the phase angle of C2—180 degrees of the input power signal Pin. In this case, the demodulating module 140 generates a dimming control signal Sdc indicative of adjusting the luminance Lux into its minimum Lmin, according to the modulated power signal Pin_C having the maximum phase-cut angle C2. Then upon receiving the generated dimming control signal Sdc the switching control circuit 131 controls switching of the switching circuit PSW according to the dimming control signal Sdc as a reference, in order for the conversion circuit 132 to generate a corresponding driving power signal Sdry for driving the LED module LM and causing its luminance Lux to reach or stay at the minimum Lmin. In this embodiment, the minimum luminance Lmin is for example about 10% of the maximum luminance Lmax.

Although the phase-cut angle or phase conduction angle is applied for dimming control in the embodiment(s), variation of the phase-cut angle or conduction phase angle of the resulting modulated power signal Pin_C in the embodiment is merely used as a reference signal indicative of a dimming message, rather than reflecting the effective value of the modulated power signal Pin_C in the luminance of the lighting LED module LM. So under the dimming control method of this embodiment the chosen dimming phase range D_ITV would be apparently smaller than that under the dimming control method of the embodiment of FIG. 14. From another perspective, under the dimming control method of this embodiment, no matter by any particular phase-cut angle within the dimming phase range D_ITV the dimmer 50 modulates the input power signal Pin, the effective value of the resulting modulated power signal Pin_C will not be much different. For example, in some embodiments, the effective value of the resulting modulated power signal Pin_C having the maximum phase-cut angle C2, such as the effective value of the voltage waveform WF6 of, is not lower than 50% of the effective value of the resulting modulated power signal Pin_C having the minimum phase-cut angle C1, such as the effective value of the voltage waveform WF5 of From another perspective, since the luminance of the LED module lighting based on the received modulated power signal Pin_C is directly correlated with the effective value of the modulated power signal Pin_C, therefore in the described common way the scope ratio of the effective value of the modulated power signal Pin_C is substantially or roughly the same as the scope ratio of the luminance of the lighting LED module, wherein the scope ratio of the effective value of the modulated power signal Pin_C refers to the ratio of the maximum value to the minimum value of the effective value of the modulated power signal Pin_C, and the scope ratio of the luminance of the lighting LED module refers to the ratio of the maximum value to the minimum value of the luminance. On the contrary, according to the embodiments described the scope ratio of the effective value of the modulated power signal Pin_C is not correlated with the scope ratio of the luminance of the lighting LED module. In some preferable embodiments, the scope ratio of the effective value of the modulated power signal Pin_C is smaller than the scope ratio of the luminance of the lighting LED module. And in some preferable embodiments, the scope ratio of the effective value of the modulated power signal Pin_C is smaller than or equal to 2, and the scope ratio of the luminance of the lighting LED module is larger than or equal to 10.

It should be noted that the described positive correlation of the luminance Lux of the LED module LM with respect to the variation of the phase-cut angle is only exemplary but not limiting, and in other embodiments the luminance Lux of the LED module LM may be in negative correlation with the cut-off phase angle of the modulated power signal Pin_C.

Figure 11B:
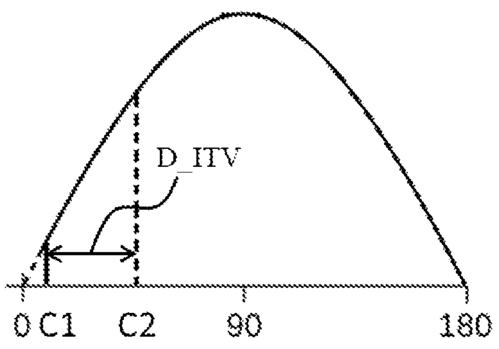
Figure 11B:
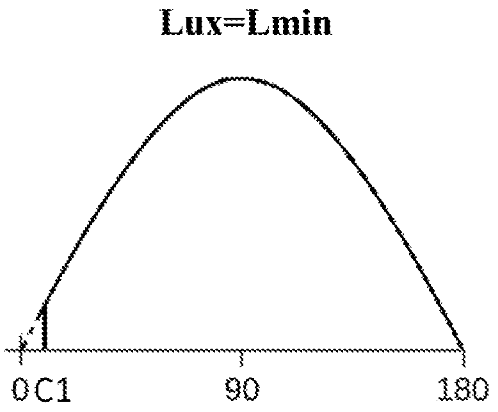
Figure 11B:
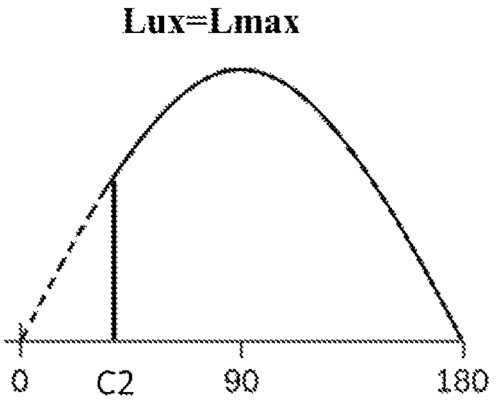

Referring to FIG. 11B, respecting the voltage waveform WF7 in this embodiment, when the dimmer 80 in response to a dimming signal Sdim modulates the input power Pin to result in the minimum cut-off phase angle C1, meaning the input power Pin has a conduction phase angle of (180—C1) degrees, the dimmer 80 cuts off the power line for the phase angle of 0~C1 degrees of the input power signal Pin and then causes current conduction through the power line for the phase angle of C1~180 degrees of the input power signal Pin. In this case, the demodulating module 140 generates a dimming control signal Sdc indicative of adjusting the luminance Lux into its minimum Lmin, according to the modulated power signal Pin_C having the cut-off phase angle C1. Then upon receiving the generated dimming control signal Sdc the switching control circuit 131 controls switching of the switching circuit PSW according to the dimming control signal Sdc as a reference, in order for the conversion circuit 132 to generate a corresponding driving power signal Sdry for driving the LED module LM and causing its luminance Lux to reach or stay at the minimum luminance Lmin.

Next respecting the voltage waveform WF8 of FIG. 11B, when the dimmer 80 in response to a dimming signal Sdim modulates the input power Pin to result in the cut-off phase angle C2, meaning the input power Pin has a conduction phase angle of (180—C2) degrees, the dimmer 80 cuts off the power line for the phase angle of 0 to C2 degrees of the input power signal Pin and then causes current conduction through the power line for the phase angle of C2 degrees to 180 degrees of the input power signal Pin. In this case, the demodulating module 140 generates a dimming control signal Sdc indicative of adjusting the luminance Lux into its maximum Lmax, according to the modulated power signal Pin_C having the cut-off phase angle C2. Then upon receiving the generated dimming control signal Sdc the switching control circuit 131 controls switching of the switching circuit PSW according to the dimming control signal Sdc as a reference, in order for the conversion circuit 132 to generate a corresponding driving power signal Sdry for driving the LED module LM and causing its luminance Lux to reach or stay at the maximum Lmax. And it's noted that in the embodiments of both FIGS. 11A and 11B, the cut-off phase angle C2 is larger than the cut-off phase angle C1.

Figure 11C:
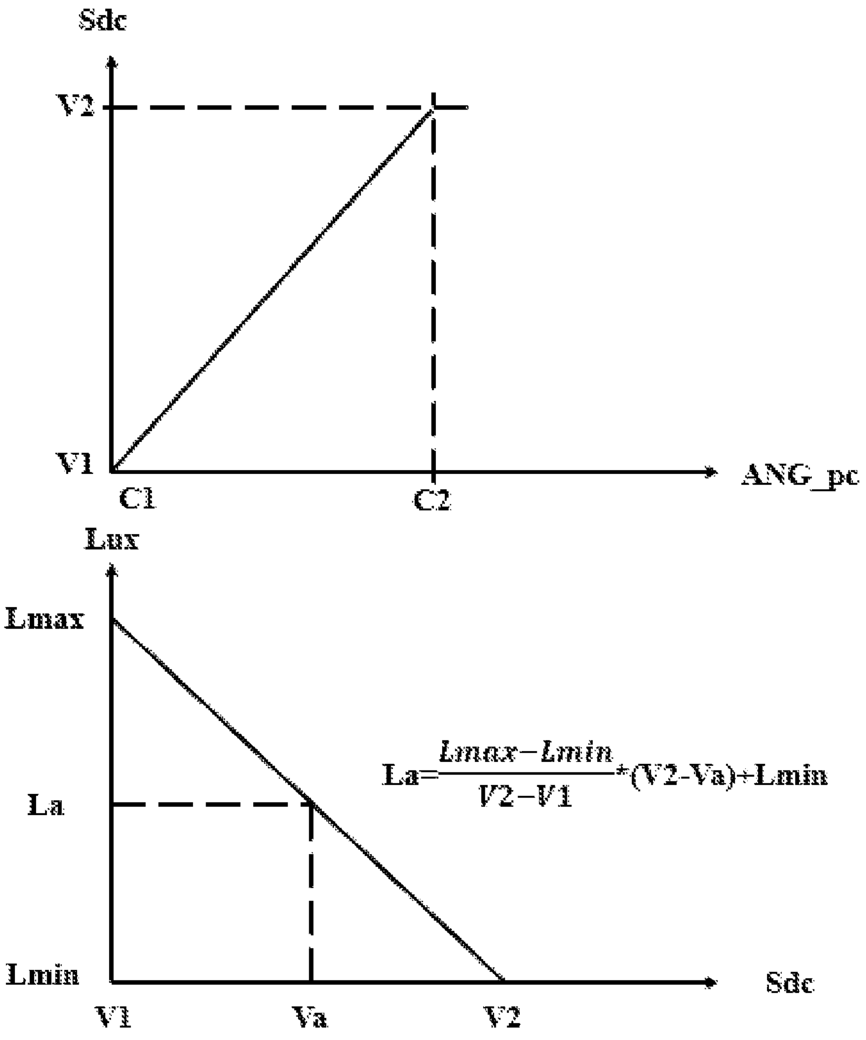
FIG. 11C and FIG. 11D each illustrate a corresponding relationship between the three variables of a phase-cut angle, a demodulating signal, and a luminance of an LED module according to some embodiments of the present disclosure.

Next is a further description of circuit operations and mechanisms of signal generation in different embodiments of the demodulating module 240 illustrated by FIGS. 11C and 7. FIG. 11C illustrates a corresponding relationship between the three variables of a phase-cut angle for dimming, a demodulating signal, and the luminance of an LED module, according to an embodiment of the disclosure, and FIG. 7 illustrates a corresponding relationship between the three variables of a phase-cut angle for dimming, a demodulating signal, and the luminance of an LED module, according to another embodiment of the disclosure.

Figure 11D:
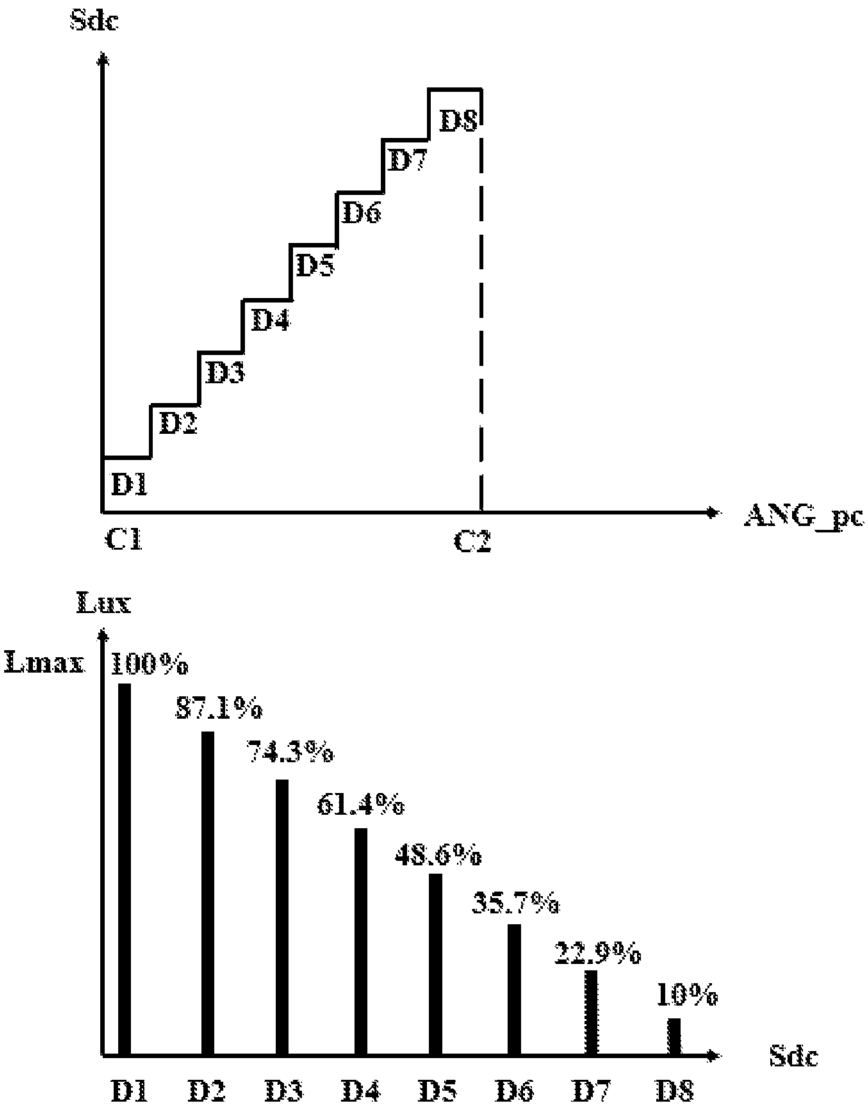

Referring to FIGS. 6A, 11C, and 11D, the demodulating module 140 of this embodiment of FIG. 11C is configured to obtain and transform a dimming message by performing a signal processing method similar to analog signal processing. It can be seen from FIG. 11C that when the phase-cut angle ANG_pc of the modulated power signal Pin_C is varied within the range of between the minimum phase-cut angle C1 and the maximum phase-cut angle C2, the voltage level of the dimming control signal Sdc is correspondingly varied within the range of between voltages V1 and V2. So the phase-cut angle ANG_pc of the modulated power signal Pin_C varied within the dimming range of phase-cut angle is in linear positive correlation with the voltage level of the dimming control signal Sdc. From the perspective of operation of the demodulating module 140, when judging that the modulated power signal Pin_C has the minimum phase-cut angle C1, the demodulating module 140 correspondingly generates a dimming control signal Sdc of the voltage level V1; and similarly, when judging that the modulated power signal Pin_C has the maximum phase-cut angle C2, the demodulating module 140 correspondingly generates a dimming control signal Sdc of the voltage level V2.

Next, the dimming control signal Sdc in linear positive correlation with the phase-cut angle ANG_pc of the dimmer-adjusted input power signal Pin_C is provided to the switching control circuit 131 to cause the conversion circuit 132 to generate a corresponding driving power signal Sdry for driving the LED module LM and causing it to have a corresponding luminance Lux. In some embodiments, the luminance Lux of the LED module LM is in linear negative correlation with the voltage level of the dimming control signal Sdc. As shown in FIG. 11C, when the dimming control signal Sdc received by the switching control circuit 131 has a voltage level Va in the range of between the voltage levels V1 and V2, the switching control circuit 131 adjusts the lighting control signal Slc accordingly to cause the LED module LM to light with a luminance La when being driven by the driving power signal Sdrv. In an embodiment, the luminance La is inversely proportional to the voltage level Va of the dimming control signal Sdc, and can be expressed by, but not limited to, $$La = \frac{Lmax - Lmin}{V2 - V1} * (V2 - Va) + Lmin.$$

It should be noted that the above described mechanism of generating a dimming control signal Sdc in order to reach a luminance Lux of the lighting LED module LM is only an embodiment to illustrate a signal conversion method, similar to analog signal processing, of how the demodulating module 140 obtains or extracts a signal feature, such as the phase-cut angle, of the modulated power signal Pin_C and then transforms/maps the signal feature into a dimming control signal Sdc for enabling the driving circuit 130 to adjust the luminance Lux of the LED module LM according to the dimming control signal Sdc. But the above described mechanism is not intended to limit the scope of the disclosed invention herein. In some embodiments, the relationship between the dimming control signal Sdc and the phase-cut angle ANG_pc may be a non-linear relationship, such as an exponential relationship. Similarly, the relationship between the dimming control signal Sdc and the luminance Lux may be a non-linear relationship. Although the disclosed invention herein is not limited to any of the described relationship herein. In some embodiments, the relationship between the phase-cut angle ANG_pc and the voltage level of the dimming control signal Sdc may be a negative correlation. And In some embodiments, the relationship between the luminance La and the voltage level Va may be a positive correlation.

Referring to FIGS. 6A and 11D, the demodulating module 140 of this embodiment of FIG. 11D is configured to obtain and transform a dimming message by performing a signal processing method similar to digital signal processing. Specifically, when the phase-cut angle of the modulated power signal Pin_C is adjusted/varied in a dimming phase range (also can be referred to default phase range), the dimming control signal may have a default number of different signal states corresponding to variations or values of the phase-cut angle, in order to control dimming of the LED module to the default number of different dimming levels respectively. It can be seen from FIG. 11D that when the phase-cut angle ANG_pc of the modulated power signal Pin_C is varied within the range of between the minimum phase-cut angle C1 and the maximum phase-cut angle C2, the dimming control signal Sdc can have 8 different signal states D1-D8 according to variation of the phase-cut angle ANG_pc. So the dimming range of between the minimum phase-cut angle C1 and the maximum phase-cut angle C2 may be divided into 8 sub-ranges among which the phase-cut angle ANG_pc can be varied and corresponding to the 8 different signal states D1-D8 of the dimming control signal Sdc respectively. In some embodiments, the different signal states of the dimming control signal Sdc may be indicated or represented by different voltage levels, wherein for example the signal state D1 of the dimming control signal Sdc corresponds to a voltage level of 1V and the signal state D8 corresponds to a voltage level of 5V. In some embodiments, the different signal states of the dimming control signal Sdc may be indicated or represented by logical voltage levels coded in multiple bits, wherein for example the signal state D1 of the dimming control signal Sdc corresponds to a logical voltage level coded as the three-bit "000" and the signal state D8 corresponds to a logical voltage level coded as the three-bit "111".

Next, the dimming control signal Sdc in the range of the 8 different signal states D1-D8 is provided to the switching control circuit 131 to cause the conversion circuit 132 to generate a corresponding driving power signal Sdry for driving the LED module LM and causing it to have a corresponding luminance Lux. In some embodiments, different values of the luminance Lux of the LED module LM are in one-to-one correspondence with the 8 different signal states D1-D8. As shown in FIG. 11C, in this embodiment the 8 different signal states D1-D8 correspond to 100%, 87.5%, 75%, 62.5%, 50%, 37.5%, 25%, and 10% of the maximum value Lmax of the luminance Lux respectively. It's noted that the described embodiment of logical voltage level representation uses three bits to code the distinguish ability of the 8 different signal states D1-D8 of the dimming control signal Sdc produced by the demodulating module 140, which is also known as an 8-section dimming, but the present invention disclosed herein is not limited to this number of bits.

Figure 12:
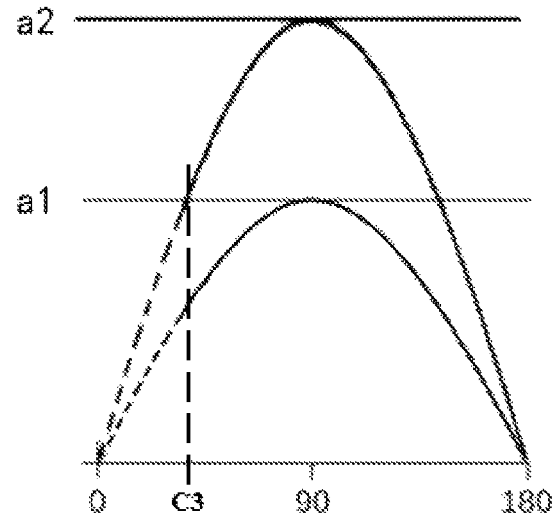
FIG. 12 is a signal waveform diagram of signal waveforms of an input power signal of an LED lighting apparatus under different power grid voltages according to an embodiment of the present disclosure.

FIG. 12 is a signal waveform diagram of signal waveforms of input power signal of an LED lighting apparatus under different power grid voltages according to an embodiment of the disclosure. Referring to the FIGS. 1A, 6A, and 12, it can be seen that no matter whether the peak voltage or amplitude of the input power Pin is a1 or a2, if the dimmer 80 modulates the input power Pin to result in a phase-cut angle C3, the phase angle/interval of the zero voltage level in the modulated power signal Pin_C (i.e. the phase angle between 0 degree and C3) generated by the dimmer 80 is the same. Therefore, no matter what the peak voltage or amplitude of the input power Pin is, the demodulating module 140 can demodulate any modulated power signal Pin_C of the same phase-cut angle to produce the same dimming control signal Sdc. Therefore, no matter what the voltage amplitude of the external power grid EP supplying the LED lighting system 10 is, upon receiving the same dimming signal Sdim, the LED lighting system 10 can cause the LED lighting apparatus 100 to light with the same luminance or color temperature, and thus the LED lighting system 10 is compatible with various applications with different types of external power grid EP.

From another perspective, in this disclosure, dimming of an LED module (with respect to e.g. its luminance or color temperature) is performed or achieved in response to the cut-off phase angle of the modulated power signal Pin_C, but largely not in response to the peak voltage or amplitude of the external power grid (as EP).

It should be noted that in practice non-ideal conditions or situations often exist due to intrinsic parasitic effects and mismatches between electronic components. Therefore, although it's intended/desirable that dimming of the LED module is performed not in response to the peak voltage or amplitude of the external power grid, in practice the effects of dimming in embodiments of the present invention are still somewhat in response to the peak voltage or amplitude of the external power grid. So, according to this disclosure, with the present invention it's acceptable that dimming of the LED module is somewhat in response to the peak voltage or amplitude of the external power grid due to such non-ideal conditions or situations. These allowable practical effects and response to the peak voltage or amplitude of the external power grid are what was meant by the previous statements of being "largely" or "substantially" not in response to the peak voltage or amplitude of the external power grid and of "substantially or roughly the same". And the above mentions of "somewhat" in one embodiment may each refer to the low degree of response that dimming of the LED module is impacted or affected by only less than 5% even when the peak voltage or amplitude of the external power grid is doubled.

Figure 7A:
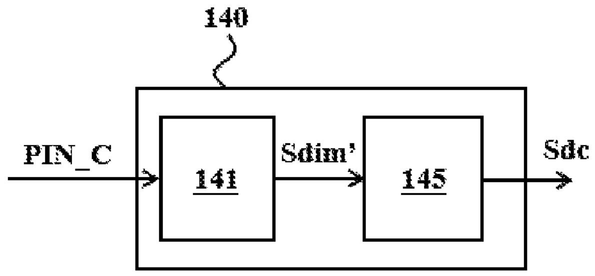
FIG. 7A is a diagram of functional modules of a demodulating module according to some embodiments of the present disclosure.
Figure 7B:
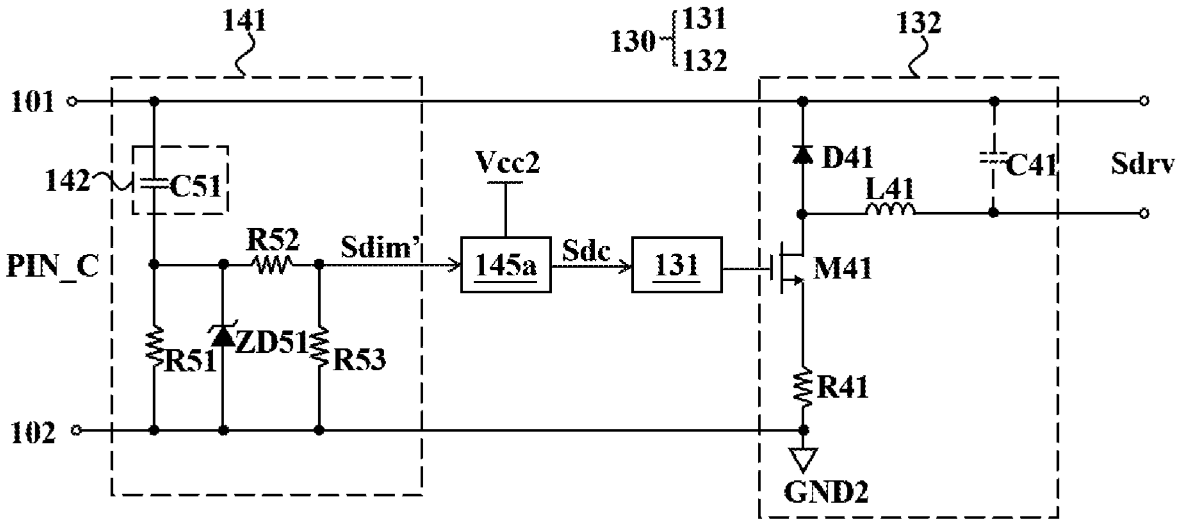
FIG. 7B and FIG. 7C are circuit-structure diagrams of an LED lighting apparatus according to some embodiments of the present disclosure.
Figure 7C:
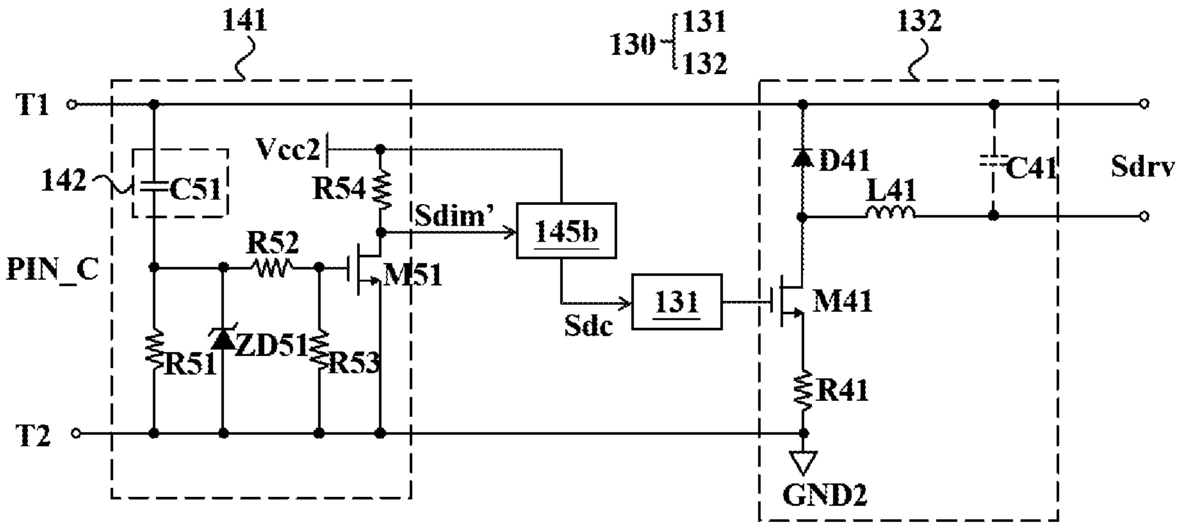
Figure 7D:
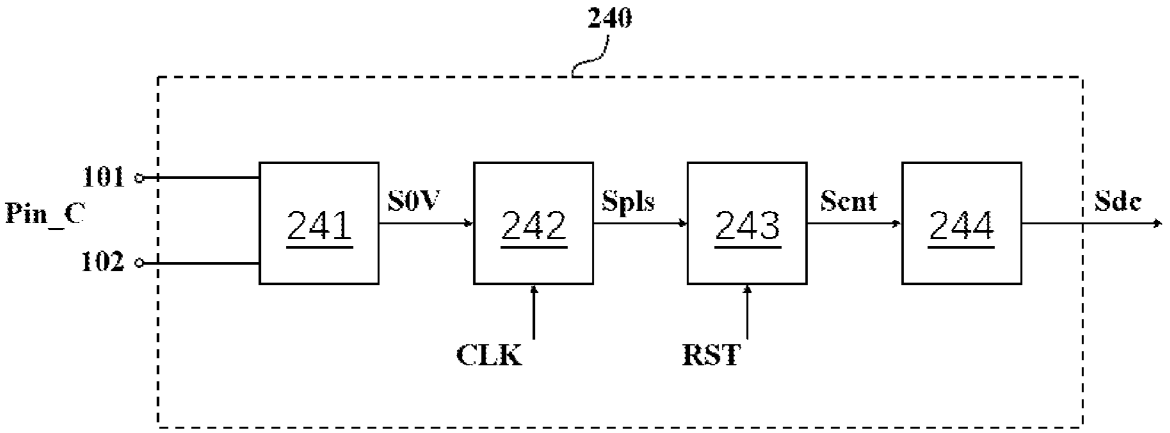
FIG. 7D is a diagram of functional modules of a demodulating module according to some embodiments of the present disclosure.
Figure 7E:
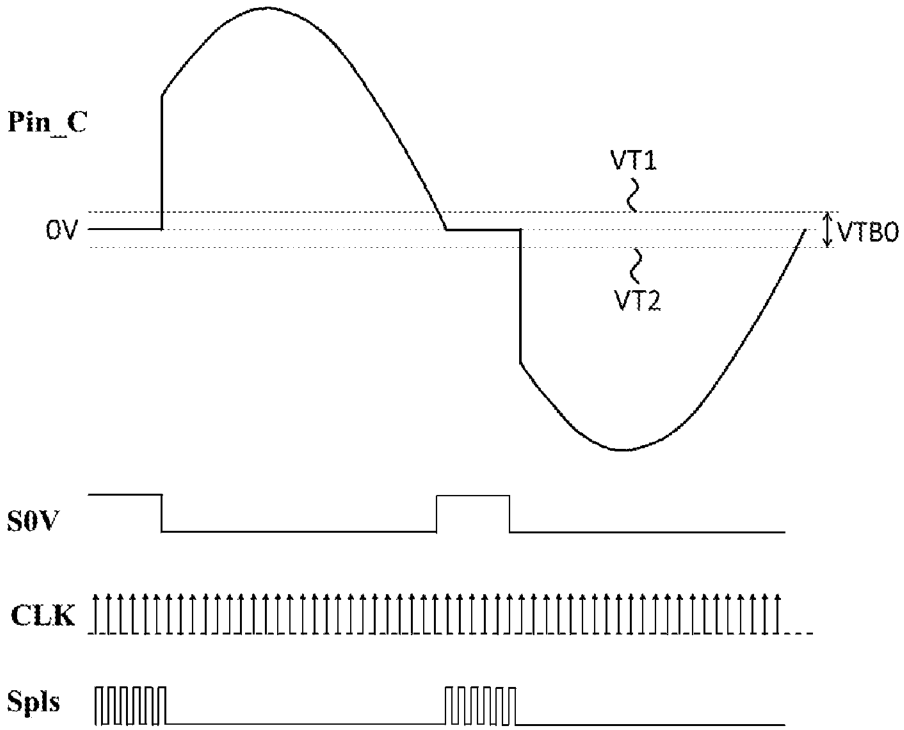
FIG. 7E is a signal waveform diagram of signals of a demodulating module according to some embodiments of the present disclosure.

Referring to both FIG. 7D and FIG. 7E, FIG. 7D is a diagram illustrating a specific embodiment of a demodulating module 240 in some embodiments of an LED lighting apparatus disclosed in the present disclosure. FIG. 7E is a signal waveform diagram illustrating corresponding relationship between signal waveforms of a demodulating module in some embodiments of an LED lighting apparatus disclosed in the present disclosure. As shown in FIG. 7D, in one embodiment, a demodulating module 240 includes a voltage-level determining circuit 241, a sampling circuit 242, a counting circuit 243, and a mapping circuit 244. The voltage-level determining circuit 241 is configured to detect whether a modulated power signal Pin_C is in a range of threshold values VTB0, in order to judge whether the modulated power signal Pin_C is at a zero voltage level. Specifically, as shown in FIG. 7E, in one embodiment, the voltage-level determining circuit 241 compares the voltage level of the power signal Pin_C with an upper threshold value Vt1 and a lower threshold value Vt2, in order to determine whether the modulated power signal Pin_C is in the threshold range VTB0. When the modulated power signal Pin_C is in the threshold range VTB0, the voltage-level determining circuit 241 outputs a zero-voltage-level determination signal SOV having a first logical level (such as a high logical level) to indicate that the modulated power signal Pin_C is indeed in the range of threshold values VTB0. The sampling circuit 242 is configured to sample the zero-voltage-level determination signal SOV according to a clock signal CLK, in order to generate a sample signal Spls in the form of a pulse signal. When the sampled zero-voltage-level determination signal SOV has or is at a high logical level (indicating that the modulated power signal Pin_C is in the range of threshold values VTB0), the sample signal Spls outputs or presently has one or more pulses. Then, the counting circuit 243 counts the number of pulses on the sample signal Spls, such as during a half (or ½) signal cycle of an AC-main power signal (such as a signal with frequency of 50 Hz or 60 Hz), in order to generate a counting signal Scnt. The mapping circuit 244 maps the counting signal Scnt into a dimming control signal (such as the above-described dimming control signal Sdc), based on for example the ratio of the counting signal Scnt (indicative of the number of pulses on the sample signal Spls) to the total number of pulses or impulses on the clock signal CLK during the half signal cycle of the AC-main power signal. In this case, a resetting signal RST may be synchronized with the half signal cycle of the AC-main power signal in order to reset the counting circuit 243. In should be noted that a dimming control signal Sdc described herein is not on a power loop along an LED module LM and a driving power signal Sdrv, so in other words the dimming control signal Sdc is not used to directly drive the LED module LM. From another angle, the current or electrical power of the dimming control signal Sdc may be respectively much smaller than the current or electrical power of the driving power signal Sdrv. Specifically, in some embodiments, the current or electrical power of a dimming control signal Sdc may be smaller than about 1/10, 1/100, or 1/100 of the current or electrical power of a driving power signal Sdrv.

Figure 10A:
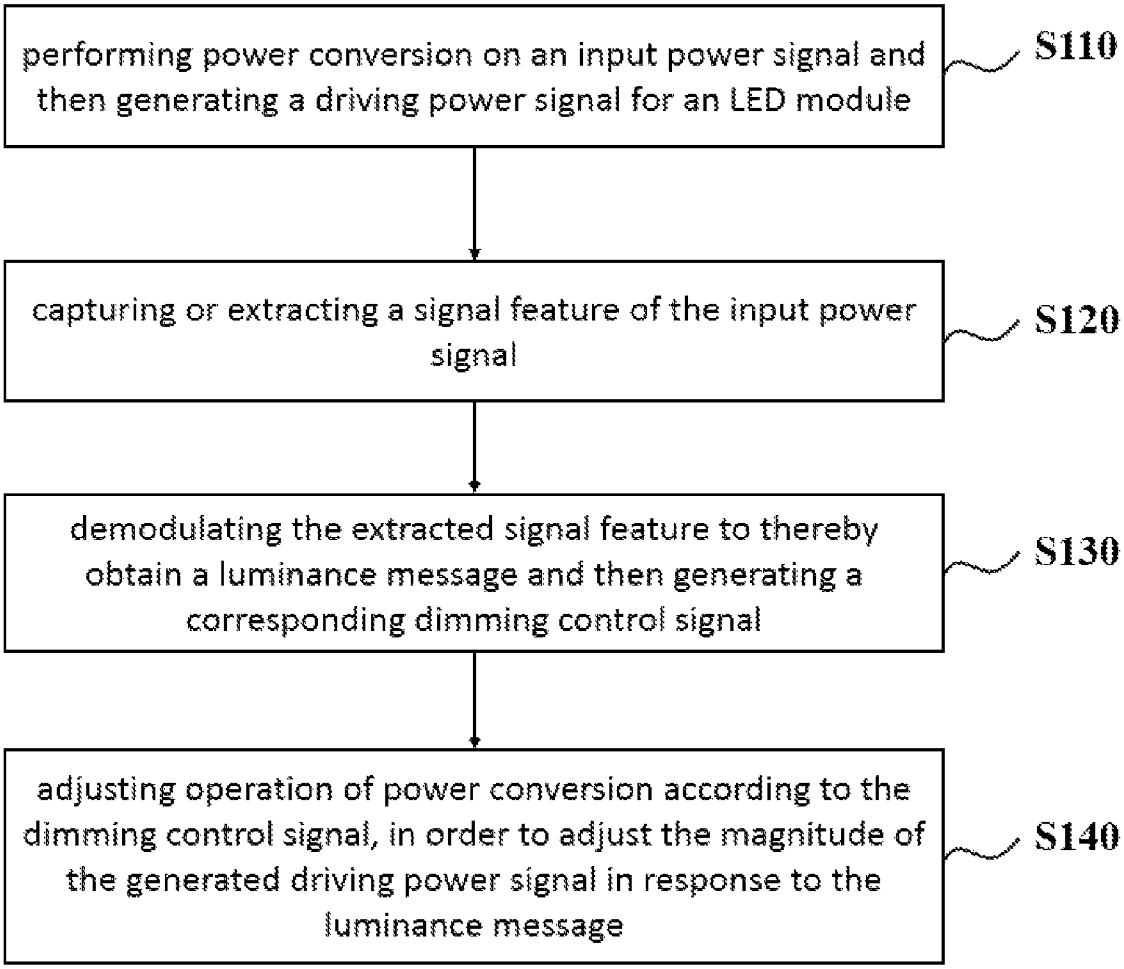
FIG. 10A and FIG. 10B are flow charts of steps of a dimming control method for an LED lighting apparatus according to some embodiments of the present disclosure.
Figure 10B:
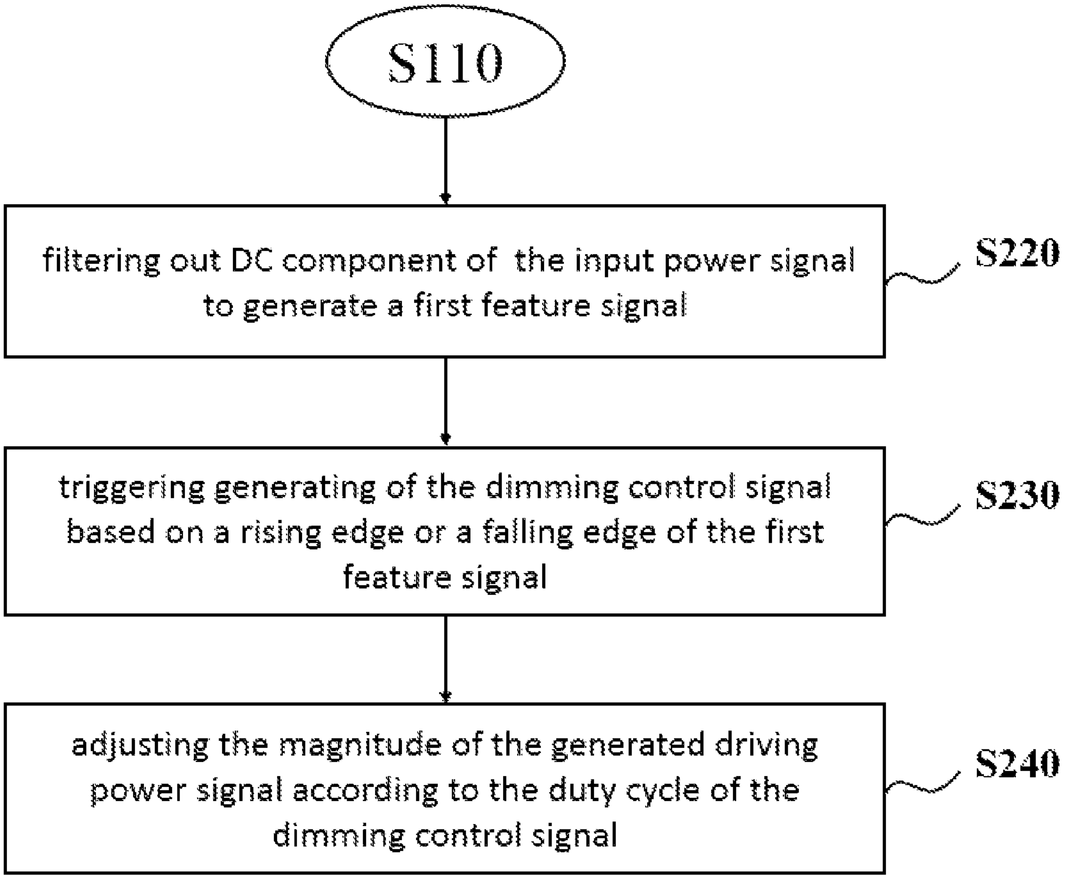
Figure 10C:
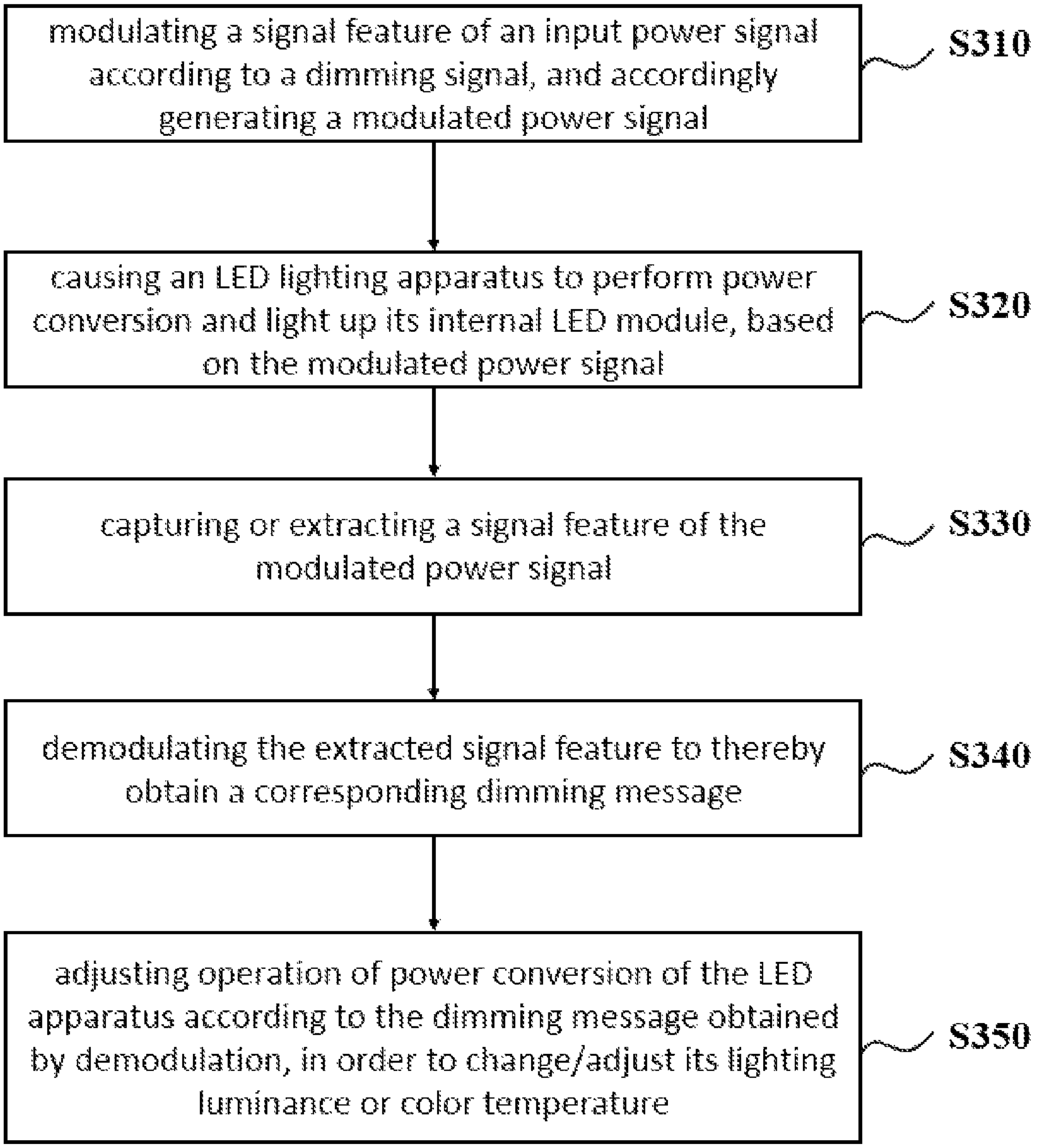
FIG. 10C and FIG. 10D are flow charts of steps of a dimming control method for an LED lighting apparatus according to some embodiments of the present disclosure.

FIG. 10C is a flow chart of steps of a dimming control method for an LED lighting system according to some embodiments of the present disclosure. Referring to both FIG. 1A and FIG. 10C, an overall dimming control method is described here from the perspective of an LED lighting system 10. First, a dimmer 80 modulates an input power signal Pin according to a dimming instruction DIM, and accordingly generates a modulated power signal Pin_C (step S310), wherein the modulated power signal Pin_C carries a signal feature indicative of a dimming message, which signal feature is for example a phase-cut angle or phase conduction angle of the modulated power signal Pin_C. The modulated power signal Pin_C is then provided to an LED lighting apparatus 100, causing the LED lighting apparatus 100 to perform power conversion and light up the internal LED module based on the modulated power signal Pin_C (step S320). On the other hand, the LED lighting apparatus 100 captures or extracts a signal feature of the modulated power signal Pin_C (step S330), and then demodulates the extracted signal feature to obtain a corresponding dimming message (step S340). And then the LED lighting apparatus 100 adjusts operation of power conversion according to the dimming message obtained by demodulation, in order to change/adjust the lighting luminance or color temperature of the LED module (step S350).

More concretely speaking, with regard to FIG. 6A, the above mentioned step of extracting a signal feature (step S330) and the step of demodulating the modulated power signal Pin_C (step S340) may be performed/realized by a demodulating module 140 in an LED lighting apparatus 100/200. In one embodiment, the step of the LED lighting apparatus 100 performing power conversion and lighting up the internal LED module based on the modulated power signal Pin_C (step S320) and the step of the LED lighting apparatus 100 adjusting operation of power conversion according to the dimming message in order to adjust lighting luminance of the LED module (step S350) may be performed/realized by a driving circuit 230 in the LED lighting apparatus 100/200.

Figure 10D:
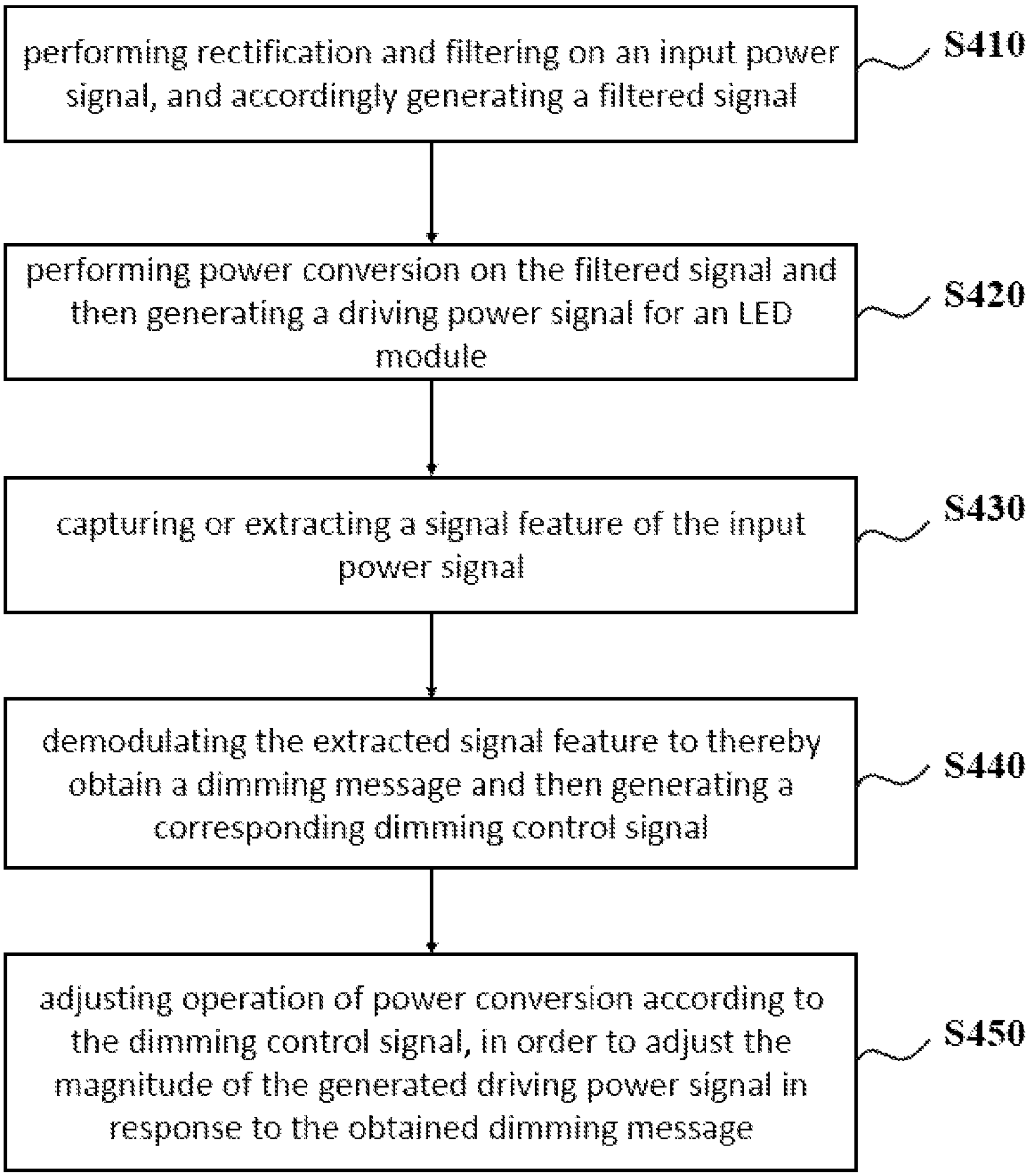

Next, further from the perspective of an LED lighting apparatus 100, an overall dimming control method is described, as illustrated in FIG. 10D. FIG. 10D is a flow chart of steps of a dimming control method for an LED lighting apparatus according to some embodiments of the present disclosure. Referring to FIG. 1A, FIG. 6A, and FIG. 10D, when an LED lighting apparatus 100 receives a modulated power signal Pin_C, a rectifying circuit 110 and a filtering circuit 120 in sequence perform rectification and filtering on the modulated power signal Pin_C respectively, and accordingly generate a filtered signal Sflr for a driving circuit 130 (step S410). The driving circuit 130 then performs power conversion on the received filtered signal Sflr and then generates a driving power signal Sdry for a later-stage LED module (step S420). On the other hand, a demodulating circuit 140 captures or extracts a signal feature of the modulated power signal Pin_C (step S430), and then demodulates on the signal feature to obtain a dimming message (for example corresponding to the angle magnitude of a phase-cut angle) and generate a corresponding dimming control signal Sdc (step S440). And the driving circuit 130 adjusts operation of power conversion according to the dimming control signal Sdc, in order to adjust the magnitude of the generated driving power signal Sdry in response to the obtained dimming message (step S450), for adjusting/changing the lighting luminance or color temperature of the LED module LM.

Further, a way to adjust power conversion operation of a driving circuit 130 by using a dimming control signal Sdc may be an analog-signal control method in some embodiments. For example, the voltage level of the dimming control signal Sdc may be used to control a reference value of voltage or current of the driving circuit 130 in an analog way, so as to adjust the magnitude of the driving power signal Sdry in an analog way.

In some embodiments, a way to adjust power conversion operation of a driving circuit 130 by using a dimming control signal Sdc may optionally be a digital-signal control method. For example, a dimming control signal Sdc may have different duty cycles corresponding to variations or values of the phase-cut angle respectively. In such embodiments, the dimming control signal Sdc may have a first state (as a high logical state) and a second state (as a low logical state). In one embodiment, the first state and the second state may be used to control the magnitude of the driving power signal Sdry of the driving circuit 130 in a digital way, such that at the first state of the dimming control signal Sdc the driving circuit 130 outputs a current while at the second state of the dimming control signal Sdc the driving circuit 130 stops outputting a current, for performing dimming on the LED module LM.

Figure 1B:
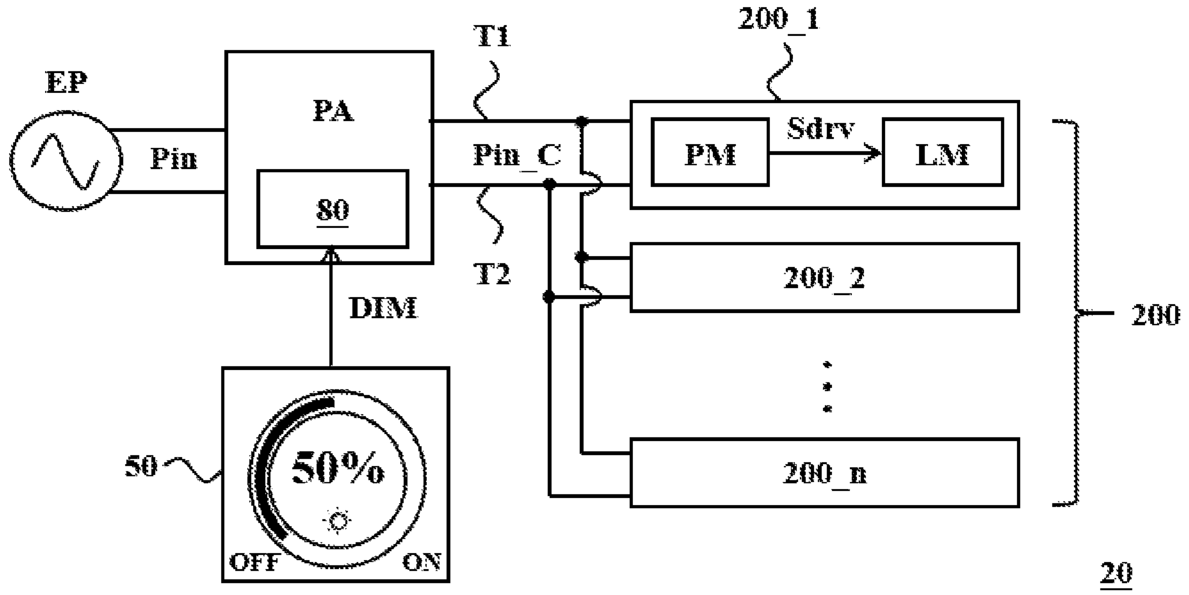

FIG. 1B is a diagram illustrating an LED lighting system according to some other embodiments of the present disclosure, and specifically illustrates a system configuration of including a dimmer in a power adaptor. Referring to FIG. 1B, an LED lighting system 20 in these embodiments includes a power adaptor PA and an LED lighting apparatus 200. In the LED lighting system 20, the power adaptor PA is disposed external to the LED lighting apparatus 200 and may be configured to convert an AC input power signal Pin into a power signal, wherein the power adaptor PA includes a dimmer 80, configured to according to a dimming instruction DIM perform a dimming process on the power signal resulting from conversion by the power adaptor PA, in order to generate a modulated power signal Pin_C after processing. Compared to the embodiments illustrated in FIG. 1A, in the configuration of the LED lighting system 20 in the embodiments of FIG. 1B, the dimmer 80 may be regarded as adjusting a signal feature of a rectified input power signal Pin in order to generate a DC modulated power signal Pin_C having a dimming signal. That is, the resulting modulated power signal Pin_C after a dimming process is performed comprises at least DC component(s) and dimming signal component(s). Configuration(s) of the dimmer 80 will be further described in below mentioned embodiments.

Similar to embodiments illustrated in FIG. 1A, an LED lighting apparatus 200 in embodiments illustrated in FIG. 1B may as well includes one or more LED lighting apparatuses 200_1-200_*n*, wherein the symbol n is a positive integer larger than or equal to 1, which plurality has similar or identical configurations among them and has similar configurations to those of the LED lighting apparatuses 100_1-100_*n* mentioned above. So details about configurations and operations of a power module PM and an LED module LM for each of the LED lighting apparatuses 200_1-200_*n* are similar to, or can be understood by referring to, those mentioned in above embodiments of LED lighting apparatuses 100_1-100_*n*, and thus are not described again. An appended note is that since in the embodiments of FIG. 1A a modulated power signal Pin_C provided by the dimmer 80 to the LED lighting apparatus 100 is an AC power source, and in the embodiments of FIG. 1B a modulated power signal Pin_C provided by the power adaptor PA to the LED lighting apparatus 200 is a power signal, power modules PM respectively for the LED lighting apparatus 100 and the LED lighting apparatus 200 may have different configurations depending on different types of power source signal to be received respectively by the LED lighting apparatus 100 and the LED lighting apparatus 200. For example, a power module PM for the LED lighting apparatus 100 may include e.g. a rectifying circuit, a filtering circuit, a DC-to-DC conversion circuit, etc., while a power module PM for the LED lighting apparatus 200 may include merely a filtering circuit and a DC-to-DC conversion circuit, without a rectifying circuit.

In various embodiments, an LED lighting apparatus 200 may comprise or be any of various types of LED lamps driven by a power signal, such as LED spotlight, LED downlight, LED bulb lamp/light, LED track light, LED panel light, LED ceiling light, LED tube lamp/light, or LED filament lamp/light, to be used in combination with an external power adaptor, but the present invention is not limited to any of these types. In some embodiments where the LED lighting apparatus 200 comprises an LED tube lamp, the LED lighting apparatus 200 may be a remote-driver type (i.e., Type-C) of LED tube lamp.

Figure 2:
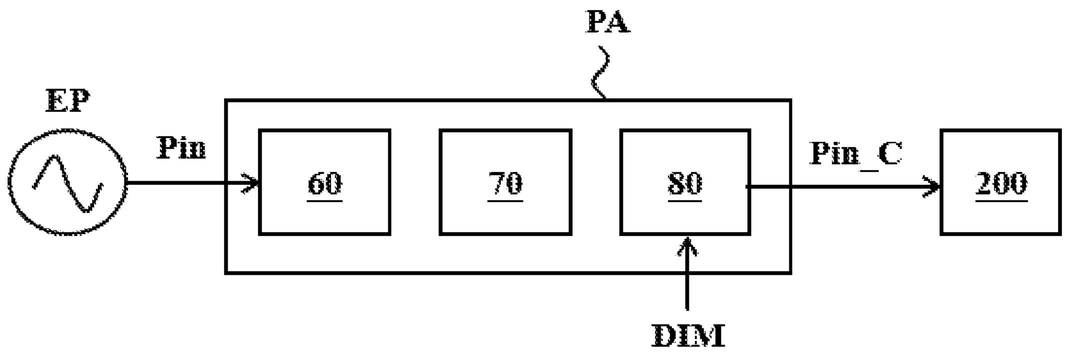
FIG. 2 is a diagram of functional modules of a power adaptor according to some embodiments of the present disclosure.

FIG. 2 is a diagram of functional modules of a power adaptor according to some embodiments of the present disclosure. Referring to FIG. 2, in some embodiments, a power adaptor PA includes a signal adjusting module 60, a switching power module 70, and a dimmer 80.

The signal adjusting module 60 is configured to receive an AC input power signal Pin and to perform signal adjustments such as rectification and filtering on the AC input power signal Pin. The switching power module 70 is electrically connected to the signal adjusting module 60; and configured to perform power conversion on the AC input power signal Pin after undergoing such signal adjustments, in order to produce an output a stable power signal. The dimmer 80 is electrically connected to the switching power module 70 and is configured to perform modulation on the power signal outputted by the switching power module 70, in order to impress/upload a certain form or signal feature, into which a dimming instruction DIM is transformed, onto the power signal outputted by the switching power module 70, therefore generating a modulated power signal Pin_C after the dimming process is performed. The immediate following is a description of configuration embodiments of modules in a power adaptor PA illustrated in FIGS. 3-5B.

Figure 3:
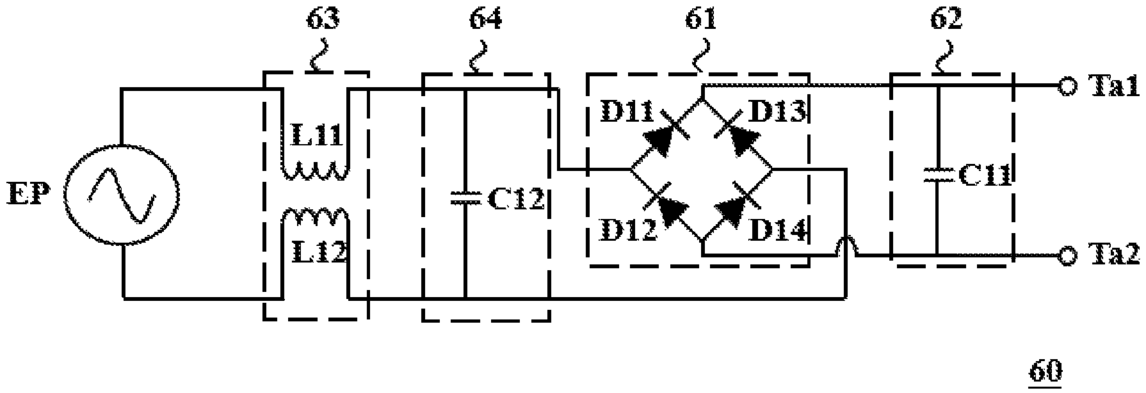
FIG. 3 is a circuit-structure diagram of a signal adjusting module according to some embodiments of the present disclosure.

FIG. 3 is a circuit-structure diagram of a signal adjusting module according to some embodiments of the present disclosure. Referring to FIG. 3, in some embodiments, a signal adjusting module 60 includes a rectifying circuit 61 and a first filtering circuit 62. Through rectifying input terminal(s) the rectifying circuit 61 is configured to receive and then rectify an input power signal, in order to output a rectified signal at its rectifying output terminal(s). In various embodiments, the rectifying circuit 61 may comprise a full-wave rectifying circuit, a half-wave rectifying circuit, a bridge-type rectifying circuit, or other type of rectifying circuit, and the disclosed invention is not limited to any of these types. In FIG. 3, the rectifying circuit 61 is illustrated as a full-wave bridge rectifying circuit comprising four diodes D11-D14 for example, wherein an anode of the diode D11 is electrically connected together with a cathode of the diode D12 as a first rectifying input terminal of the rectifying circuit 61; an anode of the diode D13 is electrically connected together with a cathode of the diode D14 as a second rectifying input terminal of the rectifying circuit 61; the cathodes respectively of the diodes D11 and D13 are connected together as a first rectifying output terminal of the rectifying circuit 61; and the anodes respectively of the diodes D12 and D14 are connected together as a second rectifying output terminal of the rectifying circuit 61.

The first filtering circuit 62 has input terminal(s) electrically connected to rectifying output terminal(s) of the rectifying circuit 61, in order to receive and then filter the rectified signal to produce a filtered signal to be outputted at a first filtering output terminal Ta1 and a second filtering output terminal Ta2. The first rectifying output terminal of the rectifying circuit 61 can be regarded as a first filtering input terminal of the first filtering circuit 62, and the second rectifying output terminal of the rectifying circuit 61 can be regarded as a second filtering input terminal of the first filtering circuit 62. In various embodiments, the first filtering circuit 62 can filter out ripples of the rectified signal, so as to produce a filtered signal whose waveform is smoother than that of the rectified signal. Through choosing proper circuit configuration(s) for the first filtering circuit 62 to achieve filtering of a specific frequency, the first filtering circuit 62 can filter out response/energy associated with a specific frequency of an external driving power signal. In some embodiments, the first filtering circuit 62 may comprise a resistor, a capacitor, an inductor, or any combination thereof, such as a parallel-coupled capacitor filtering circuit or a it-shape filtering circuit, but the present disclosed invention is not limited to any of these mentioned embodiments. In FIG. 3, the first filtering circuit 62 is illustrated as comprising a capacitor C11 for example, which has a first end (also the first filtering output terminal Ta1) electrically connected to cathodes of the diodes D11 and D13 through the first rectifying output terminal, and has a second end (also the second filtering output terminal Ta2) electrically connected to anodes of the diodes D12 and D14 through the second rectifying output terminal.

In some embodiments, the signal adjusting module 60 further includes a second filtering circuit 63 and/or a third filtering circuit 64, wherein the second filtering circuit 63 is a filtering circuit serially connected between an external power grid and the rectifying circuit 61, and the third filtering circuit 64 is a filtering circuit electrically connected to rectifying input terminals of the rectifying circuit 61 and connected in parallel with the rectifying circuit 61. Disposition of the second filtering circuit 63 and/or third filtering circuit 64 may add any of the functions of reducing high-frequency interference in the input power Pin and current limiting, thus improving stability of the signal from the input power Pin. Similar to the first filtering circuit 62, the second filtering circuit 63 and the third filtering circuit 64 may each comprise a resistor, a capacitor, an inductor, or any combination thereof, but the present disclosed invention is not limited to any of these mentioned embodiments. In FIG. 3, the second filtering circuit 63 is illustrated as comprising inductors L11 and L12 for example, wherein the inductor L11 is serially connected between one of the Live wire and Neutral wire of an external power grid EP and a first rectifying input terminal of the rectifying circuit 61, and the inductor L12 is serially connected between the other of the Live wire and Neutral wire of the external power grid EP and a second rectifying input terminal of the rectifying circuit 61. In some embodiments, the inductors L11 and L12 may be common-mode inductors or differential-mode inductors. The third filtering circuit 64 in FIG. 3 is illustrated as comprising a capacitor C12 for example, wherein the capacitor C12 has a first end electrically connected to the inductor L11 and the first rectifying input terminal, i.e. a connection terminal between the anode of diode D11 and the cathode of diode D12, and has a second end electrically connected to the inductor L12 and the second rectifying input terminal, i.e. a connection terminal between the anode of diode D13 and the cathode of diode D14.

Figure 4A:
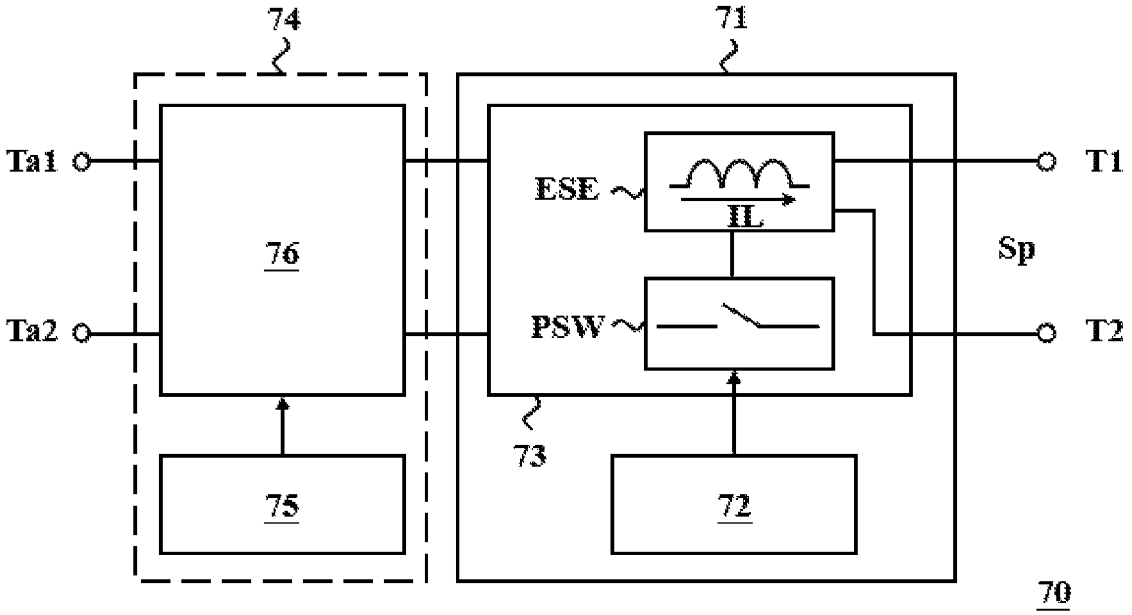
FIG. 4A is a diagram of functional modules of a switching power module according to some embodiments of the present disclosure.

FIG. 4A is a diagram of functional modules of a switching power module according to some embodiments of the present disclosure. Referring to FIG. 4A, in some embodiments, a switching power module 70 may include a power conversion circuit 71, which has input terminal(s) electrically connected to filtering output terminals Ta1 and Ta2 of a first filtering circuit (such as the first filtering circuit 62 in FIG. 3), in order to receive a filtered signal. In some embodiments, the power conversion circuit 71 is configured to perform power conversion on a filtered signal based on a current-source mode, in order to produce a stable power signal Sp. In FIG. 4A, the power conversion circuit 71 includes a switching control circuit 72 and a conversion circuit 73, wherein the conversion circuit 73 includes a switching circuit PSW (also referred to as a power switch) and an energy conversion circuit ESE. The conversion circuit 73 is configured to receive and then convert a filtered signal, under the control by the switching control circuit 72, into a power signal Sp to be outputted at first and second power output terminals T1 and T2 for powering an LED lamp.

Figure 4B:
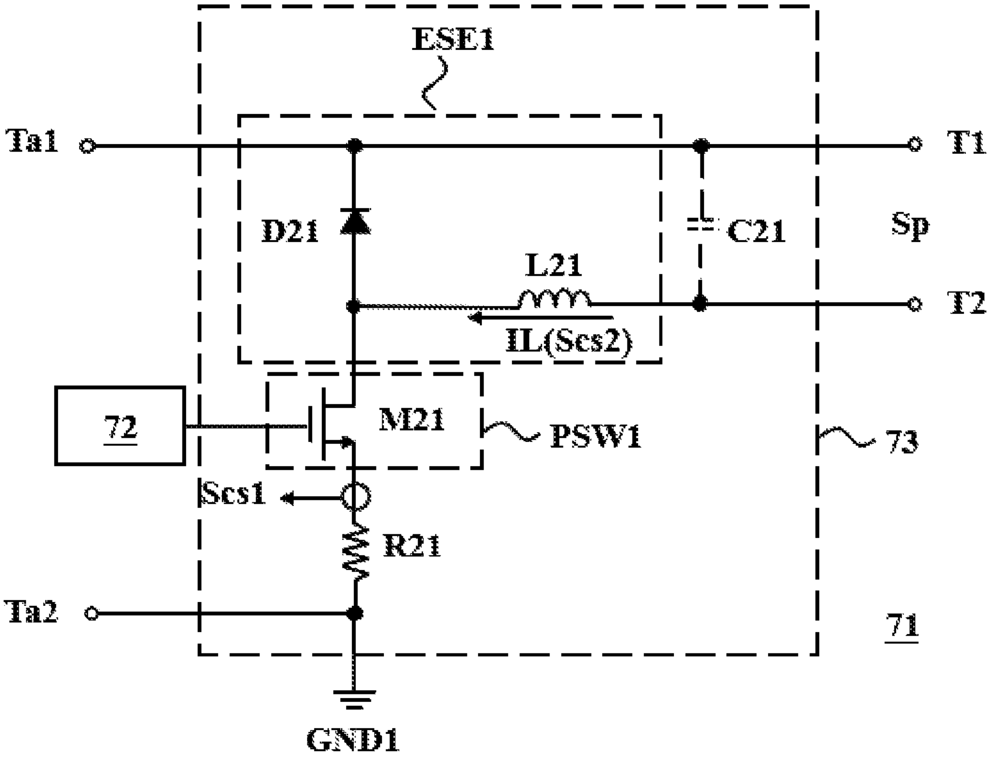
FIG. 4B is a circuit-structure diagram of a power conversion circuit according to some embodiments of the present disclosure.

FIG. 4B is a circuit-structure diagram of a power conversion circuit according to some embodiments of the present disclosure. Referring to FIG. 4B, in some embodiments a buck-type DC-to-DC convertor circuit is taken as an example of a power conversion circuit 71, which includes a switching control circuit 72 and a conversion circuit 73, wherein the conversion circuit 73 includes an inductor L21, a freewheeling diode D21, a capacitor C21, and a transistor M21, wherein the inductor L21 and the freewheeling diode D21 together constitute an energy conversion circuit ESE1; the transistor M21 acts as a switching circuit PSW1; and the conversion circuit 73 is coupled to filtering output terminals Ta1 and Ta2 in order to transform/convert a received filtered signal into a power signal Sp to be outputted at first and second power output terminals T1 and T2.

In these embodiments, the transistor M21 is for example a metal-oxide-semiconductor field-effect transistor (MOSFET), having a control terminal, a first terminal, and a second terminal. The transistor M21 has the first terminal coupled to an anode of the freewheeling diode D21, the second terminal coupled to a filtering output terminal Ta2, and the control terminal coupled to the switching control circuit 72, in order to control current conduction or cutoff between the first and second terminals of the transistor M21, under the control by the switching control circuit 72. The first power output terminal T1 is coupled to the filtering output terminal Ta1, the second power output terminal T2 is coupled to one end of the inductor L21, which has the other end coupled to the first terminal of the transistor M21. The capacitor C21 is coupled between first and second power output terminals T1 and T2, in order to stabilize the (fluctuation or change in) voltage between the first and second power output terminals T1 and T2. And the freewheeling diode D21 has a cathode coupled to the filtering output terminal Ta1 and the first power output terminal T1.

Next, operations of the power conversion circuit 71 are described. The switching control circuit 72 is configured to determine periods respectively of conducting and being cut off of the switching circuit PSW1 according to a current detection signal Scs1 and/or a current detection signal Scs2, that is, the switching control circuit 72 is configured to control the duty cycle of the transistor M21 in order to adjust the magnitude of the power signal Sp. The current detection signal Scs1 represents the magnitude of a current flowing through the transistor M21, and the current detection signal Scs2 represents the magnitude of a current IL flowing through the inductor L21, wherein the current detection signal Scs2 may be obtained by setting an auxiliary winding coupled to the inductor L21. According to any of the current detection signal Scs1 and the current detection signal Scs2, the switching control circuit 72 may obtain message of the magnitude of power transformed by the conversion circuit 73. When the transistor M21 is in a conducting state, a filtered signal flowing from the filtering output terminal Ta1 then flows through the capacitor C21 and the first power output terminal T1 to a later-stage load (of an LED lamp), and then flows from the later-stage load through the inductor L21 and the transistor M21 to eventually flow out from the filtering output terminal Ta2. During this conducting stage and case, the capacitor C21 and inductor L21 perform energy storing. On the other hand, when the transistor M21 is in a cutoff state, the capacitor C21 and inductor L21 release the stored energy in the form of a current flowing through the freewheeling diode D21 to the first power output terminal T1, causing the later-stage load to be continually supplied with power. An appended note is that the capacitor C21 is not a necessary component and may be omitted, so it's depicted with a dotted line in FIG. 4B. In some environments of applications, the capacitor C21 is omitted while relying on the characteristics of an inductor to oppose sudden/instantaneous change in current, in order to obtain the effects of achieving stable current flowing through an LED module.

In these embodiments, a power conversion circuit 71 comprises a buck-type circuit, a boost-type circuit, or a buck-boost circuit, depending on specific applications.

Referring to FIG. 4A again, in some embodiments, a switching power module 70 may further include a power factor correction (PFC) circuit 74. The PFC circuit 74 is electrically connected between filtering output terminals Ta1 and Ta2 of a first filtering circuit (such as the first filtering circuit 62 in FIG. 3) and input terminal(s) of the power conversion circuit 71. In some embodiments, the PFC circuit 74 includes a switching control circuit 75 and a conversion circuit 76, wherein the switching control circuit 75 is configured to control operations of the conversion circuit 76, in order to perform compensation of PFC on a filtered signal and thus produce a PFC signal, which process means to increase the power factor of the filtered signal whereby active power of the filtered signal is increased and reactive power of the filtered signal is reduced.

Figure 4C:
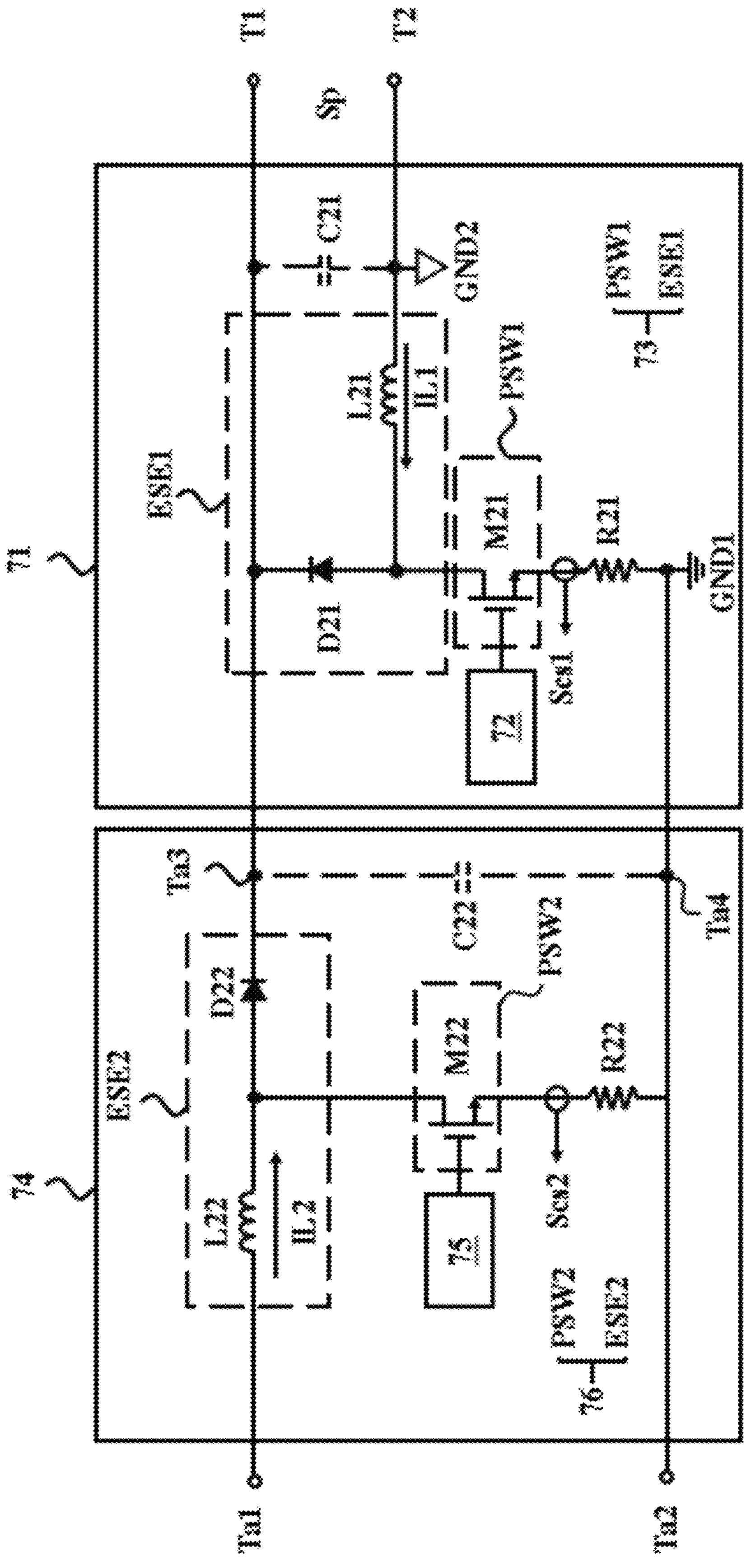
FIG. 4C is a circuit-structure diagram of a power factor correction circuit according to some embodiments of the present disclosure.

The PFC circuit 74 comprises for example a boost-type convertor circuit, as shown in FIG. 4C. FIG. 4C is a circuit-structure diagram of a power factor correction circuit according to some embodiments of the present disclosure. Referring to FIG. 4C, a PFC circuit 74 includes a switching control circuit 75 and a conversion circuit 76, wherein the conversion circuit 76 includes a resistor R22, an inductor L22, a freewheeling diode D22, a capacitor C22, and a transistor M22, wherein the inductor L22 and the freewheeling diode D22 together constitute an energy conversion circuit ESE2; the transistor M22 acts as a switching circuit PSW2; and the conversion circuit 76 is coupled to filtering output terminals Ta1 and Ta2 in order to transform/convert a received filtered signal into a PFC signal to be outputted through PFC output terminals Ta3 and Ta4 to a power conversion circuit 71 in FIG. 4C. An appended note is that the capacitor C22 is not a necessary component and may be omitted, so it's depicted with a dotted line in FIG. 4C. In some environments of applications, the capacitor C22 is omitted while relying on the characteristics of an inductor to oppose sudden/instantaneous change in current, in order to obtain the effects of achieving stable current flowing through an LED module. In other embodiments, a power factor correction circuit may be otherwise referred to as a power factor correction module.

Figure 4D:
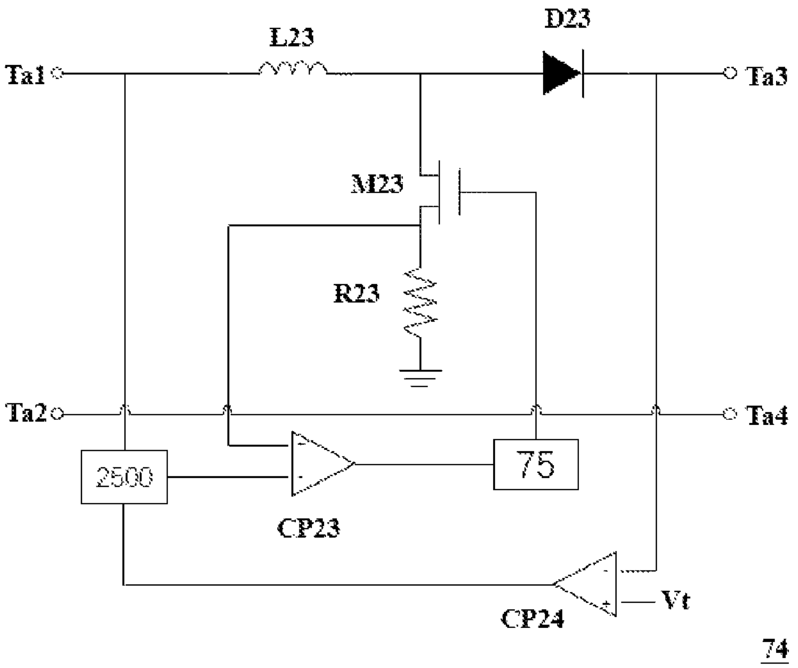
FIG. 4D is a circuit-structure diagram of a power factor correction circuit according to another embodiment of the present disclosure.

FIG. 4D is a circuit-structure diagram of a power factor correction circuit according to another embodiment of the present disclosure. Referring to FIG. 4D, a PFC circuit 74 has input terminal(s) coupled to first and second filtering output terminals Ta1 and Ta2, and has output coupled to PFC output terminals Ta3 and Ta4. The PFC circuit 74 includes a multiplier 2500, a switching control circuit 75, a first comparator CP24, a second comparator CP23, a transistor M23, a resistor R23, a diode D23, and an inductor L23. The inductor L23 has an end coupled to the first filtering output terminal Ta1 and another end coupled to an anode of the diode D23, whose cathode is coupled to the PFC output terminal Ta3. The transistor M23 has a first terminal coupled to a connection node between the inductor L23 and the diode D23, has a second terminal connected through the resistor R23 to a reference electric potential (such as a power supply's ground GND or a reference ground level SGND), and has a control terminal coupled to output terminal of the switching control circuit 75. The first comparator CP24 has a first input terminal coupled to the PFC output terminal Ta3, a second input terminal for receiving a reference voltage Vt, and an output terminal coupled to a first input terminal of the multiplier 2500, which has a second input terminal coupled to the first filtering output terminal Ta1 and an output terminal coupled to a second input terminal of the second comparator CP23. The second comparator CP23 has a first input terminal coupled to a connection node between the resistor R23 and the second terminal of the transistor M23, and has an output terminal coupled to input terminal of the switching control circuit 75.

It should be noted that at least some circuit components of any of the multiplier 2500, the switching control circuit 75, the first comparator CP24, and the second comparator CP23 may be integrated into a controller for controlling current-conducting or being cut off of the transistor M23. The controller may further have the transistor M23 integrated therein. The controller may be an integrated circuit, such as a control chip. The transistor M23 is for example a Metal-oxide-semiconductor Field-effect Transistor (MOSFET), a Bipolar Junction Transistor (BJT), or a triode.

Specifically, after an output voltage V0 at the PFC output terminal Ta3 of the PFC circuit 74 is obtained and compared by the first comparator CP24 with the reference voltage Vt, a comparison result is transmitted to the first input terminal of the multiplier 2500, whose second input terminal then obtains a voltage Vdc outputted from the first filtering output terminal Ta1. Then the multiplier 2500 based on inputs at its first and second input terminals outputs a reference signal Vi for current-feedback controlling. The second comparator CP23 compares a voltage signal obtained from the resistor R23 and reflecting a peak current on the inductor L23 with the reference signal Vi, in order to output a comparison result to the switching control circuit 75 for controlling current-conducting or being cut off of the transistor M23, so as to cause the waveform of a current Ii input to the PFC circuit 74 to substantially correspond to that of the voltage Vdc, resulting in the benefits of significantly reducing current harmonics and improving power factor.

Figure 4E:
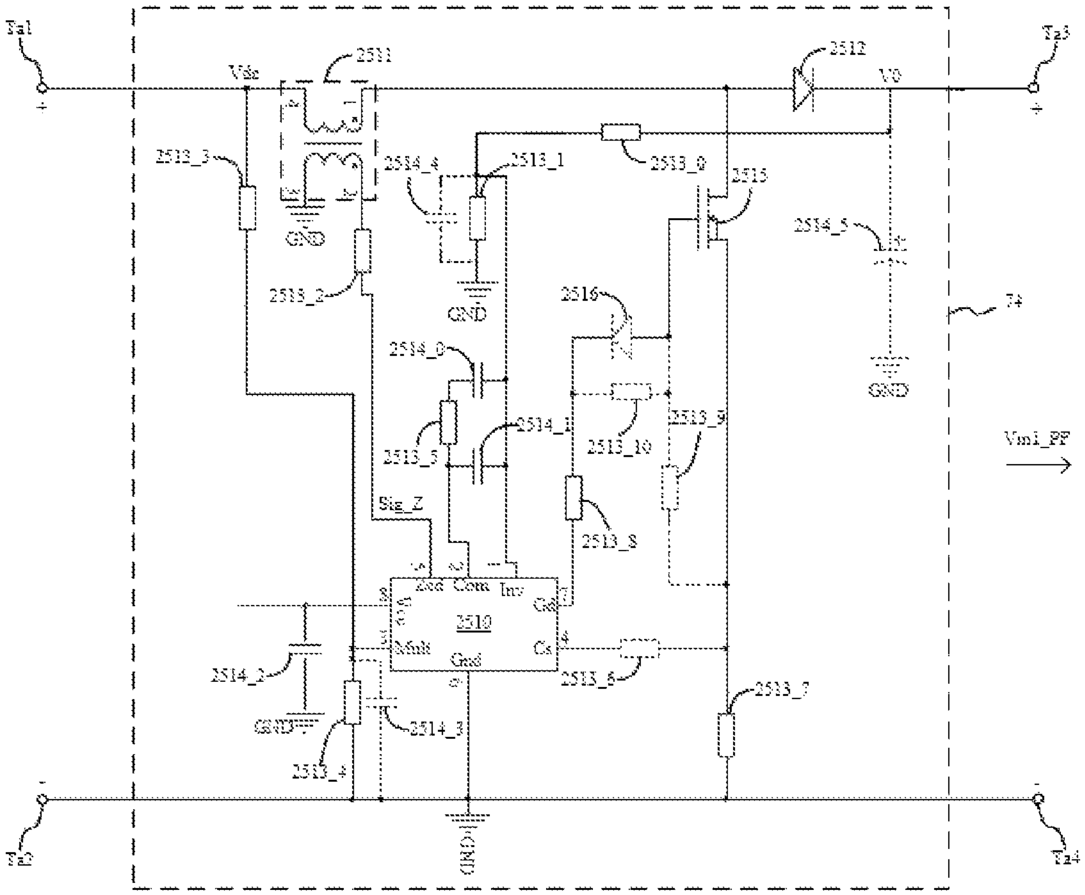
FIG. 4E is a circuit-structure diagram of a power factor correction circuit according to still another embodiment of the present disclosure.

FIG. 4E is a circuit-structure diagram of a power factor correction circuit according to still another embodiment of the present disclosure. As shown in FIG. 4E, a PFC circuit 74 in FIG. 4E includes a controller 2510, a transformer 2511, a diode 2512, a transistor 2515, resistors 2513_0, 2513_1, 2513_2, 2513_3, 2513_4, 2513_5, 2513_6, 2513_7, and 2513_8, and capacitors 2514_0 and 2514_1. The controller 2510 has an inverse input terminal Inv, an error amplification terminal Com, a multiplier input terminal Mult, a sampling terminal Cs, a zero-cross detection signal input terminal Zcd, a driving output terminal Gd, and a chip power supply terminal Vcc. The transformer 2511 has a terminal coupled to a first filtering output terminal Ta1 and another terminal coupled to an anode of the diode 2512, whose cathode is coupled to a PFC output terminal Ta3. The transistor 2512 has a first terminal coupled to a connection node between the transformer 2511 and the diode 2512, has a second terminal coupled through the resistor 2513_7 to a second filtering output terminal Ta2 (or a power supply's ground GND or a second pin 221), and has a control terminal coupled through the resistor 2513_8 to the driving output terminal Gd of the controller 2510. The sampling terminal Cs of the controller 2510 is coupled through the resistor 2513_6 to a connection node between the resistor 2513_7 and the second terminal of the transistor 2515. The chip power supply terminal Vcc is electrically connected to a constant voltage used to supply the controller 2510 with power. The inverse input terminal Inv is coupled to a voltage division circuit comprising the series-connected resistors 2513_0 and 2513_1, in order to obtain a voltage V0 outputted at the PFC output terminal Ta3. An RC compensation network comprising the resistor 2513_5 and capacitors 2514_0 and 2514_1 is coupled between the inverse input terminal Inv and the error amplification terminal Com, wherein a common end between the capacitors 2514_0 and 2514_1 is coupled to the inverse input terminal Inv, and the other end of the capacitor 2514_0 is connected through the resistor 2513_5 to the other end of the capacitor 2514_1 and together further connected to the error amplification terminal Com. The multiplier input terminal Mult is coupled to an output terminal between resistors 2513_3 and 2513_4 series-connected as a voltage division circuit between the first filtering output terminal Ta1 and the second filtering output terminal Ta2 (or a ground terminal). And the zero-cross detection signal input terminal Zcd is coupled through the resistor 2513_2 to the transformer 2511.

It should be noted that in FIG. 4E the PFC output terminal Ta3 connected to output from the PFC circuit 74 is also coupled to a capacitor 2514_5 in order to stabilize an electrical signal outputted by the active PFC circuit 74 by filtering out high-frequency interference signals. Since the capacitor 2514_5 may depending on actual circumstance of application be added or omitted, it's not a necessary component and thus is depicted with a dotted line in FIG. 4E. The same case of being optional also applies to any of at least the following circuit structures: a capacitor 2514_3 connected in parallel to two ends of the resistor 2513_4, a capacitor 2514_4 connected in parallel to two ends of the resistor 2513_1, a resistor 2513_9 coupled between the second terminal and control terminal of the transistor 2515, a diode 2516 and a resistor 2513_10 each coupled between the resistor 2513_8 and the control terminal of the transistor 2515, and the resistor 2513_6 coupled between the resistor 2513_7 and the sampling terminal Cs of the controller 2510. Such circuit structures/components each depicted with a dotted line may even be replaced with more complicated or simpler circuit structures. For example, the sampling terminal Cs of the controller 2510 may be directly connected through a conductive line to the resistor 2513_7; or the capacitor 2514_5 includes an energy storage circuit comprising at least two capacitors. Equivalent circuits or integrated circuits resulting from improving the above described embodiments of (elements) of the PFC circuit 74 should be regarded as covered specific embodiments of a PFC circuit.

Next, working operations of the PFC circuit 74 shown in FIG. 4E are described. A DC voltage signal V0 outputted by the PFC circuit 74 undergoes voltage division by a voltage division circuit comprising the series-connected resistors 2513_0 and 2513_1, resulting in a division voltage input to the inverse input terminal Inv of the controller 2510. The voltage signal Vdc inputted to the PFC circuit 74 undergoes voltage division by a voltage division circuit comprising the series-connected resistors 2513_3 and 2513_4, resulting in a division voltage input to the multiplier input terminal Mult, in order to determine the waveform and phase of the voltage signal Vdc. A high-frequency current sensed by a primary inductor (also called a primary coil or winding) of the transformer 2511 is input, through a secondary inductor (also called a secondary coil or winding) in mutual induction with the primary inductor and the resistor 2513_2, to the zero-cross detection signal input terminal Zcd as a zero-cross detection signal. When the transistor 2515 is in a conducting state, the voltage signal Vdc is input through the primary inductor of the transformer 2511 and the transistor 2515 to a reference low electric potential (such as the second filtering output terminal Ta2, a power supply's ground GND, or the second pin 221). During this stage and case, the transformer 2511 is storing energy (also referred to as charging into a magnetic field), an electrical signal outputted by the transistor 2515 is obtained/received by the sampling terminal Cs for sampling a current on the primary inductor in the transformer 2511; and concurrently the multiplier input terminal Mult of the controller 2510 receives the signal Vdc as sampled by the resistor 2513_3, and then generates an internal reference signal Vi based on the sampled signal Vdc, for detecting a sample signal received by the sampling terminal Cs based on the reference signal Vi. When a level of value of the sample signal received by the sampling terminal Cs reaches a level of value provided by the internal reference signal Vi, i.e., when the detected current on the primary inductor in the transformer 2511 reaches a peak value, the controller 2510 controls the transistor 2515 to cut it off. At this time in this case, the primary inductor of the transformer 2511 is releasing energy (also referred to as discharging from a magnetic field), so the secondary inductor of the transformer 2511 senses this operation of energy releasing and then outputs a zero-cross detection signal. When the transformer 2511 releases energy such that its output current decreases to close to a zero point, the zero-cross detection signal received by the controller 2510 is also close to a zero point; then the controller 2510 determines the closing time of the energy releasing operation according to the zero-cross detection signal received by the zero-cross detection signal input terminal Zcd, and uses a control logic, which is set based on detecting a detection result of the zero-cross detection signal, to output a signal from the driving output terminal Gd for driving the transistor 2515 into conducting current in order to supply later-stage circuit(s) with power.

In the previous aspect, the controller 2510 may selectively be a control chip having a special circuit integrated therein with the function of achieving reduced total harmonic distortions (also called reduced THD) or achieving power factor correction, in order to effectively control crossover distortion and ripple distortion caused in input current to the controller 2510, whereby improving power factor and reducing harmonic distortions. For example, the controller 2510 may be an integrated circuit of the chip L6562, the chip L6561, or the chip L6560. The transistor 2515 is a three-terminal controllable power device and is for example a Metal-oxide-semiconductor Field-effect Transistor (MOSFET), a Bipolar Junction Transistor (BJT), or a triode.

A circuit structure of a PFC circuit is not limited to any of those embodiments described or mentioned above, and may comprise a Boost-type PFC circuit, a Buck-type PFC circuit, a Boost-Buck PFC circuit, a Forward PFC circuit, or a Flyback PFC circuit.

Figure 5A:
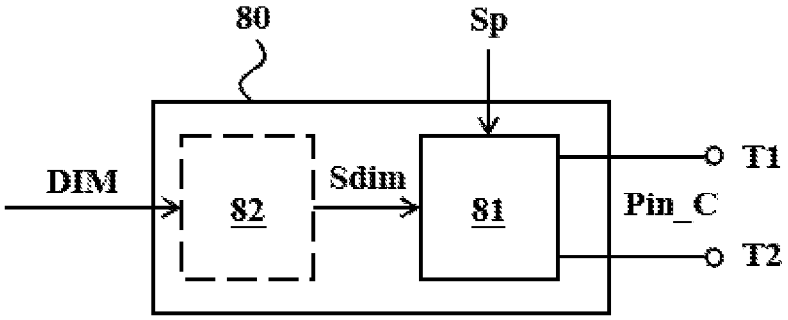
FIG. 5A is a diagram of functional modules of a dimmer according to some embodiments of the present disclosure.

FIG. 5A is a diagram of functional modules of a dimmer according to some embodiments of the present disclosure. Referring to FIG. 5A, a dimmer 80 includes a signal combining module 81 and an instruction transformation module 82. The signal combining module 81 is configured to perform modulation on a power signal Sp with a dimming signal Sdim, in order to produce a modulated power signal Pin_C resulting from the dimming process. Or in other words the signal combining module 81 combines or synthesizes a power signal Sp and a dimming signal Sdim to produce a modulated power signal Pin_C. The instruction transformation module 82 is configured to receive a dimming instruction DIM and transform the dimming instruction DIM into the dimming signal Sdim in specific format. The dimming signal Sdim in specific format may be for example a signal indicative of a timing or period of performing phase cutting, a frequency-changing signal (a signal having variable or changing frequency) in response to a dimming message, or a digital code (as comprising a square wave of a specific sequence of high/low electrical levels) in response to a dimming message. These signal formats can each be presented in the form or a pulse signal or a square wave signal. So the dimming signal Sdim in appearance may be a signal comprising two signal states of high and low electrical levels respectively. It's noted that an electrical level mentioned herein is for example a voltage level.

In other embodiments, an instruction transformation module 82 may be referred to as a dimming signal generating module. A signal combining module 81 may be referred to as a signal combining processing module. And a power conversion circuit may be referred to as a power conversion unit.

Figure 5B:
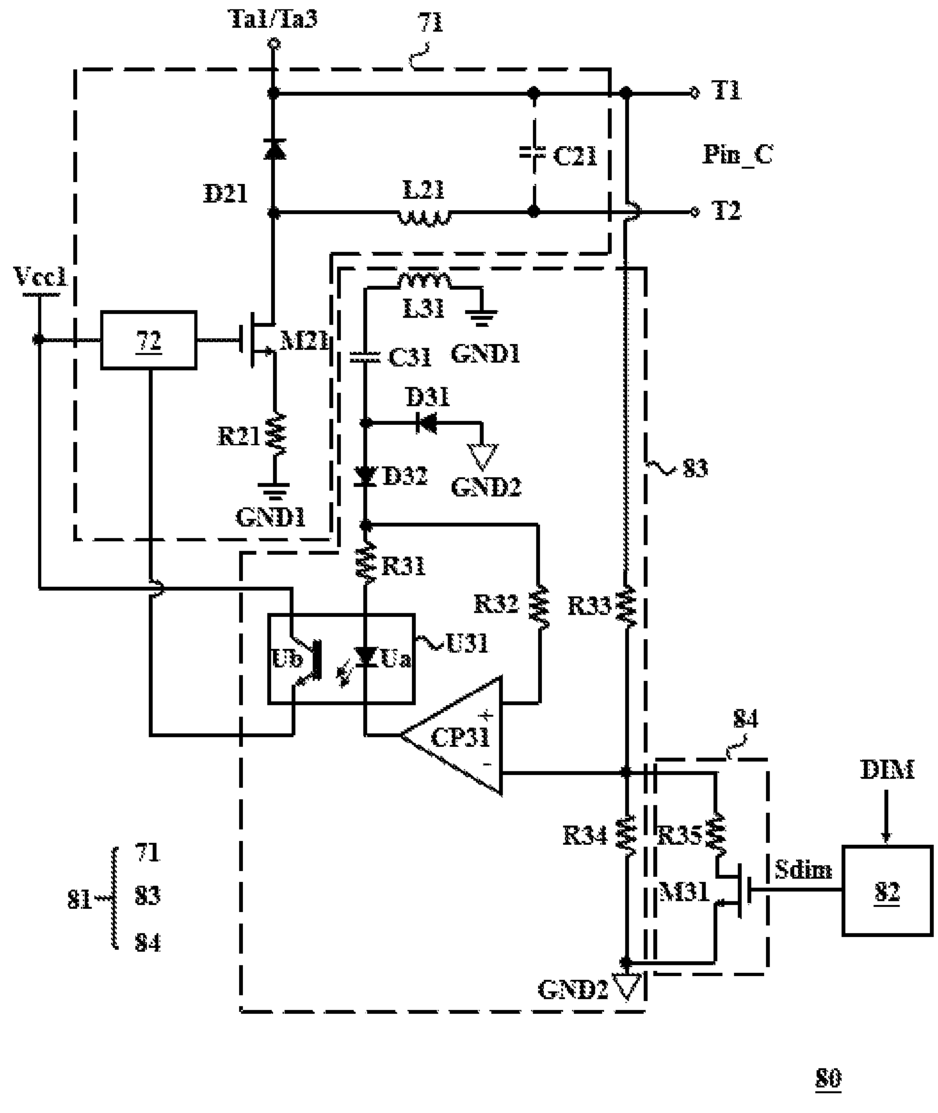
FIG. 5B is a circuit-structure diagram of a dimmer according to some embodiments of the present disclosure.

Next, specific circuit configurations of a dimmer 80 in some embodiments are described with FIG. 5B. FIG. 5B is a circuit-structure diagram of a dimmer according to some embodiments of the present disclosure. Referring to FIG. 5B, a signal combining module 81 may include for example a power conversion circuit 71, a feedback adjusting circuit 83, and a signal generating circuit 84, wherein relevant configurations and operations of the power conversion circuit 71 are similar to and can be understood by referring to those described above in embodiments illustrated in FIG. 4B, and so are not described again. In these embodiments of FIG. 5B, the feedback adjusting circuit 83 is electrically connected to the power conversion circuit 71, and configured to according to a signal state on a power output terminal (such as an output terminal of the dimmer 80) generate a corresponding feedback signal as a feedback to a switching control circuit 72 of the power conversion circuit 71, for the switching control circuit 72 to adjust its control of the transistor M21 according to the feedback signal, in order to further compensate for signal fluctuation on the power output terminal, to stabilize an output from the power conversion circuit 71. The signal generating circuit 84 is electrically connected to the feedback adjusting circuit 83, and is configured to determine whether to adjust voltage on the power output terminal T1/T2 according to a signal state of a dimming signal Sdim.

In other embodiments, the feedback adjusting circuit 83 and the signal generating circuit 84 may be collectively referred to as a feedback adjusting unit. The feedback adjusting unit is configured to, based on a dimming signal Sdim outputted by an instruction transformation module 82, adjust a sample signal obtained from the power output terminal T1/T2 and configured to based on the adjusted sample signal output a feedback signal to be transmitted to the power conversion circuit 71. The power conversion circuit 71 then performs energy conversion on a power signal obtained from a pin Ta1/Ta3, based on the feedback signal, in order to output an output signal at the power output terminal T1/T2 and having the synthesized dimming signal.

Specifically, when a dimming signal Sdim has a low electrical level, the signal generating circuit 84 does not adjust the voltage on the power output terminal T1/T2, so the feedback signal outputted by the feedback adjusting circuit 83 does not present significant or large fluctuation or variation, causing the voltage on the power output terminal T1/T2 to maintain dynamically stable above a set voltage.

When a dimming signal Sdim rises or switches from a low electrical level to a high electrical level, the signal generating circuit 84 pulls up the voltage on the power output terminal T1/T2, which sudden or instantaneous rising of voltage would impact operation of the feedback adjusting circuit 83, causing the feedback adjusting circuit 83 to output a corresponding feedback signal to indicate for the switching control circuit 72 to adjust the voltage on the power output terminal T1/T2 to the set voltage. Subsequently, when the dimming signal Sdim falls or switches from a high electrical level to a low electrical level again, the signal generating circuit 84's operation to adjust the voltage on the power output terminal T1/T2 stops or disappears and the power conversion circuit 71 is still inclined to adjust the voltage on the power output terminal T1/T2 down to approaching the set voltage, then the voltage on the power output terminal T1/T2 would quickly be pulled down to be around the set voltage. Accordingly, during the process that the voltage on the power output terminal T1/T2 is pulled up in response to control by the signal generating circuit 84, and then pulled down to the set voltage in response to control by the power conversion circuit 71 and the feedback adjusting circuit 83, a pulse/square waveform would be formed and superposed on the set voltage at the power output terminal T1/T2, which waveform is largely synchronous with the dimming signal Sdim. The signal of the set voltage having the pulse/square waveform superposed thereon is just a modulated power signal Pin_C generated by the dimmer 80.

In some embodiments, the feedback adjusting circuit 83 includes an inductor L31, a capacitor C31, resistors R31-R34, diodes D31-D32, an operational amplifier unit CP31, and an optical coupler unit U31, wherein the inductor L31, capacitor C31, resistors R31-R32, and diodes D31-D32 may constitute a feedback auxiliary module, and the resistors R33 and R34 may constitute a resistor module.

Specifically, in a feedback auxiliary module, the inductor L31 has one end electrically connected to a ground terminal GND1, and is configured to be coupled to the inductor L21, in order to sense a signal on the inductor L21. The capacitor C31 has one end electrically connected to the other end of the inductor L31. The diode D31 has an anode electrically connected to a ground terminal GND2, and has a cathode electrically connected to the other end of the capacitor C31. The diode D32 has an anode electrically connected to the cathode of the diode D31 and the other end of the capacitor C31, and has a cathode electrically connected to a common end of and between the resistors R31 and R32, which resistor R31 has the other end electrically connected to the optical coupler unit U31. The operational amplifier unit CP31 has a first input terminal electrically connected to the other end of the resistor R32; a second input terminal electrically connected to the resistor module and the signal generating circuit 84; and an output terminal electrically connected to the optical coupler unit U31. In some embodiments, the first terminal of the operational amplifier unit CP31 may further be electrically connected to a voltage stabilizer or Zener diode, but the present invention is not limited to its being connected to a voltage stabilizer. The optical coupler unit U31 includes a light emitting component Ua and a photoresisting component Ub, which light emitting component Ua has an anode electrically connected to the other end of the resistor R31 and an a cathode electrically connected to the output terminal of the operational amplifier unit CP31. The photoresisting component Ub has one terminal electrically connected to a biasing voltage source Vcc1 (which may be generated through voltage division from a power line or generated by an auxiliary winding), and has another terminal electrically connected to a feedback control terminal of the switching control circuit 72.

The resistor module is configured to perform voltage division from a voltage on the power output terminal T1 and configured to provide a division voltage signal to the operational amplifier unit CP31. In the resistor module, the resistors R33 and R34 are series-connected between the power output terminal T1 and the ground terminal GND2, and a connection node between the resistors R33 and R34 is electrically connected to the second input terminal of the operational amplifier unit CP31. In other words, the second input terminal of the operational amplifier unit CP31 may be regarded as being electrically connected to a voltage division point on the resistor module, in order to receive the division voltage signal or sample signal. A signal outputted by the operational amplifier unit CP31 is a feedback signal, which is transmitted through the optical coupler unit U31 to the switching control circuit 72.

The signal generating circuit 84 includes a resistor R35 and a transistor M31. The resistor R35 has an end electrically connected to the second input terminal of the operational amplifier unit CP31 and the connection node between the resistors R33 and R34. The transistor M31 has a first terminal, a second terminal, and a control terminal, which first terminal is electrically connected to the other end of the resistor R35, which second terminal is electrically connected to the ground terminal GND2, and which control terminal is electrically connected to the instruction transformation module 82 in order to receive a dimming signal Sdim.

In other embodiments, the signal generating circuit 84 may be referred to as an adjusting circuit; the resistors R33 and R34 may be referred to as a sampling circuit; the operational amplifier unit CP31 may be referred to as a comparing circuit; the optical coupler unit U31 may be referred to as a signal transmission circuit; and the inductor L31, capacitor C31, and diodes D31-D32 may be referred to as a reference-signal generating circuit. And the first input terminal of the operational amplifier unit CP31 may be a positive input terminal, while the second input terminal may be a negative input terminal.

Figure 8A:
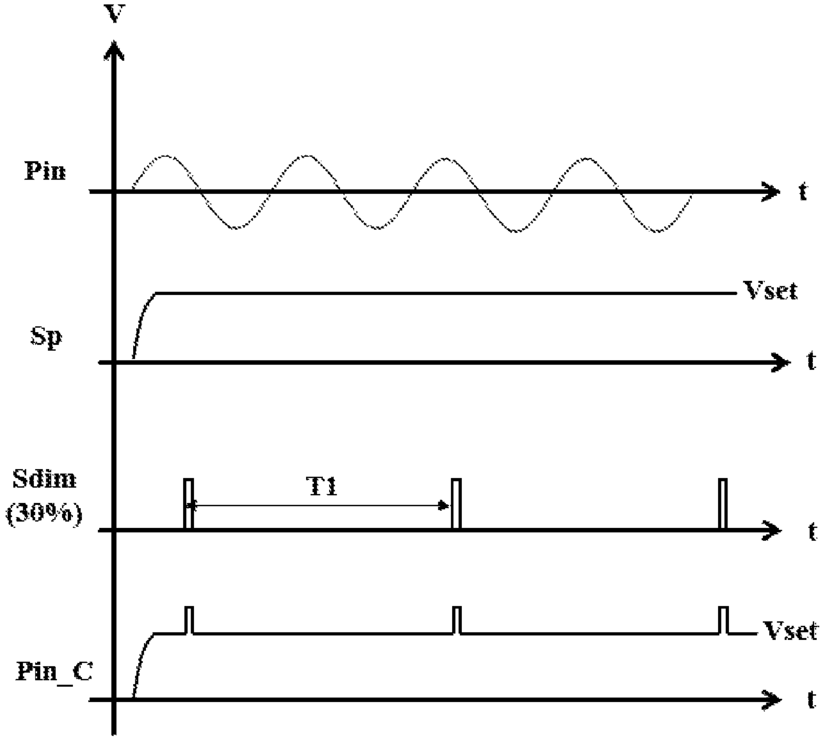
FIG. 8A and FIG. 8B are signal waveform diagrams of signals of a dimmer according to some embodiments of the present disclosure.
Figure 8B:
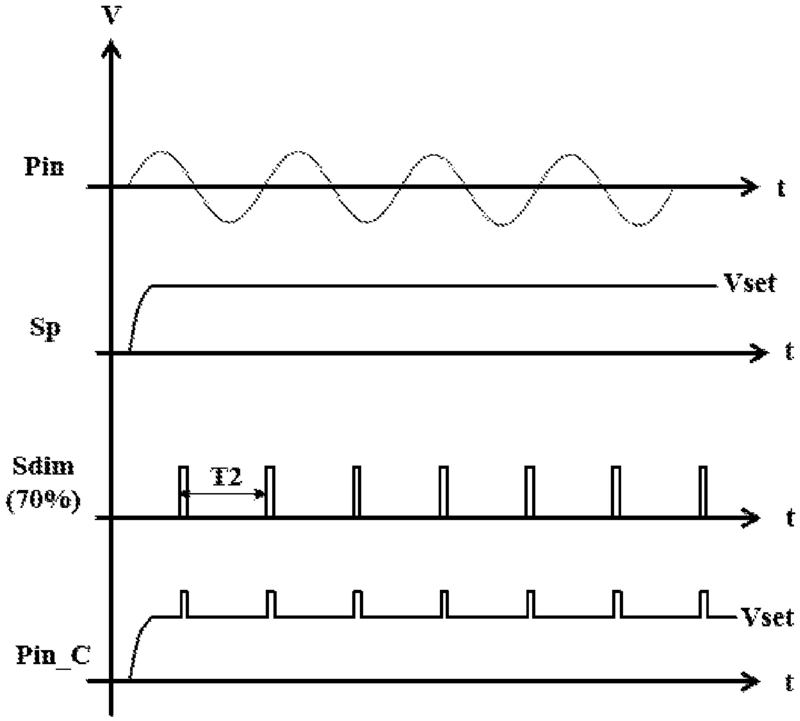

Specific concrete circuit operations of a dimmer 80 are described here for example with illustrations in FIGS. 8A and 8B. FIG. 8A and FIG. 8B are signal waveform diagrams of signals of a dimmer according to some embodiments of the present disclosure. In the embodiments illustrated by FIG. 8A and FIG. 8B, an example is taken where a dimming signal Sdim is a pulse signal whose frequency is varied according to a message of luminance indicated by a dimming instruction DIM, but the present invention is not limited thereto.

Referring first to both FIG. 5B and FIG. 8A, when an instruction transformation module 82 receives an instruction to adjust a luminance to be at 30% of a maximum luminance, the instruction transformation module 82 is configured to generate a dimming signal Sdim having a period T1 for the control terminal of the transistor M31. When the dimming signal Sdim is at a low electrical level, the transistor M31 maintains in a cutoff state, so the resistor R35 is as connected in a floating state, which case doesn't affect/impact the voltage on the power output terminal T1 and operation(s) of the feedback adjusting circuit 83. When the dimming signal Sdim is at a high electrical level, the transistor M31 enters into or is in a conducting state, causing the resistor R35 to be in effect connected in parallel with the resistor R34, which parallel-connected R35 and R34 causes an impedance between the second input terminal of the operational amplifier unit CP31 and the ground terminal GND2 to decrease and thus the voltage on the power output terminal T1 to increase in response. In another regard, since the operational amplifier unit CP31 causes variation of a signal at its output terminal in response to voltage variation at its second input terminal, which signal variation at its output terminal then affects luminous flux or amount from the light emitting component Ua, which variation of luminous flux then causes a corresponding variation in the extent of conducting by the photoresisting component Ub. A variation in the extent of conducting by the photoresisting component Ub affects/impacts the magnitude of voltage fed back to the feedback control terminal of the switching control circuit 72, causing the switching control circuit 72 to tend to reduce the duty cycle of the transistor M21 when the dimming signal Sdim is at a high electrical level, in order to quickly pull down the suddenly increased voltage on the power output terminal T1 to the set voltage Vset.

Accordingly, when the dimming signal Sdim falls or switches from a high electrical level to a low electrical level again, the voltage on the power output terminal T1 quickly goes back to the set voltage Vset, causing a pulse signal having a period T1 to be formed, approximately synchronously with the dimming signal Sdim, on the basis of the set voltage Vset on a modulated power signal Pin_C. In general, the dimming signal Sdim may be seen as being superposed on the power signal Sp to form a modulated power signal Pin_C.

From another angle of description, when the dimming signal Sdim rises or switches from a low electrical level to a high electrical level, the transistor M31 enters into or is in a conducting state, causing the resistors R35 and R34 to be connected in parallel, which parallel-connected R35 and R34 causes an impedance between the second input terminal of the operational amplifier unit CP31 and the ground terminal GND2 to decrease and therefore a division voltage at the second input terminal of the operational amplifier unit CP31 to decrease, while the voltage at the first input terminal of the operational amplifier unit CP31 is not changed. Therefore, in this case, in order to maintain/keep the voltages respectively at the first and second input terminals of the operational amplifier unit CP31 at approximately the same electrical level, a signal output by the operational amplifier unit CP31 is transmitted through the signal transmission circuit U31 to the switching control circuit 72, causing the switching control circuit 72 to adjust the output voltage of the power conversion circuit, or the voltage on the power output terminal T1, to increasing. When the voltage on the power output terminal T1 is increased, the division voltage at the second input terminal of the operational amplifier unit CP31 increases to an electrical level approximately the same as that at the first input terminal of the operational amplifier unit CP31. Accordingly, in general, when the dimming signal Sdim is at a low electrical level, the transistor M31 is cut off and then the voltage on the power output terminal T1 is the set voltage Vset; and when the dimming signal Sdim is at a high electrical level, the transistor M31 conducts current and then the voltage on the power output terminal T1 increases. The magnitude of the increase of the voltage on the power output terminal T1 is related to the values of the resistors R33, R34, and R35.

In other embodiments, through changing the resistance of resistor(s) in the sampling circuit it may be realized that when a dimming signal Sdim is at a low electrical level, the voltage on a power output terminal T1 is a set voltage Vset; and when the dimming signal Sdim is at a high electrical level, the voltage on the power output terminal T1 is decreased.

In the embodiments illustrated by FIG. 5B, the first input terminal of the operational amplifier unit CP31 is coupled to a constant-voltage source or a reference-signal generating circuit, in order to receive a reference signal Vref.

Referring then to both FIG. 5B and FIG. 8B, when an instruction transformation module 82 receives an instruction to adjust a luminance to be at 70% of the maximum luminance, the instruction transformation module 82 is configured to generate a dimming signal Sdim having a period T2 for the control terminal of the transistor M31, wherein the period T2 is smaller than the period T1, meaning the frequency of the dimming signal Sdim corresponding to 30% of the maximum luminance is smaller than that of the dimming signal Sdim corresponding to 70% of the maximum luminance. In both cases of when the dimming signal Sdim is at a low electrical level and when the dimming signal Sdim is at a high electrical level, operations of the feedback adjusting circuit 83 and the signal generating circuit 84 are for each case similar to those in the embodiment(s) illustrated in FIG. 8A, causing a pulse signal having a period T2 to be formed, approximately synchronously with the dimming signal Sdim, on the basis of the set voltage Vset on a modulated power signal Pin_C. In general, the dimming signal Sdim may be seen as being superposed on a power signal Sp to form a modulated power signal Pin_C.

In the above embodiments, the signal combining module 81 may be regarded as using existing configurations of a power conversion circuit 71 to realize some functions in signal combining, so in this case the power conversion circuit 71 is regarded as part of the signal combining module 81. But according to classification of functional modules in some embodiments, the signal combining module 81 may be regarded as not including a power conversion circuit 71, but including merely a feedback adjusting circuit 83 and a signal generating circuit 84, wherein the signal combining module 81 cooperates with a power conversion circuit 71 to generate a modulated power signal Pin_C. Besides, according to classification of functional modules in some other embodiments, the feedback adjusting circuit 83 may be regarded as part of a power conversion circuit 71. Specific concrete configurations of a power conversion circuit 71 can be understood by referring to the description of the above mentioned embodiments, and thus their description is not repeated again here.

Figure 5C:
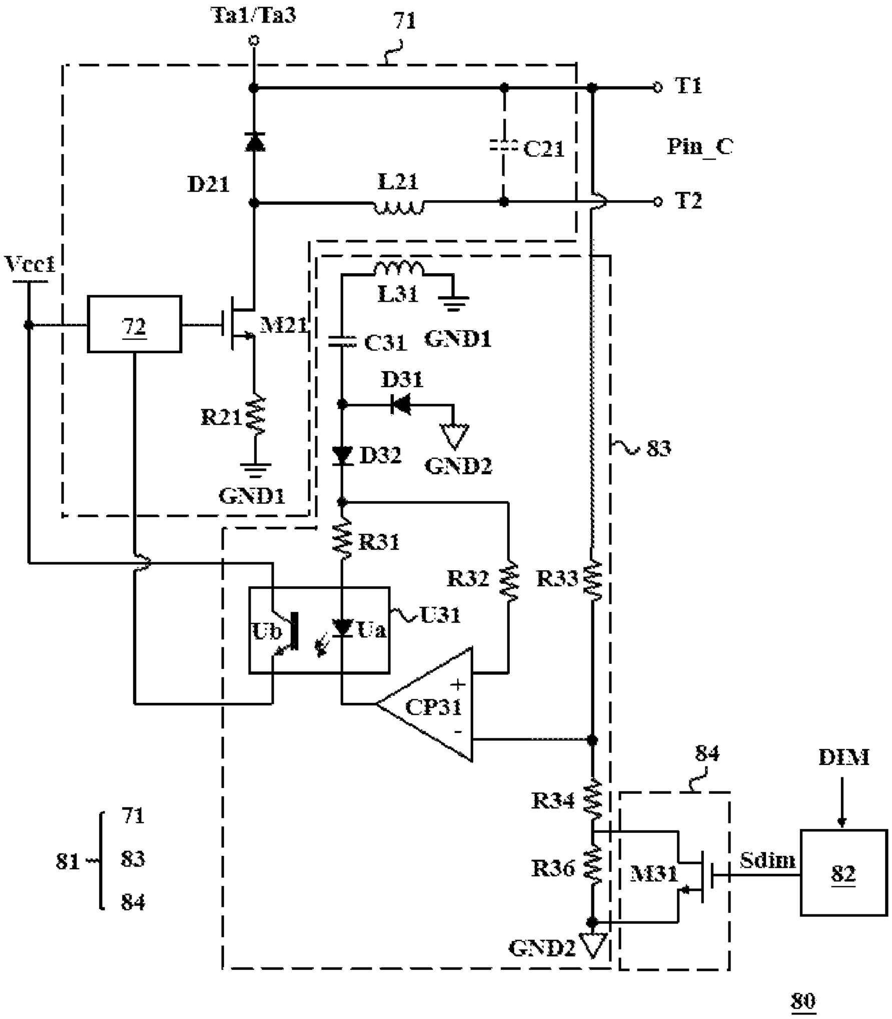
FIG. 5C is a circuit-structure diagram of a dimmer according to another embodiment of the present disclosure.

FIG. 5C is a circuit-structure diagram of a dimmer according to another embodiment of the present disclosure. The circuit structure for a dimmer illustrated in FIG. 5C is similar to that in FIG. 5B, with differences that a signal generating circuit 84 in the embodiment of FIG. 5C includes a transistor M31, connected in parallel with a resistor R36; and that a sampling circuit includes resistors R33, R34, and R36, which are connected in series between a power output terminal T1 and a ground terminal GND2. The signal generating circuit 84 in the embodiment of FIG. 5C is configured to adjust an impedance between a second input terminal of an operational amplifier unit CP31 and the ground terminal GND2, by bypassing the resistor R36 in the sampling circuit, in order to affect/impact the voltage on the power output terminal T1. Operations of other components in FIG. 5C are similar to those of counterpart components in FIG. 5B, and thus are not described again here. In other embodiments, other methods/manners may be employed to adjust the impedance between the second input terminal of an operational amplifier unit CP31 and the ground terminal GND2, for example by using a controllable varistor or variable-resistor such as a power device whose linear region corresponds to the range of voltage variation in the dimming signal. For example, a controllable varistor may be connected in series or in parallel with a resistor used for voltage division in the sampling circuit, and has a control terminal configured to receive a dimming signal Sdim, for adjusting/varying the controllable varistor's impedance/resistance according to a variation in the dimming signal Sdim, thereby adjusting a sample signal outputted by the sampling circuit. The signal amplitude or magnitude of the sample signal reflects a message of luminance of a dimming signal.

Figure 5D:
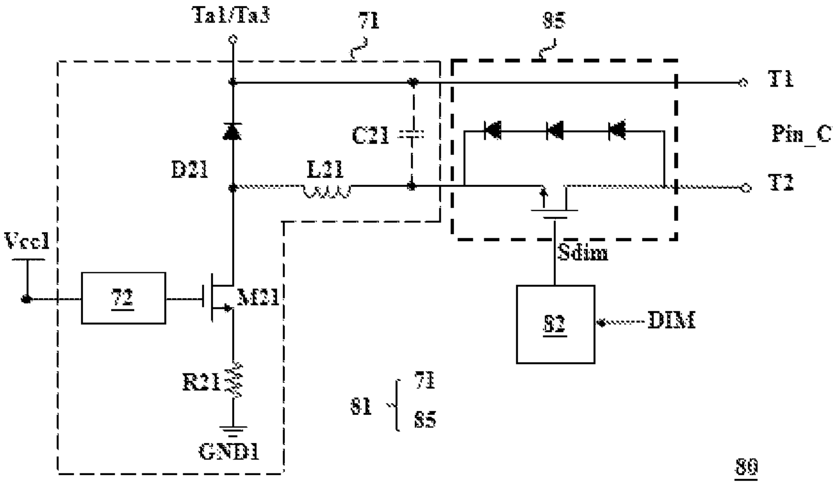
FIG. 5D is a circuit-structure diagram of a dimmer according to still another embodiment of the present disclosure.

FIG. 5D is a circuit-structure diagram of a dimmer according to an embodiment of the present disclosure. A signal combining module 81 in the embodiment of FIG. 5D includes a power conversion circuit 71 and a signal combining processing module 85. The signal combining processing module 85 is electrically connected to the power conversion circuit 71, and is configured to according to a dimming signal Sdim adjust a voltage on a power output terminal T1. Similar to the above mentioned embodiment(s), an output voltage (the voltage on the power output terminal T1) from the power conversion circuit 71 is adjusted according to a dimming signal Sdim, with this embodiment of FIG. 5D using technical means different from that used in the above mentioned embodiments.

The signal combining processing module 85 includes a transistor M32 and diodes D33, D34, and D35. The transistor M32 has a first pin or terminal electrically connected to one end of an inductor L21, a second pin or terminal electrically connected to a second power output terminal T2, and a third pin or terminal electrically connected to an instruction transformation module 82. And the diodes D33, D34, and D35 are connected in series and together connected in parallel across the first pin and the second pin of the transistor M32.

With reference to FIG. 8A, the transistor M32 of FIG. 5D is configured to conduct current or be cut off, under the control by the dimming signal Sdim. When the dimming signal Sdim is at a low electrical level, the transistor M32 is cut off, causing a power signal outputted by the power conversion circuit 71 to be provided for an LED lighting apparatus through a first transmission path composed of the diodes D33, D34, and D35, resulting in a modulated power signal Pin_C having a voltage Vset. On the other hand, when the dimming signal Sdim is at a high electrical level, the transistor M32 conducts a current bypassing the diodes D33, D34, and D35, causing a power signal outputted by the power conversion circuit 71 to be provided for the LED lighting apparatus through a second transmission path composed of the transistor M32, resulting in the modulated power signal Pin_C having a voltage Vset1.

Because the second transmission path has circuit impedance smaller than that of the first transmission path, compared to the modulated power signal Pin_C having the voltage Vset produced by current-conducting through the first transmission path, the modulated power signal Pin_C has the voltage Vset1 produced by current-conducting through the second transmission path and larger than the voltage Vset. Accordingly, in this manner, a pulse signal, having a pulse amplitude of (Vset1-Vset), having substantially the same frequency and pulse width as those of the dimming signal Sdim is formed on the modulated power signal Pin_C.

In other embodiments, the diodes D33, D34, and D35 may be collectively referred to as a voltage division unit, and the transistor M32 may be referred to as a control unit.

According to the above descriptions of the above mentioned embodiments, a technical person skilled in the relevant art of the present invention can understand how to realize outputting by a dimmer of a modulated power signal Pin_C having or carrying a dimming message. Next, further descriptions follow on how an LED lighting apparatus is configured to light up by using a modulated power signal Pin_C, to demodulate from the modulated power signal Pin_C to produce a dimming message, and to adjust its control of LEDs according to the dimming message.

More concretely speaking, a demodulation process performed by a demodulating module 140 on a modulated power signal Pin_C may comprise for example signal conversion/transformation method(s) such as sampling, time counting, and/or mapping. Further descriptions follow on configuration(s) and circuit operation of a demodulating module 140 illustrated by FIG. 7A to 7C. FIG. 7A is a diagram of functional modules of a demodulating module according to some embodiments of the present disclosure, and FIG. 7B and FIG. 7C are circuit-structure diagrams of an LED lighting apparatus according to some embodiments of the present disclosure.

Referring first to FIG. 7A, a demodulating module 140 in the embodiments of FIG. 7A includes a sampling circuit 141 and a signal transformation circuit 145. The sampling circuit 141 is configured to receive a modulated power signal Pin_C; to sample/obtain a message of luminance from the modulated power signal Pin_C; and to generate a luminance instruction signal Sdim' corresponding to a dimming signal (such as Sdim) in a dimmer. The signal transformation circuit 145 is electrically connected to the sampling circuit 141 in order to receive the luminance instruction signal Sdim', and is configured to generate a dimming control signal Sdc, according to the luminance instruction signal Sdim', for controlling later-stage circuit(s). The signal format of the dimming control signal Sdc may be designed or adjusted according to the type of any later-stage circuit. For example, if a demodulating module 140 is configured for realizing dimming function through controlling a driving circuit 130, the dimming control signal Sdc may be e.g. a signal having at least one of its electrical level/amplitude, frequency, and pulse width in proportion to a dimming message. And, if a demodulating module 140 is configured for realizing dimming function through controlling a dimming switch 150, the dimming control signal Sdc may be e.g. a signal having its pulse width in proportion to a dimming message.

Next, a concrete example of a demodulating module 140 according to some embodiments of the present disclosure is described and illustrated in FIGS. 7B and 7C. Referring to FIG. 7B, in a power module in some embodiments illustrated in FIG. 7B, a driving circuit 130 includes a switching control circuit 131 and a conversion circuit 132, and a demodulating module 140 includes a sampling circuit 141 and a signal transformation circuit 145*a*. In the driving circuit 130, the conversion circuit 132 includes a resistor R41, an inductor L41, a freewheeling diode D41, a capacitor C41, and a transistor M41, wherein connection configuration among these components is similar to that among the resistor R21, inductor L21, freewheeling diode D21, capacitor C21, and transistor M21 in some embodiments illustrated in FIG. 4B and is thus not described again here. The sampling circuit 141 includes a coupling circuit 142. The coupling circuit 142 is electrically connected to a first connection terminal 101, a second connection terminal 102, and the signal transformation circuit 145*a*, and is configured to filter out DC component in a modulated power signal Pin_C, in order to further obtain/extract a dimming message from the modulated power signal Pin_C. The coupling circuit 142 comprises or is realized by for example a coupling capacitor C51.

In some embodiments, the sampling circuit 141 further includes a plurality of electronic components for stabilizing or adjusting voltage level, such as resistors R51-R53 and a zener diode ZD51. The coupling capacitor C51 has one end electrically connected to the first connection terminal 101. The resistor R51 is electrically connected between another end of the coupling capacitor C51 and the second connection terminal 102. The resistor R52 has one end electrically connected to a connection node between the coupling capacitor C51 and the resistor R51, and has another end electrically connected to the signal transformation circuit 145*a*. The resistor R53 is electrically connected between the other end of the resistor R52 and the second connection terminal 102. The zener diode ZD51 is connected in parallel with the resistor R51. Under this above configuration, a signal at the connection node between the resistors R52 and R53 may be a luminance instruction signal Sdim'.

The signal transformation circuit 145*a* is configured to generate a dimming control signal Sdc, based on a message of luminance indicated by a luminance instruction signal Sdim', to be provided to the switching control circuit 131, wherein the dimming control signal Sdc has its frequency, voltage, or duty cycle corresponding to the message of luminance. Then the switching control circuit 131 may generate a lighting control signal Slc, according to the dimming control signal Sdc, for adjusting switching action of the transistor M41 to further cause a driving power signal Sdry produced by the driving circuit 130 to vary with or in response to the message of luminance. In other embodiments, the lighting control signal may also be referred to as a dimming instruction signal.

Figure 9A:
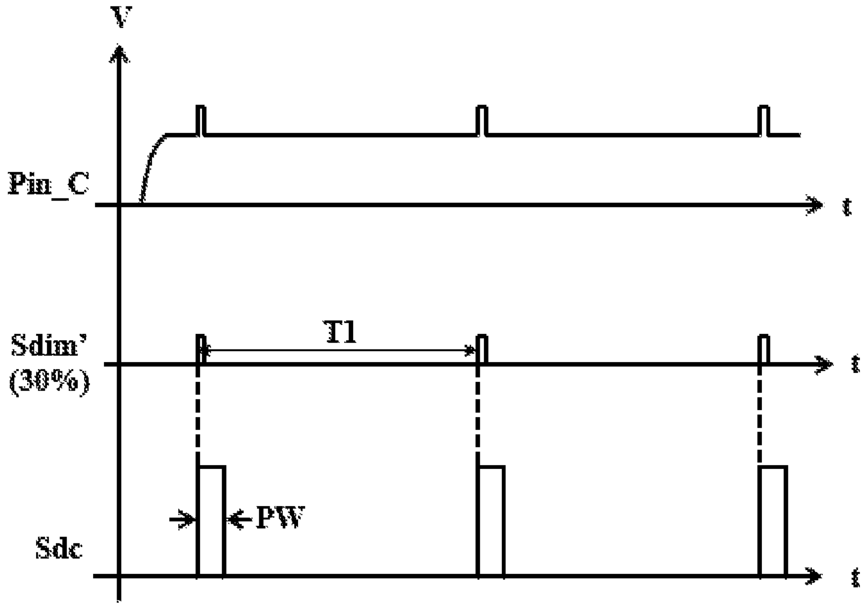
FIGS. 9A-9D are signal waveform diagrams of signals of an LED lighting apparatus according to some embodiments of the present disclosure.
Figure 9B:
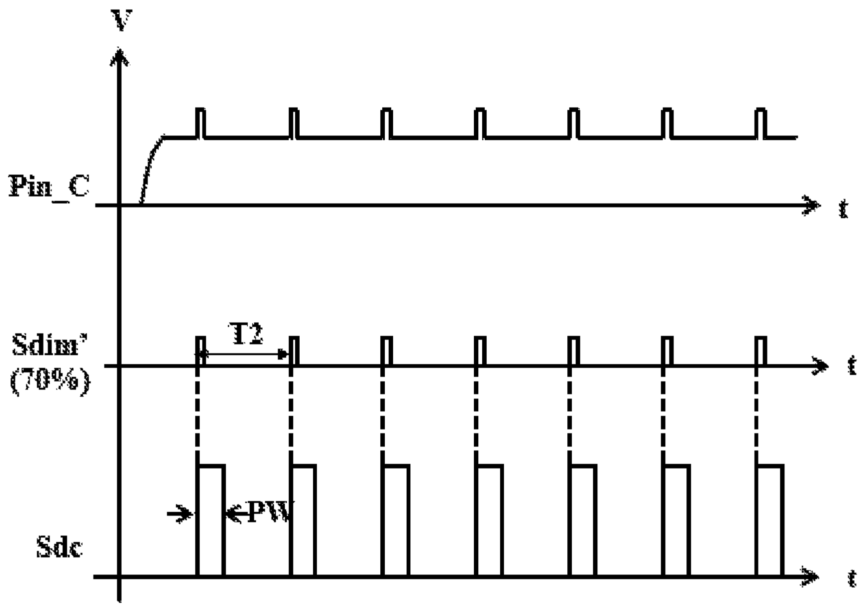

Operations of the above described demodulating module 140 are described with reference to FIGS. 9A and 9B. FIGS. 9A-9B are signal waveform diagrams of signals of an LED lighting apparatus according to some embodiments of the present disclosure. Similar to the embodiments described above in FIGS. 5B, 8A, and 8B, an example of adjusting luminance of an LED module to respectively being 30% of a maximum luminance and being 70% of the maximum luminance is taken for description of embodiments illustrated in FIGS. 9A and 9B, but the present invention is not limited to this example. Referring to FIGS. 7B, 9A, and 9B, when an LED lighting apparatus receives a modulated power signal Pin_C having a DC component (such as a DC set voltage Vset) and an AC component (such as a pulse signal based on the set voltage Vset), in one aspect the driving circuit 130 of FIG. 7B is activated and performs power conversion to generate a driving power signal Sdry in response to the modulated power signal Pin_C; and in another aspect the demodulating module 140 of FIG. 7B couples-in the AC component of the modulated power signal Pin_C, through the coupling capacitor C51, and performs voltage division and stabilization on the AC component through the resistors R51-R53 and the zener diode ZD51, in order to generate a luminance instruction signal Sdim'. The luminance instruction signal Sdim' comprises for example a signal having a pulse waveform including pulses whose occurrence is largely synchronous with the AC component of the modulated power signal Pin_C. A dimming message or luminance message provided by a dimmer may be regarded as being included in a frequency message/information of the luminance instruction signal Sdim'. As shown in FIGS. 9A and 9B, the frequency of the luminance instruction signal Sdim' corresponding to 30% of the maximum luminance is smaller than that of the luminance instruction signal Sdim' corresponding to 70% of the maximum luminance. That is, the period T1 of the luminance instruction signal Sdim' corresponding to 30% of the maximum luminance is larger than the period T2 of the luminance instruction signal Sdim' corresponding to 70% of the maximum luminance.

The luminance instruction signal Sdim' is configured to trigger the signal transformation circuit 145*a* to generate a square wave having a fixed pulse width PW as a dimming control signal Sdc. FIGS. 9A and 9B illustrate an example of the signal transformation circuit 145*a* being triggered to generate a square wave based on a rising edge, a sharp-changing edge, of the luminance instruction signal Sdim', but the present invention is not limited to this example. In other embodiments, an example may be taken of the signal transformation circuit 145*a* being triggered to generate a square wave based on a falling edge, a sharp-changing edge, of the luminance instruction signal Sdim', or an example may be taken of the signal transformation circuit 145*a* being triggered to generate a square wave based on judging whether the voltage of the luminance instruction signal Sdim' reaches a specific value. Besides, since the square wave of the dimming control signal Sdc is generated based on triggering by pulses on the luminance instruction signal Sdim', the frequency of the dimming control signal Sdc is largely the same as that of the luminance instruction signal Sdim'.

Through the above described signal transformation operations, when the switching control circuit 131 receives a dimming control signal Sdc indicating an instruction to adjust a luminance to be at 30% of a maximum luminance, the switching control circuit 131 is configured to reduce the duty cycle of the transistor M41 in order to lower the value of current in a driving power signal Sdry to be 30% of its current rating. And when the switching control circuit 131 later receives a dimming control signal Sdc indicating an instruction to adjust a luminance to be at 70% of the maximum luminance, the switching control circuit 131 is configured to increase the duty cycle of the transistor M41 in order to increase the value of current in a driving power signal Sdry from 30% to 70% of its current rating, whereby realizing dimming effects.

FIG. 7C is a circuit-structure diagram of an LED lighting apparatus according to some embodiments of the present disclosure, and illustrates a configuration of another demodulating module 140 therein. Next, referring to FIG. 7C, configurations of these embodiments of an LED lighting apparatus are largely the same as or similar to those of the embodiments of FIG. 7B, with a main difference that a sampling circuit 141 in these embodiments of FIG. 7C further includes a transistor M51 and a resistor R54, and a signal transformation circuit 145*b* (instead of 145*a*) is configured to be triggered based on a falling edge of a luminance instruction signal Sdim'. The transistor M51 and resistor R54 are configured to constitute a signal inversion module, in order to invert a signal at the connection node between resistors R52 and R53 and then output the luminance instruction signal Sdim'. The transistor M51 and resistor R54 may also be referred to as a signal transformation circuit.

Specifically, the transistor M51 has a first terminal, a second terminal, and a control terminal, which first terminal is electrically connected to the signal transformation circuit 145*b*, which second terminal is electrically connected to a second connection terminal 102 (also regarded as a ground terminal GND2), and which control terminal is electrically connected to the connection node between the resistors R52 and R53. The resistor R54 has one end electrically connected to a biasing voltage Vcc2 (which may be generated through voltage division from a power line) and another end electrically connected to the first terminal of the transistor M51. And a signal at the connection node between the transistor M51 and resistor R54 may be a luminance instruction signal Sdim'.

In the embodiments of FIG. 7C, a signal at the connection node between the resistors R52 and R53 may be a control signal for the transistor M51. When the control signal is at a high electrical level, the transistor M51 conducts current and then the first terminal of the transistor M51 is regarded as being shorted to the ground terminal GND2, causing the luminance instruction signal Sdim' to be pulled down to a low electrical level or ground level. When the control signal is at a low electrical level, the transistor M51 is cut off and thus the luminance instruction signal Sdim' is pulled up to a high electrical level or the biasing voltage Vcc2. In other words, the signal level of the luminance instruction signal Sdim' is an inversion of the signal level at the connection node between the resistors R52 and R53.

Figure 9C:
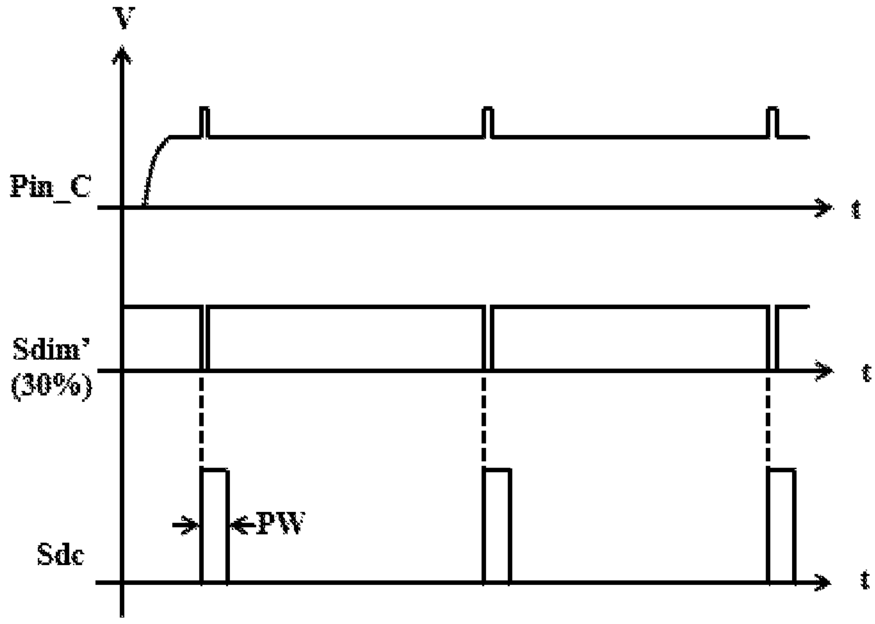
Figure 9D:
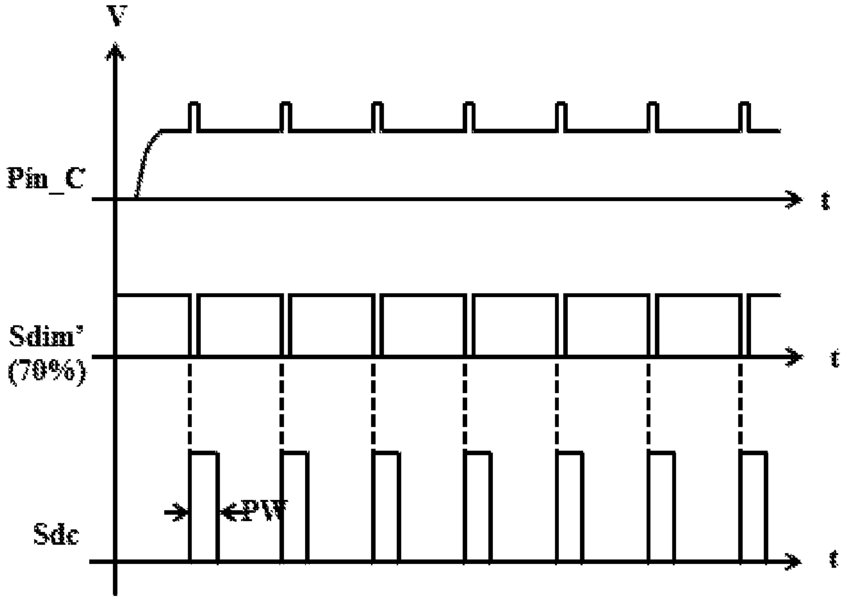

Operations of the above described demodulating module 140 are described with reference to FIGS. 9C and 9D. FIGS. 9C-9D are signal waveform diagrams of signals of an LED lighting apparatus according to some embodiments of the present disclosure. Similar to the embodiments described above, an example of adjusting luminance of an LED module to respectively being 30% of a maximum luminance and being 70% of the maximum luminance is taken for description of embodiments illustrated in FIGS. 9C and 9D, but the present invention is not limited to this example. Referring to FIGS. 7C, 9C, and 9D, when an LED lighting apparatus receives a modulated power signal Pin_C having a DC component (such as a DC set voltage Vset) and an AC component (such as a pulse signal based on the set voltage Vset), in one aspect the driving circuit 130 of FIG. 7C is activated and performs power conversion to generate a driving power signal Sdry in response to the modulated power signal Pin_C; and in another aspect the demodulating module 140 of FIG. 7C couples-in the AC component of the modulated power signal Pin_C, through the coupling capacitor C51, and performs voltage division and stabilization on the AC component through the resistors R51-R53 and the zener diode ZD51, in order to generate a control signal for the transistor M51. The transistor M51 through switching of itself affects the signal state at its first terminal, to form a luminance instruction signal Sdim'. The luminance instruction signal Sdim' is for example a signal having an inverted pulse waveform (i.e. its base electrical level is a high level, which switches into a low level during pulse duration) and the occurrence of whose pulses is largely synchronous with the AC component of the modulated power signal Pin_C. A dimming message or luminance message provided by a dimmer may be regarded as being included in a frequency message/information of the luminance instruction signal Sdim'.

The luminance instruction signal Sdim' is configured to trigger the signal transformation circuit 145*b* to generate a square wave having a fixed pulse width PW as a dimming control signal Sdc. FIGS. 9C and 9D illustrate an example of the signal transformation circuit 145*b* being triggered to generate a square wave based on a falling edge of the luminance instruction signal Sdim', but the present invention is not limited to this example.

Through the above described signal transformation operations, when the switching control circuit 131 receives a dimming control signal Sdc indicating an instruction to adjust a luminance to be at 30% of a maximum luminance, the switching control circuit 131 is configured to reduce the duty cycle of the transistor M41 in order to lower the value of current in a driving power signal Sdry to be 30% of its current rating. And when the switching control circuit 131 later receives a dimming control signal Sdc indicating an instruction to adjust a luminance to be at 70% of the maximum luminance, the switching control circuit 131 is configured to increase the duty cycle of the transistor M41 in order to increase the value of current in a driving power signal Sdry from 30% to 70% of its current rating, whereby realizing dimming effects.

A demodulating module 140 makes use of merely the AC component of a modulated power signal Pin_C to trigger for producing a dimming control signal Sdc, but does not control, directly through the modulated power signal Pin_C, dimming actions by a driving circuit 130. Therefore, even if the modulated power signal Pin_C significantly fluctuates or is unstable due to unexpected factors affecting a dimmer 80, as long as the pulses on the dimming control signal Sdc can be identified, the demodulating module 140 can ensure that a wrong dimming control action is prevented when significant fluctuation on the voltage of the modulated power signal Pin_C occurs, thereby improving reliability of the LED lighting apparatus.

In other embodiments, a sampling circuit 141 may be referred to as a signal analyzing module, a signal transformation circuit 145 may be referred to as a signal generating module, and a driving circuit 130 may be referred to as a power conversion module.

In other embodiments, a signal transformation circuit 145 includes a trigger circuit coupled to a sampling circuit 141 in order to receive a luminance instruction signal Sdim'. For example, when detecting a rising edge, a sharp-changing edge, happening on the luminance instruction signal Sdim', the trigger circuit is configured to trigger outputting of, or to trigger to output, a pulse signal having a pulse width Th, which pulse width Th may be set by internal components of the trigger circuit. The triggered pulse signal (after transformation by the trigger circuit) is a dimming control signal Sdc, which has a pulse width Th and a frequency largely the same as or consistent with that of the luminance instruction signal Sdim'.

FIG. 10A and FIG. 10B are flow charts of steps of a dimming control method for an LED lighting apparatus according to some embodiments of the present disclosure. The dimming method described here may be applicable to any of the embodiments of either an LED lighting system or an LED lighting apparatus illustrated in the above FIGS. 1-7C. Referring to FIG. 10A first, in a dimming control method of the embodiments of FIG. 10A, a power module of an LED lighting apparatus performs power conversion on an input power signal and then generates a driving power signal for an LED module (Step S110). In another aspect, a demodulating module in the LED lighting apparatus captures or extracts a signal feature of the input power signal (Step S120). Next the demodulating module demodulates the extracted signal feature to thereby obtain a luminance message and then generates a corresponding dimming control signal (Step S130). And then the power module adjusts its operation of power conversion according to the dimming control signal generated by the demodulating module, in order to adjust the magnitude of the generated driving power signal in response to the luminance message (Step S140).

In some embodiments, the steps S120 to S140 may further be implemented by a control method illustrated in FIG. 10B. Referring to FIG. 10B, in the embodiments of FIG. 10B, the demodulating module may generate a first feature signal by filtering out DC component of of the input power signal (Step S220), wherein the first feature signal is for example a luminance instruction signal Sdim' mentioned in the above described embodiments. Next, the demodulating module triggers generating of the dimming control signal based on a rising edge or a falling edge of the first feature signal (Step S230). And then a switching control circuit in the power module is caused to adjust the magnitude of the generated driving power signal according to the duty cycle of the dimming control signal (Step S240).

Figure 13A:
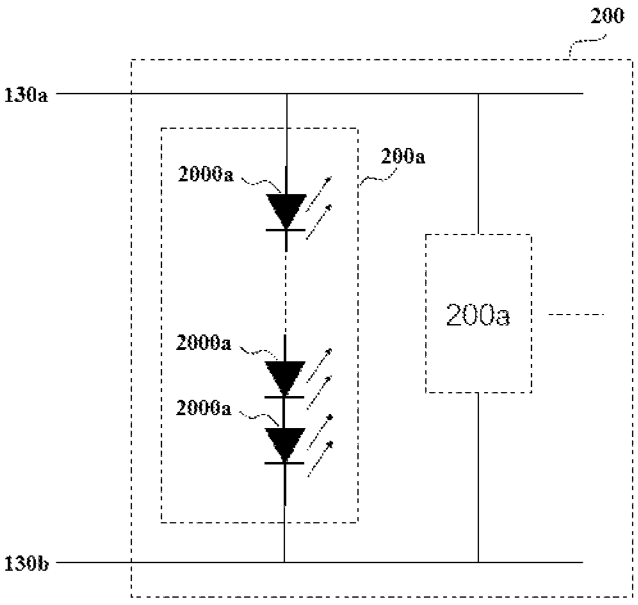
FIG. 13A and FIG. 13B are circuit-structure diagrams of an LED module according to some embodiments of the present disclosure.

FIG. 13A is a circuit-structure diagram of an LED module according to some embodiments of the present disclosure. As shown in FIG. 13A, an LED module LM has an anode/positive terminal connected to a first driving output terminal 130*a* of a driving device, and has a cathode/negative terminal connected to a second driving output terminal 130*b* of the driving device. The LED module LM comprises at least one LED unit 200*a*. When two or more LED units 200*a* are included, they are connected in parallel. The anode of each LED unit is coupled to the anode of the LED module LM and thereby coupled to a first driving output terminal 130*a*, and the cathode of each LED unit is coupled to the cathode of the LED module LM and thereby coupled to a second driving output terminal 130*b*. Each LED unit 200*a* includes at least one LED 2000*a* as a light source in the LED lamp including the LED module LM. When multiple LEDs 2000*a* are included in an LED unit 200*a*, they are connected in series, with the anode of the first LED 2000*a* coupled to the anode of this LED unit 200*a*, and the cathode of the first LED 2000*a* coupled to the next or second LED 2000*a*. And the anode of the last LED 2000*a* in this LED unit 200*a* is coupled to the cathode of a previous LED 2000*a*, with the cathode of the last LED 2000*a* coupled to the cathode of this LED unit 200*a*.

Figure 13B:
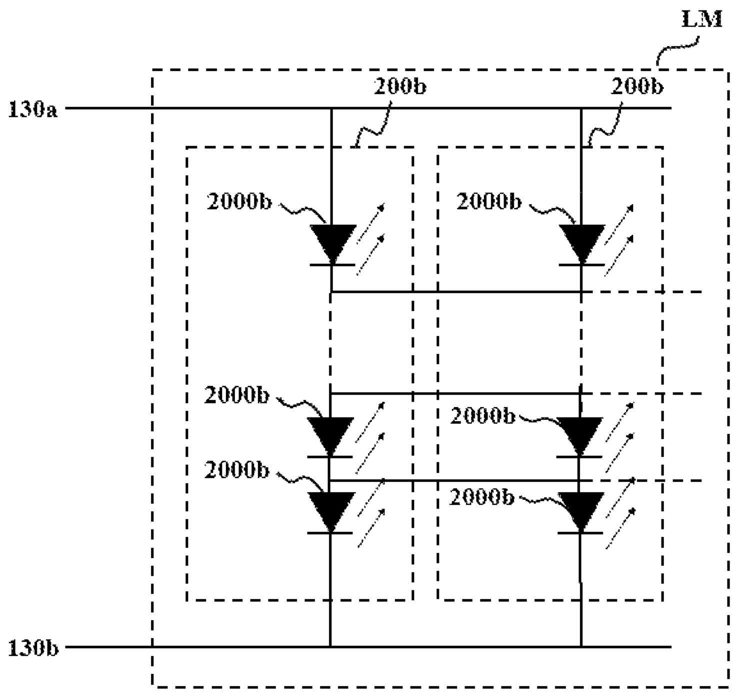

FIG. 13B is a circuit-structure diagram of an LED module according to some embodiments of the present disclosure. As shown in FIG. 13B, an LED module LM has an anode/positive terminal connected to a first driving output terminal 130*a*, and has a cathode/negative terminal connected to a second driving output terminal 130*b*. The LED module LM in these embodiments comprises at least two LED units 200*b*, with the anode of each LED unit 200*b* coupled to the anode of the LED module LM, and the cathode of each LED unit 200*b* coupled to the cathode of the LED module LM. Each LED unit 200*b* includes at least two LEDs 2000*b* connected in the same way as described in FIG. 13A, i.e., the anode of the first LED 2000*b* in an LED unit 200*b* is coupled to the anode of this LED unit 200*b*, the cathode of the first LED 2000*b* is coupled to the anode of the next or second LED 2000*b*, and the cathode of the last LED 2000*b* is coupled to the cathode of this LED unit 200*b*. Further, LED units 200*b* in an LED module LM are connected to each other in these embodiments. All of the n-th LEDs 2000*b* respectively of the LED units 200*b* are connected by every anode of every n-th LED 2000*b* in the LED units 200*b*, and by every cathode of every n-th LED 2000*b*, where n is a positive integer. In this way, the LEDs in the LED module LM in these embodiments are connected in the form of a mesh. In practical applications, the number of LEDs 2000*b* included in an LED unit 200*b* is preferably in the range of 15-25, and preferably in the range of 18-22.

An appended note is that although certain above descriptions are of those embodiments where lighting luminance of an LED module is to be adjusted, adjusting of color temperature of an LED module can be realized by embodiments analogous or similar to those embodiments described above. For example, if the above described dimming control method(s) is applied in the case of adjusting driving power to only red LEDs, i.e. lighting luminance of only red LEDs is to be adjusted, the above described dimming control method(s) may be performed to realize adjusting of color temperature of an LED apparatus including the red LEDs.

What is claimed is:

1. A dimmer for adjusting an LED lamp, the dimmer comprising:

a dimming signal generating module configured to generate a dimming signal based on a received dimming instruction, the dimming signal for providing a way of controlling the LED lamp, and a signal combining processing module configured to combine or synthesize a power signal and the dimming signal to produce an output signal, wherein the power signal comprises a direct current (DC) signal and the output signal is configured for the LED lamp to perform dimming control according to the dimming signal in the output signal, wherein the signal combining processing module comprises:

a feedback adjusting unit, coupled to the dimming signal generating module and an output terminal of the dimmer, and configured to:

based on the dimming signal, adjust a sample signal obtained from the output terminal, and based on the adjusted sample signal, output a feedback signal; and a power conversion unit, coupled to the feedback adjusting unit and the output terminal, and configured to:

based on the feedback signal, perform power conversion on the power signal, in order to output the output signal having the synthesized dimming signal.

2. The dimmer according to claim 1, wherein the feedback adjusting unit comprises:

a sampling circuit, coupled to the output terminal of the dimmer in order to output the sample signal;

an adjusting circuit, coupled to the sampling circuit and configured to, based on the dimming signal, adjust the sample signal; and a comparing circuit, coupled to the sampling circuit, and configured to output the feedback signal based on a signal difference between the adjusted sample signal and a reference signal.

3. The dimmer according to claim 2, wherein the adjusting circuit comprises an impedance element whose impedance is to be adjusted based on the received dimming signal, the impedance element being configured for adjusting the sample signal by variation of its impedance.

4. The dimmer according to claim 2, wherein the feedback adjusting unit further comprises a signal transmission circuit coupled between the comparing circuit and the power conversion unit, the signal transmission circuit being configured for transmitting the feedback signal to the power conversion unit by a way of isolation coupling.

5. The dimmer according to claim 2, wherein the feedback adjusting unit further comprises: a reference-signal generating circuit, coupled to the power conversion unit and configured to generate a reference signal based on an electrical signal on the power conversion unit.

6. The dimmer according to claim 1, wherein the power conversion unit comprises:

an energy conversion circuit, coupled to an output terminal of the dimmer and configured to perform power conversion to output the output signal;

a switching circuit, coupled to the energy conversion circuit and configured to be controlled to conduct current or to cut off current in order to control performing of power conversion by the energy conversion circuit; and a driving control circuit, coupled to the feedback adjusting unit and a control terminal of the switching circuit, and configured to control current-conduction or current cutoff of the switching circuit based on the feedback signal and by detecting an electrical signal on the energy conversion circuit.

7. A method for performing dimming by a dimmer to adjust an LED lamp, the dimming method comprising:

generating a dimming signal based on a dimming instruction; and combining or synthesizing a power signal and the dimming signal to produce an output signal, wherein the power signal comprises a direct current (DC) signal and the output signal is configured for the LED lamp to perform dimming control according to the dimming signal in the output signal, wherein the step of combining or synthesizing a power signal and the dimming signal to produce an output signal comprises:

based on the dimming signal, adjusting a sample signal obtained from an output terminal of the dimmer, and based on the adjusted sample signal, outputting a feedback signal; and based on the feedback signal, performing power conversion on the power signal, in order to output the output signal having the synthesized dimming signal.

8. The dimming method according to claim 7, wherein the step of outputting a feedback signal comprises outputting a feedback signal based on a signal difference between the adjusted sample signal and a reference signal.

* * * * *